(12) United States Patent
Tyburski et al.

(10) Patent No.: US 10,824,861 B2
(45) Date of Patent: Nov. 3, 2020

(54) SYSTEM AND METHOD USING IMAGE BASED MACHINE LEARNING PROCESS FOR EARTH OBSERVATION AND ANALYSIS

(71) Applicant: Global Surface Intelligence Limited, Edinburgh (GB)

(72) Inventors: Matthew Tyburski, Baltimore, MD (US); Nigel Douglas, East Lothian (GB); Martin Milnes, West Sussex (GB)

(73) Assignee: GLOBAL SURFACE INTELLIGENCE LIMITED, Edinburgh (GB)

( * ) Notice: Subject to any disclaimer, the term of this patent is extended or adjusted under 35 U.S.C. 154(b) by 0 days.

(21) Appl. No.: 16/072,689

(22) PCT Filed: Jan. 30, 2017

(86) PCT No.: PCT/GB2017/000013
§ 371 (c)(1),
(2) Date: Jul. 25, 2018

(87) PCT Pub. No.: WO2017/129940
PCT Pub. Date: Aug. 3, 2017

(65) Prior Publication Data
US 2019/0034725 A1   Jan. 31, 2019

(30) Foreign Application Priority Data
Jan. 29, 2016 (GB) .............................. GB1601660.2

(51) Int. Cl.
*G06K 9/00* (2006.01)
*G06T 7/11* (2017.01)
(Continued)

(52) U.S. Cl.
CPC ....... *G06K 9/00657* (2013.01); *G06K 9/4609* (2013.01); *G06K 9/6267* (2013.01);
(Continued)

(58) Field of Classification Search
CPC ............. G06K 9/00657; G06K 9/4609; G06K 9/6267; G06T 7/11; G06T 1/20;
(Continued)

(56) References Cited

U.S. PATENT DOCUMENTS

| 2017/0206441 A1* | 7/2017 | Miyano | .................... H04N 7/18 |
| 2018/0260626 A1* | 9/2018 | Pestun | ................ G06K 9/00637 |
| 2018/0315191 A1* | 11/2018 | Meng | ........................ G06T 3/00 |

OTHER PUBLICATIONS

Yin He et al., "Mapping Annual Land Use and Land Cover Changes Using MODIS Time Series"; Journal of Selected Topics in Applied Earth Observations and Remote Sensing; IEEE; vol. 7, No. 8 dated Aug. 1, 2014, pp. 3421-3427.
(Continued)

*Primary Examiner* — Pakee Fang
(74) *Attorney, Agent, or Firm* — Faegre Drinker Biddle & Reath LLP

(57) ABSTRACT

A process for Earth observation and analysis by pre-processing remote sensing images which may be from sources including MODIS, Proba-V, Landsat and/or Sentinel or any other space-borne or airborne sensor. Filtering the images by applying a temporal signal processing filter to a time series of remote sensing images and extracting descriptive statistics from image pixels of the remote sensing images to create input X parameters for use in a machine learning process. Applying the machine learning process to create a model which determines how the input X-parameter values map to the range of possible Y-parameter values in a way that improves RAM allocation and parallelizing in the software and processors during the machine learning process. Applying the output from machine learning to a potentially new
(Continued)

Area of Interest to determine or predict Y-values for the known X-values using data scoring. Generating calibrated output images corresponding to the specific regions defining the Areas of Interest.

20 Claims, 47 Drawing Sheets

(51) Int. Cl.
    *G06T 1/60*     (2006.01)
    *G06T 1/20*     (2006.01)
    *G06K 9/46*     (2006.01)
    *G06K 9/62*     (2006.01)

(52) U.S. Cl.
    CPC ............ *G06T 1/20* (2013.01); *G06T 1/60* (2013.01); *G06T 7/11* (2017.01); *G06T 2207/10032* (2013.01); *G06T 2207/20081* (2013.01); *G06T 2207/30181* (2013.01); *G06T 2207/30188* (2013.01)

(58) Field of Classification Search
    CPC ............ G06T 1/60; G06T 2207/10032; G06T 2207/20081; G06T 2207/30181; G06T 2207/30188
    See application file for complete search history.

(56) References Cited

OTHER PUBLICATIONS

Clark et al., "A scalable approach to mapping annual land cover at 250 m using MODIS time series data: A case study in the Dry Chaco ecoregion of South America"; Remote Sensing of Environment, Elsevier, XX, vol. 114, No. 11 dated Nov. 15, 2010, pp. 2816-2832.
Bin Ren, "Supporting Applications Involving Dynamic Data Structures and Irregular Memory Access on Emerging Parallel Platforms", Dissertation, Graduate Program in Department of Computer Science and Engineering The Ohio State University, dated Jan. 1, 2014, pp. 1-211.
Marron et al., "Random Forests of Very Fast Decision Trees on GPU for Mining Evolving Big Data Streams", In: "ECAI 2014", dated Aug. 18, 2014, IOS Press, vol. 263, pp. 615-620.
Shao Yang et al., "An evaluation of time-series smoothing algorithms for land-cover classifications using MODIS-NDVI multitemporal data"; Remote Sensing of Environment, Elsevier XX, vol. 174, Dec. 29, 2015, pp. 258-265.
Weston Anderson et al.: "Methods for Estimating Population Density in Data-Limited Areas: Evaluating Regression and Tree-Based Models in Peru", PLOS ONE, vol. 9, No. 7, dated Jul. 3, 2014, 15 pages.
International Search Report for PCT/GB2017/000013, dated May 16, 2017, 4 pages.
Written Opinion for PCT/GB2017/000013, dated May 16, 2017, 12 pages.

\* cited by examiner

| Sample Size | Open Source | GSi's Version | Scale-up |
|---:|---:|---:|---:|
| 100 | 8 | 0.094 | 85 |
| 1,000 | 10 | 0.113 | 89 |
| 10,000 | 50 | 0.5 | 100 |
| 100,000 | 3,000 | 3.3 | 906 |
| 1,000,000 | 300,000 | 49 | 6,154 |
| 10,000,000 | 30,000,000 | 763 | 39,312 |
| 100,000,000 | 3,000,000,000 | 24,375 | 123,077 |
| 200,000,000 | 12,000,000,000 | 87,500 | 137,143 |

Figure 9

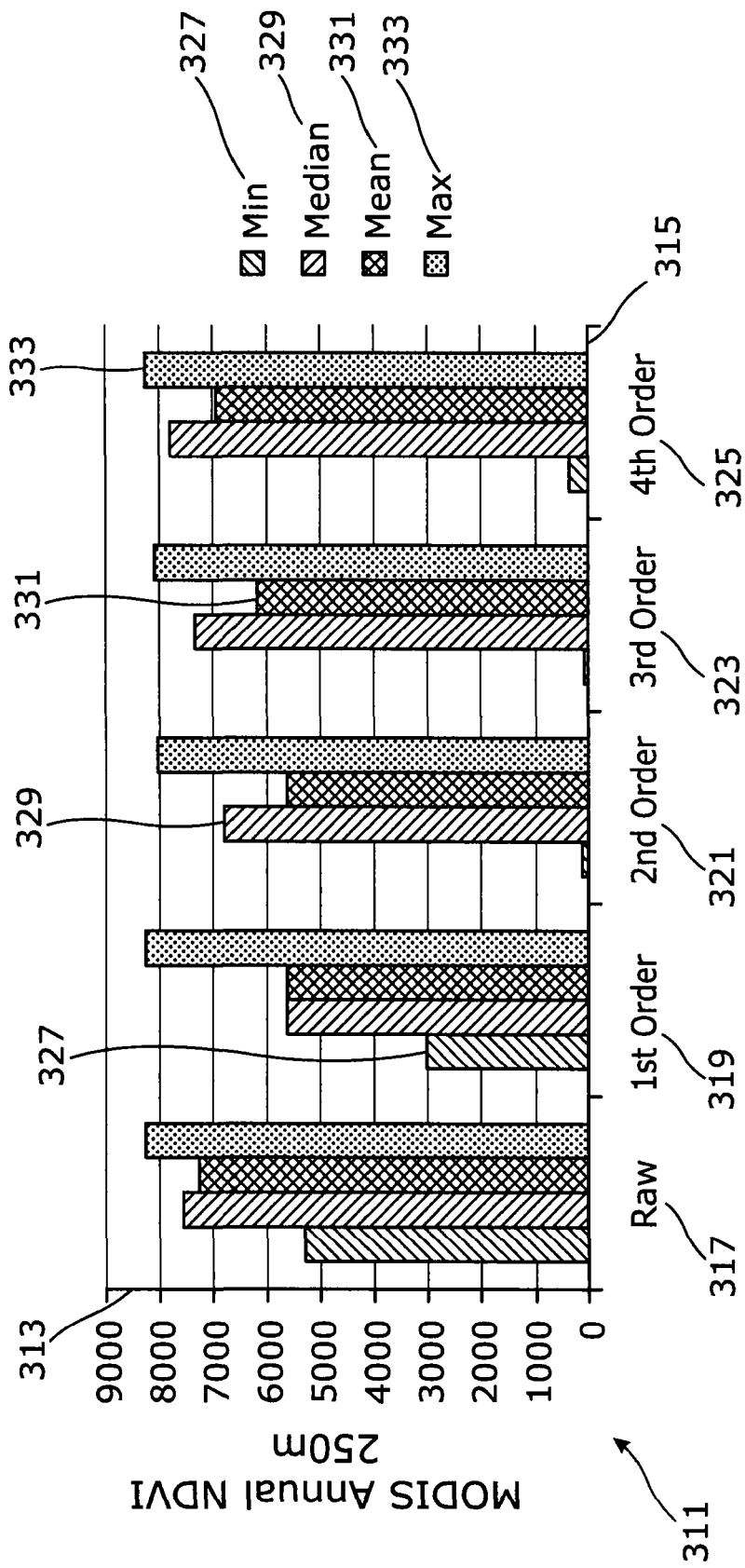
Figure 17 Annual Descriptive Statistics from MODIS

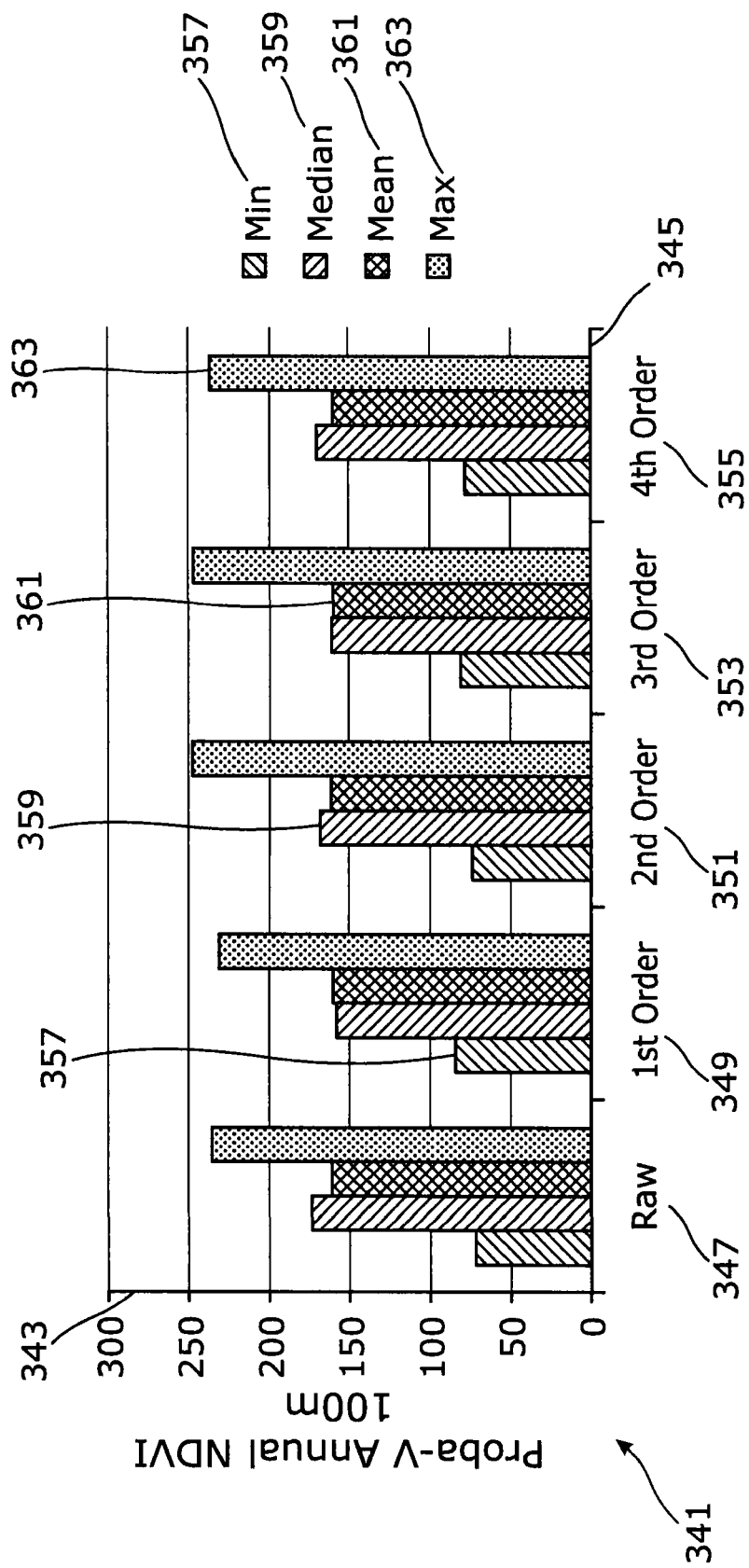
Figure 18 Annual Descriptive Statistics from Proba-V

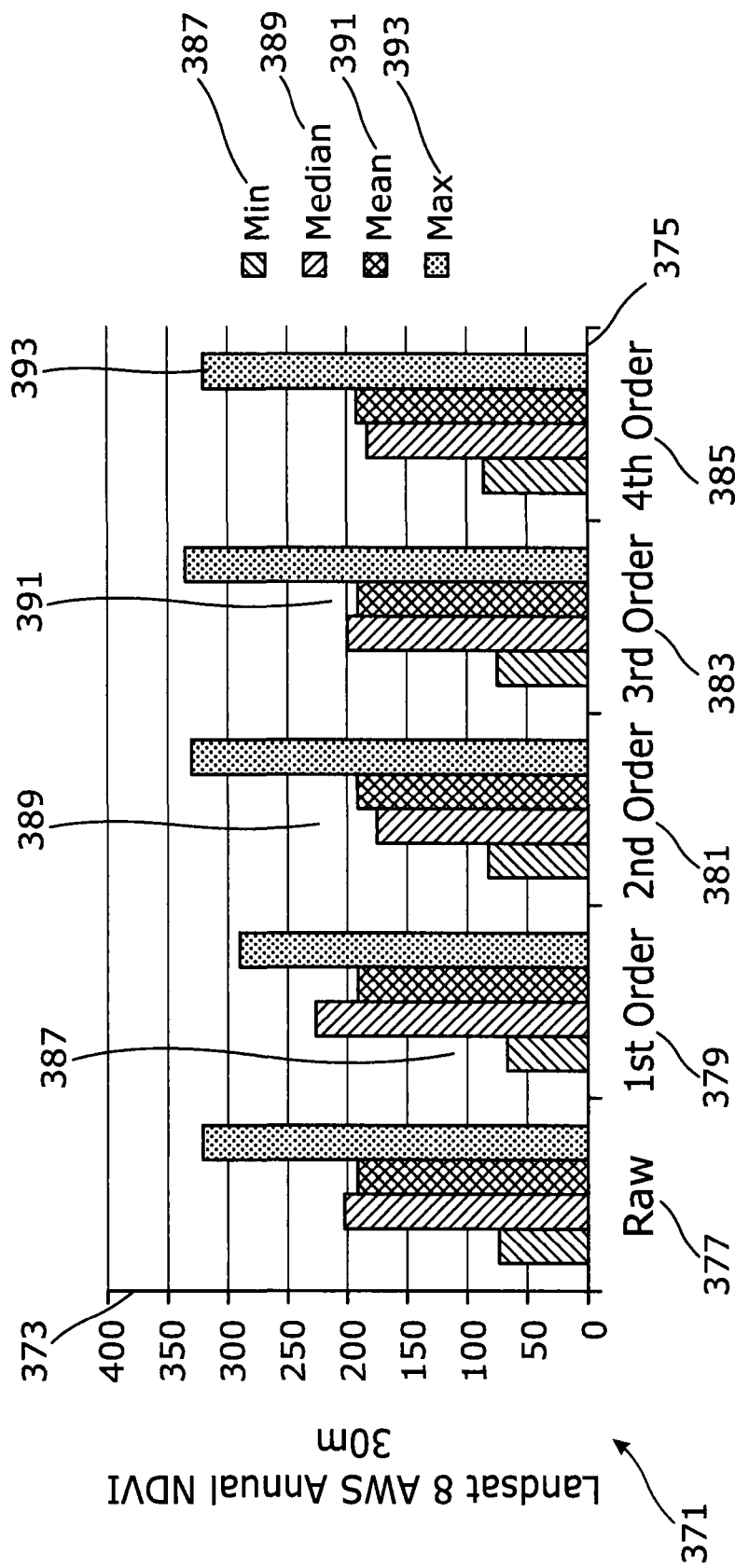
Figure 19 Annual Descriptive Statistics from Landsat 8 AWS

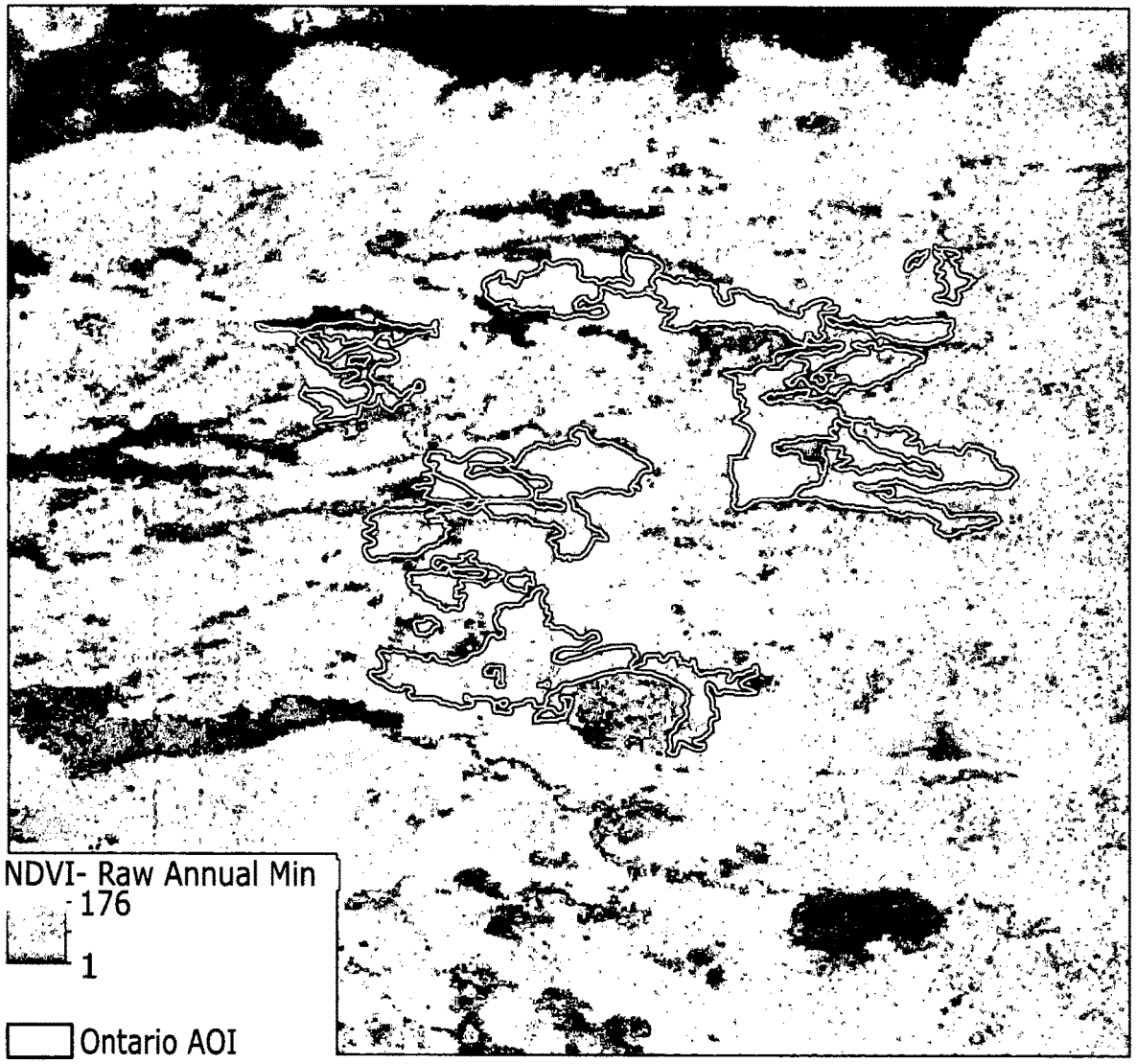
Figure 20a Raw Data (Min)

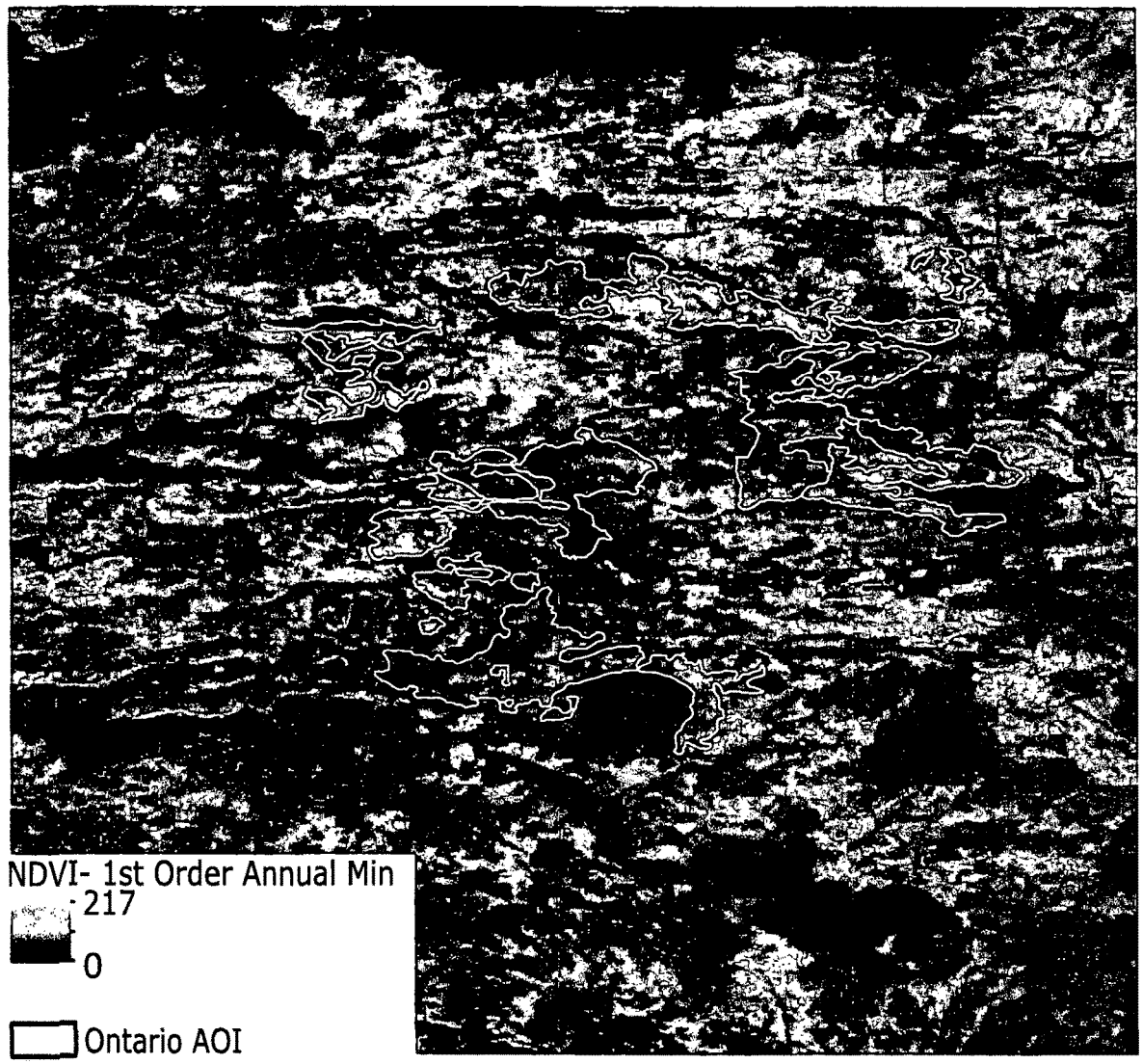
Figure 20b Filtered Data (Min)

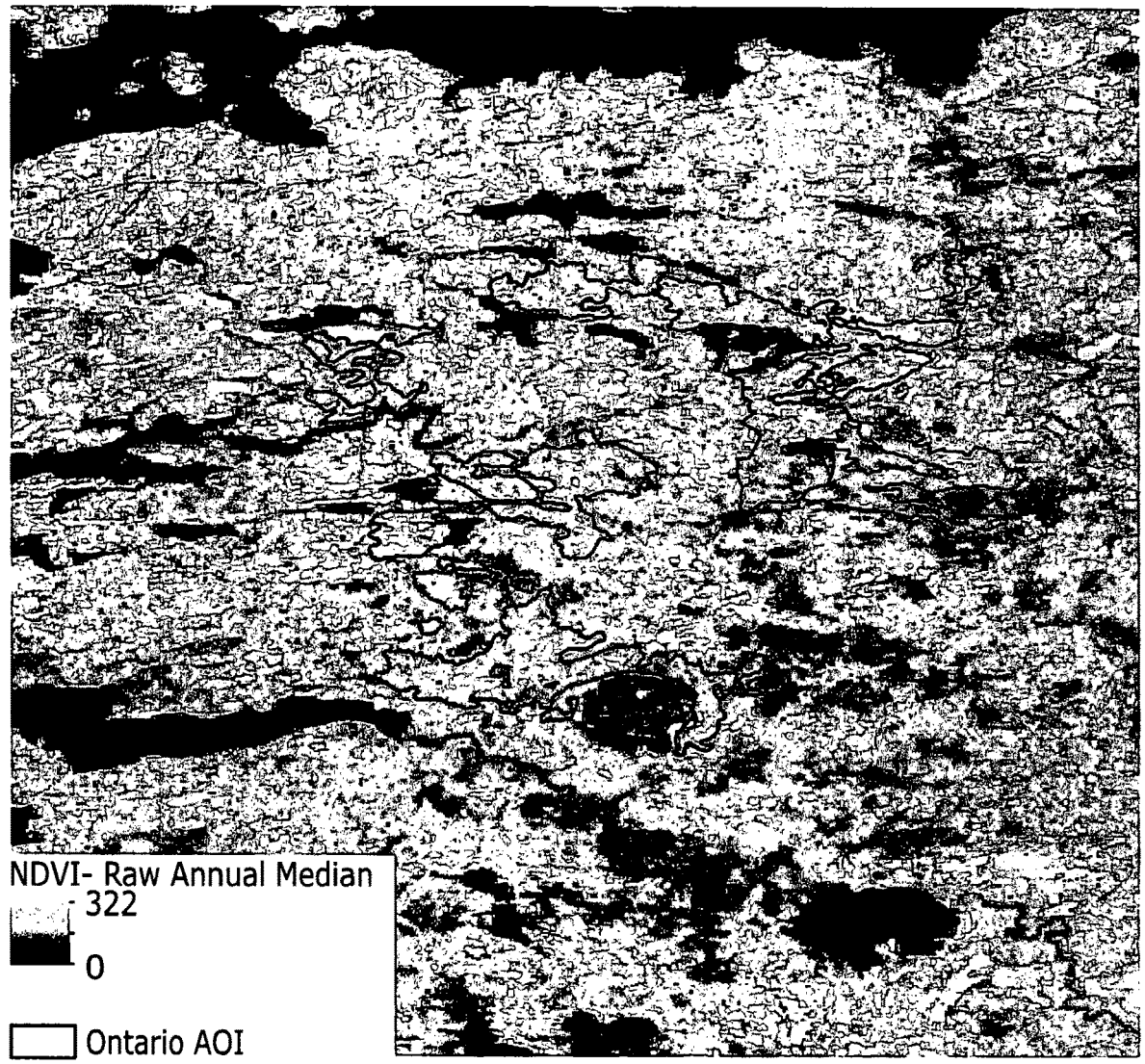
Figure 21a Raw Data (Median)

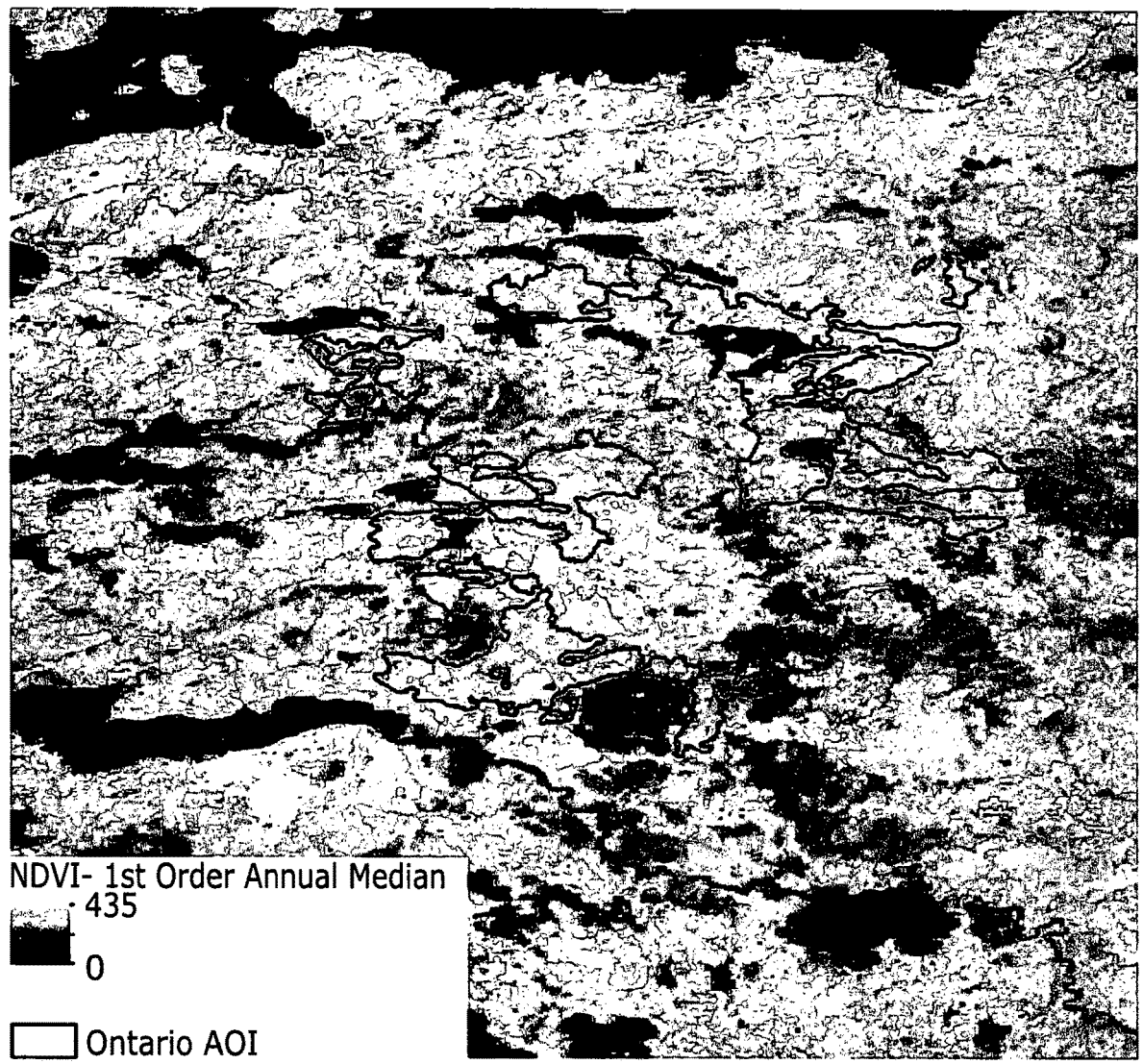
Figure 21b Filtered Data (Median)

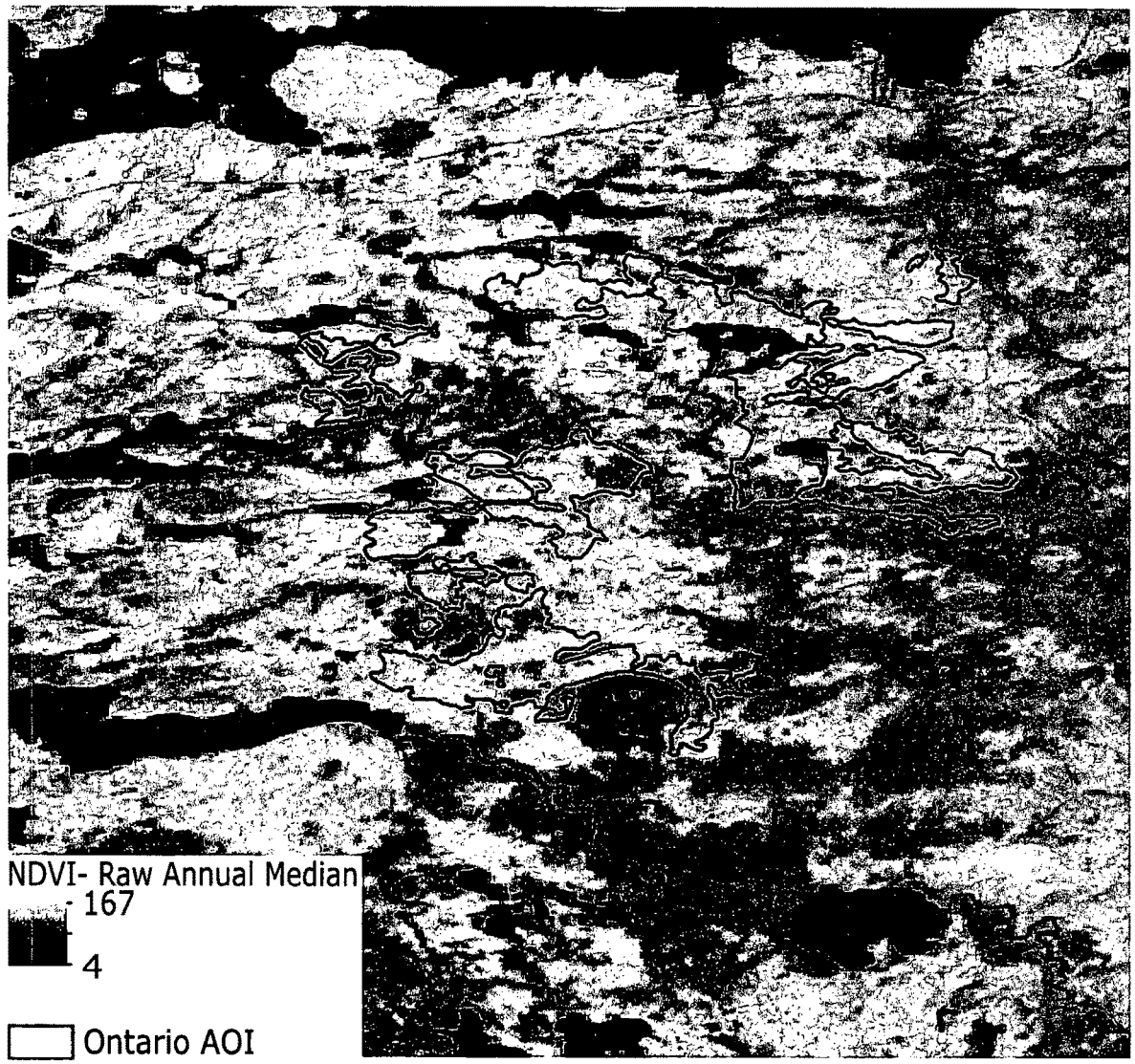
Figure 22a Raw Data (Mean)

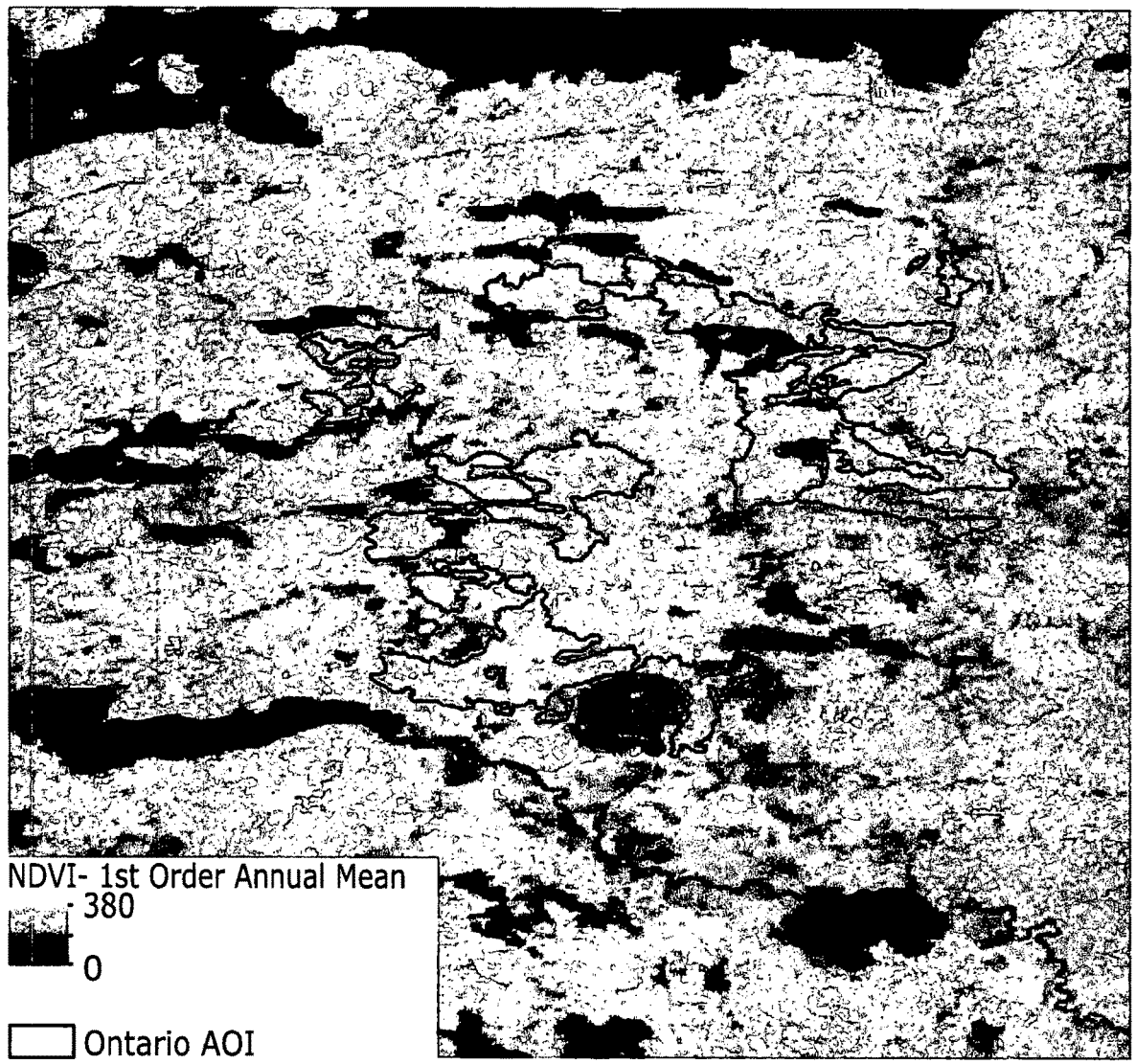
Figure 22b GSi Filtered Data (Mean)

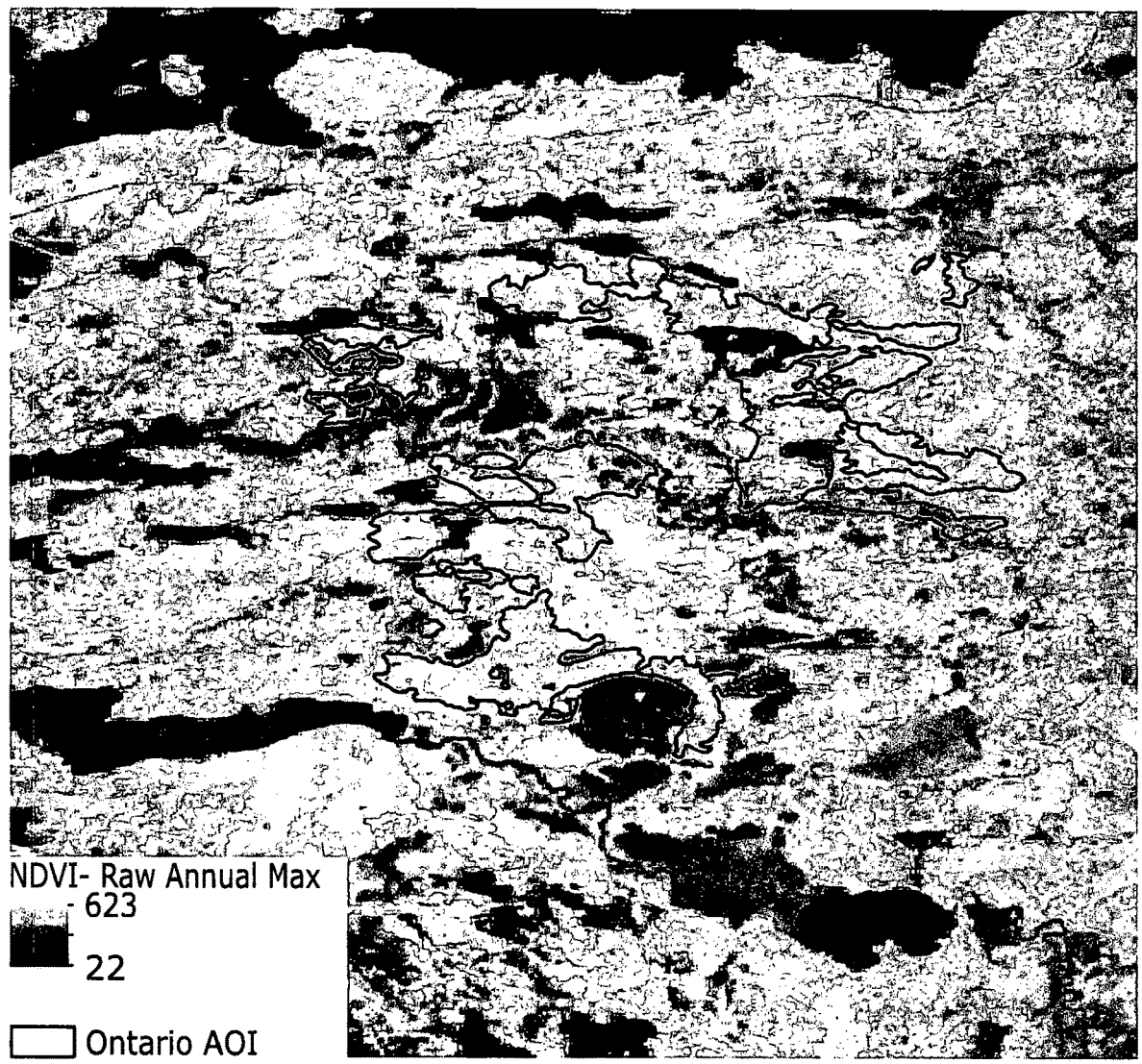
Figure 23a - Raw Data (Max)

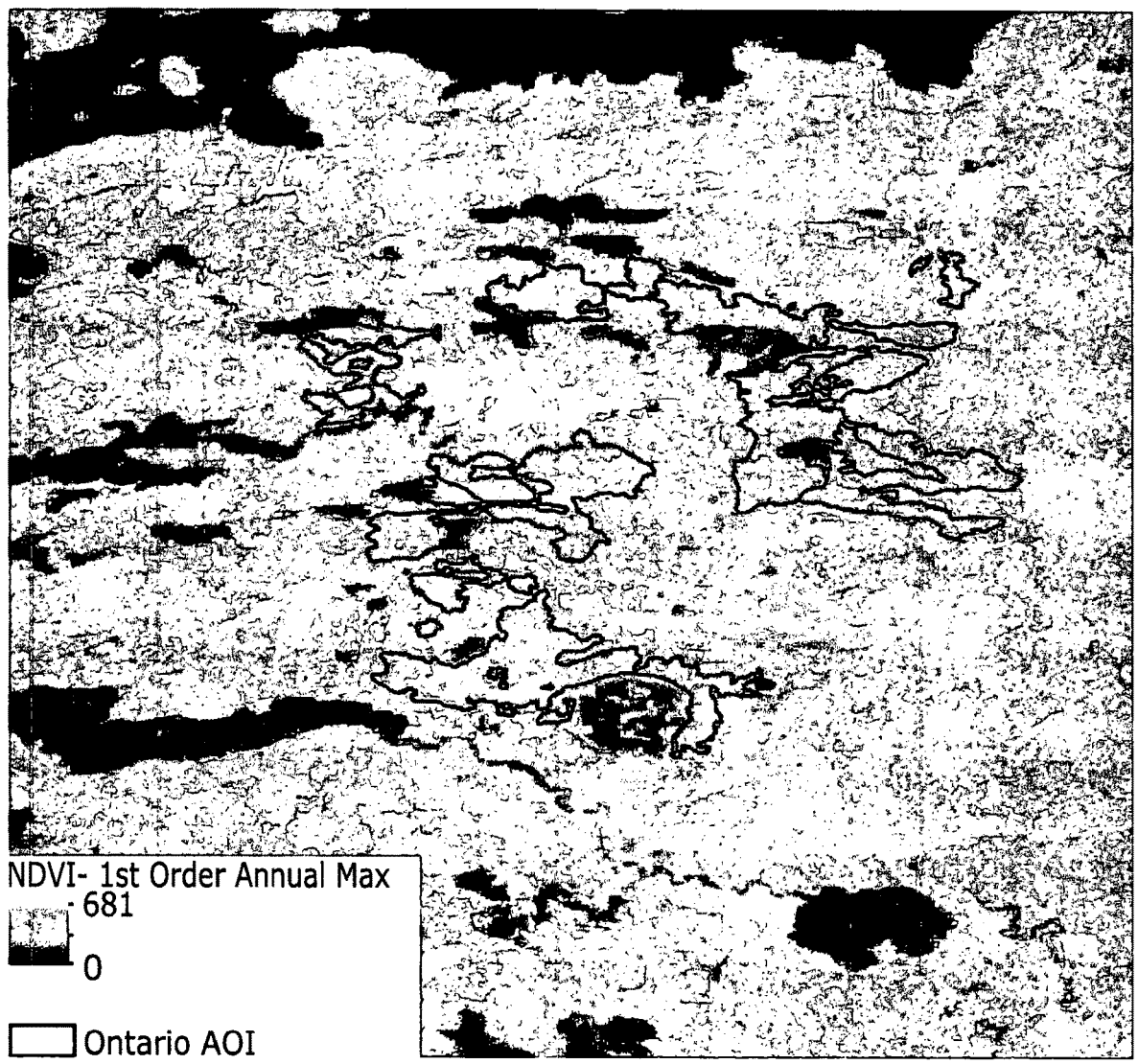
Figure 23b - GSi Filtered Data (Max)

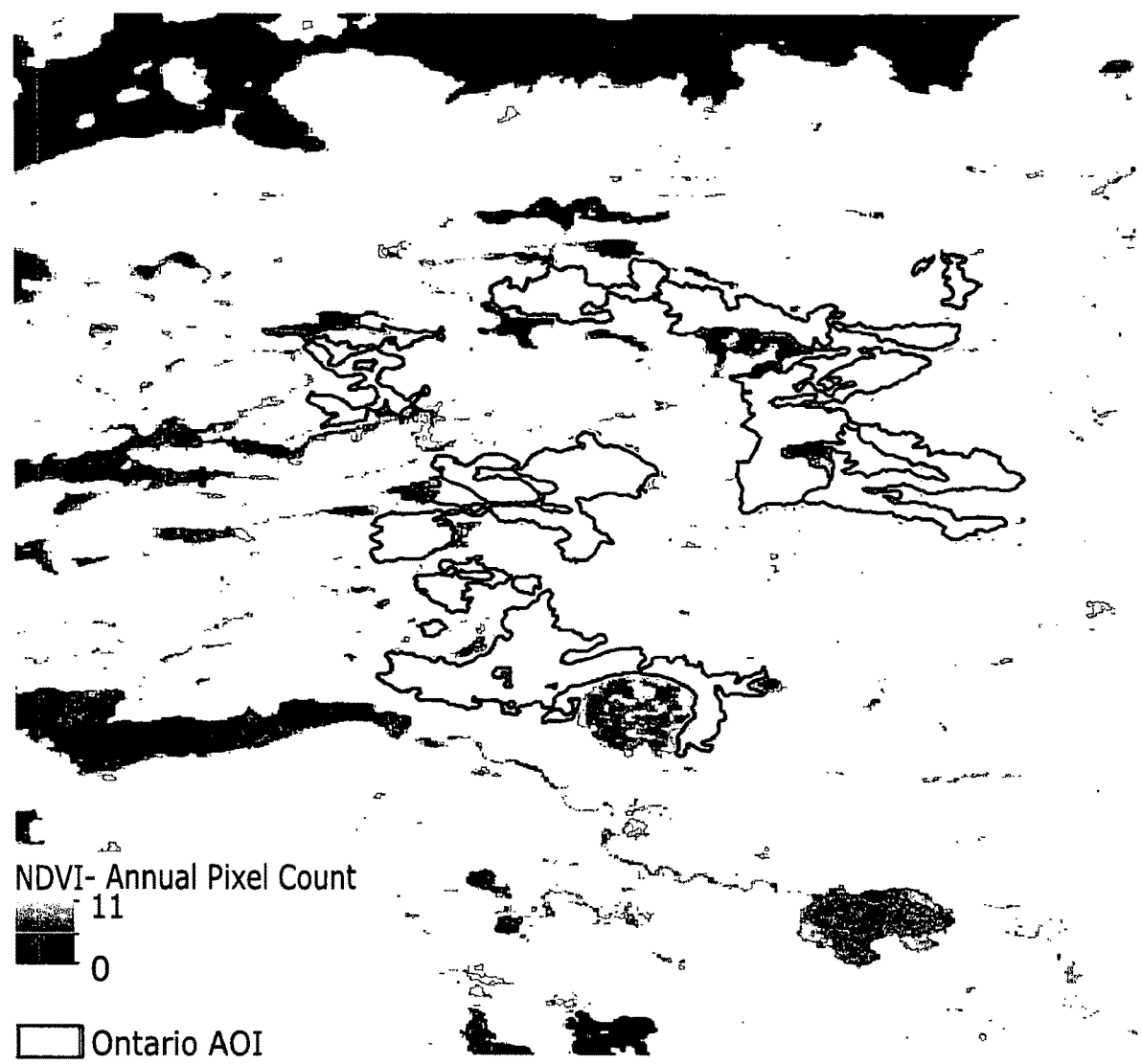
Figure 24 - Annual Pixel Count

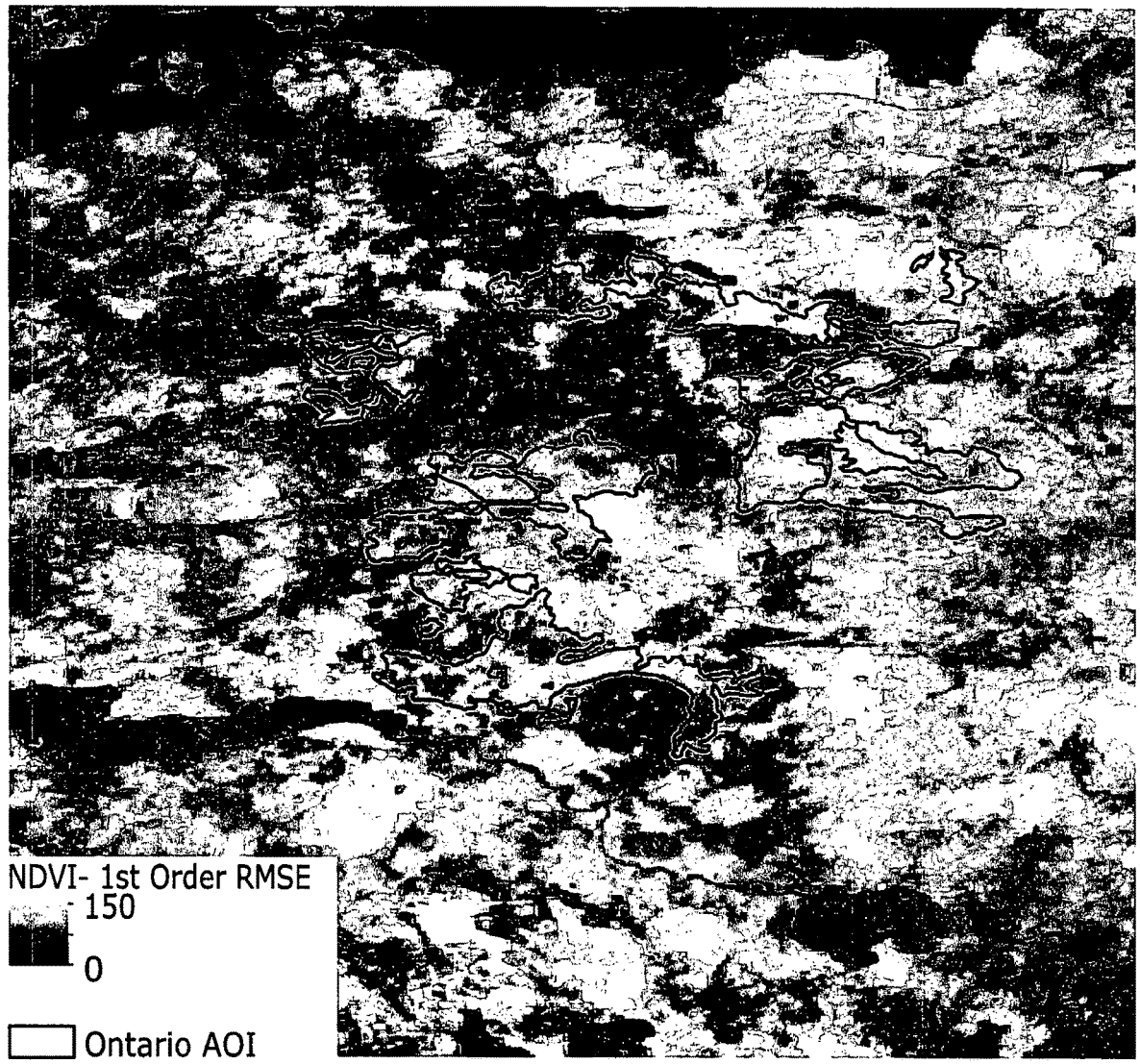
Figure 25 - Per Pixel RMSE

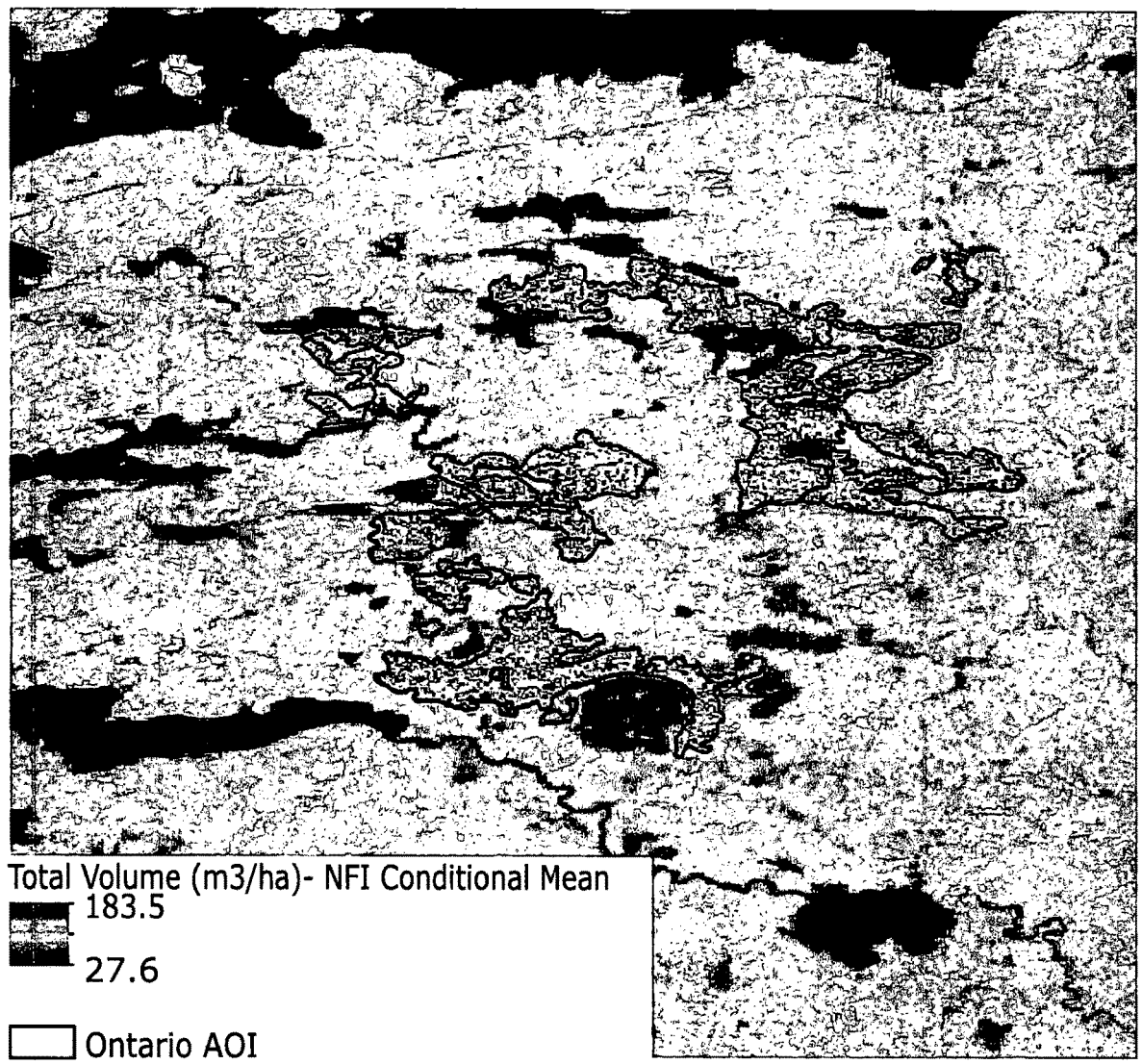
Figure 29a - NFI Derived - Conditional Mean
Total Volume (m3/ha)

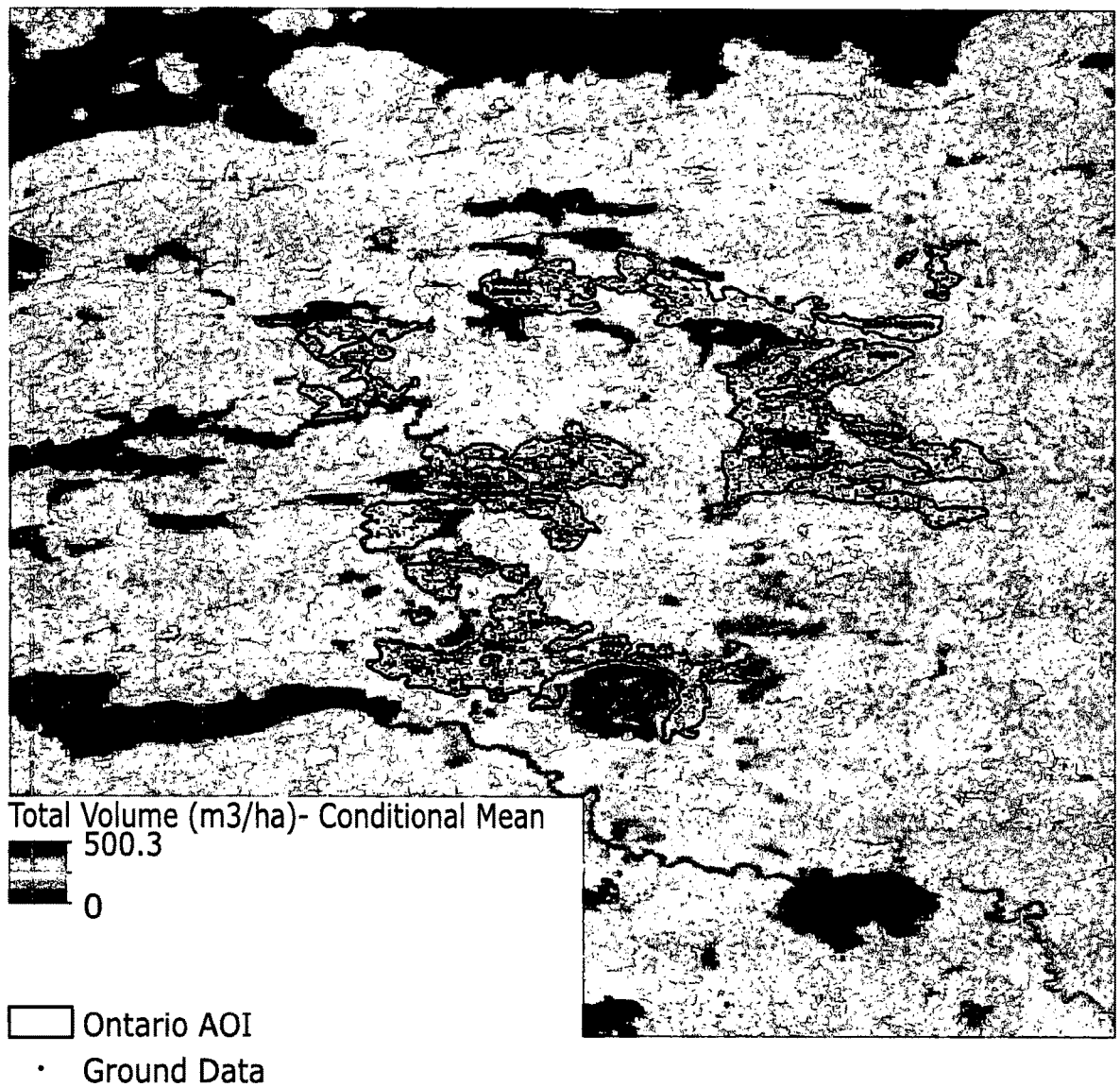
Figure 29b - Field Data Inferenced - Conditional Total Volume (m3/ha)

SYSTEM AND METHOD USING IMAGE BASED MACHINE LEARNING PROCESS FOR EARTH OBSERVATION AND ANALYSIS

INTRODUCTION

The present invention relates to a system and method for Earth observation and analysis and in particular to a system for monitoring and measuring ecosystem attributes in timber and agriculture.

BACKGROUND TO THE INVENTION

Manual interpretation of remote sensing imagery using commercial software is time consuming and costly. Manual interpretational also adds a degree of human induced error. This error can arise from a combination of poor analysis, or error in the sensor data (from cloud cover, atmospheric distortion, or geographic projection for example). Furthermore, these single image observations are often taken at a single point or snapshots in time, which means that they are both out of date the minute they are taken as well as the next increment in time (daily, weekly, monthly, etc.) producing new values for the same locations. This can further skew results in imagery analysis, especially when the analysis includes incremental replication in time within years and between years. A system that can aggregate temporal replication of raw satellite imagery could reduce error while simultaneously inflating the processing time in imagery analysis.

SUMMARY OF THE INVENTION

In accordance with a first aspect of the invention there is provided a process for Earth observation and analysis, the process comprising:
i) pre-processing remote sensing images to filter said images by applying a temporal signal processing filter to a time series of remote sensing images and extracting descriptive statistics from image pixels of the remote sensing images to create input X parameters for use in a machine learning process;
ii) applying the machine learning process to create a model which determines how the input X-parameter values map to the range of possible Y-parameter values, through a regression (or classification) process in a way that improves RAM allocation and parallelizing in the software and processors;
iii) applying the output from step ii) to a potentially new Area of Interest to determine or predict the Y-values for the known X-values using data scoring;
iv) generating calibrated output images corresponding to the specific regions defining the Areas of Interest.

Advantageously, the present invention uses pre-processing to obtain better data and machine learning to provide faster data processing to give an improved quality output image for a user.

The process of using a model to make predictions about behaviour that has yet to happen is called data scoring.

Preferably, the area of interest is defined by a coordinate bounding box of the target area.

Optionally, an annotated scaled, colour-coded output image is provided.

Preferably extracting descriptive statistics comprises extraction from individual pixels.

Preferably, the data includes the independent variables (X-parameters), such as satellite-derived data.

The satellite derived data comprises imagery from sources including MODIS, Proba-V, Landsat and/or Sentinel or any other space-borne or airborne sensor.

Preferably, the data comprises Discrete element method (DEM) derived parameters (such as slope, aspect, elevation) and/or soil-derived parameters.

Preferably, the signal processing smoothes out the signal noise for each pixel within a year or with respect to a growth cycles within a year.

Preferably, the descriptive statistics are extracted from statics from the pixel's filtered frequency.

Preferably, the signal processing can then be run between years when comparing values between years.

Preferably, the signal processing filter comprises Fourier processing

Preferably, the signal processing filter comprises Kalman filtering and smoothing.

Preferably, the signal processing comprises generating annual or growth season based descriptive statistics.

Preferably, the descriptive statistics comprises annual minimum, annual median, annual mean and annual maximum value for all pixels in an image.

Preferably, the descriptive statistics are used to calculate vegetation attributes.

Preferably, the predetermined area comprises either global tiles, or specific Area of Interest.

Preferably image data comprises min/mean/max/median values across images acquired.

Preferably a signal processing filter is used to reduce the effect if anomalous data values.

Optionally, the time-series filter provides, within-year signal processing (CalcStats) and/or across year signal processing (YearFilter) data.

Preferably, pre-processing may also comprise per-pixel time-series filtering, to reduce the effect of anomalous values (typically caused by cloud contamination).

Preferably the pre-processed images and data are stored in a defined directory structure.

Preferably, the step of applying a machine learning process comprises using a Random Forest machine learning software application Preferably, the step of applying a machine learning process further comprises using a decision tree analysis to generate a quantile regression uncertainty analysis.

Preferably, the step of machine learning uses as input a variety of images, each representing a specific parameter either as a target parameter to be used for training and to be subsequently provided as the results of the predictive analysis, or as a reference parameter upon which the predictions will be made Preferably, the images used as reference parameters include satellite imagery, such as but not limited to from MODIS, Proba-V, Landsat or Sentinel sensors).

Preferably, the machine learning process further comprises a Quantile Regression, for example Quantile Regression Forest, which calculates confidence levels for the accuracy of each estimated value.

Preferably, the training data is provided by the user.

The training data may be historical in-situ or "ground truth" information. The training data may be in the form of CSV files and may comprise, with latitude/longitude and associated measured value(s) at each sample location Preferably, the output from the training is a user-specific Model.

Alternatively, reference training data covering a range of land attribute data, such as forestry attributes at different spatial resolutions can be used.

Preferably, the Y values can be predicted on a per-pixel basis.

Preferably, the step of predicting comprises; a first stage processing to be performed and a second stage which involves interactive selection of the specific outputs for display and/or download.

Preferably, in the first stage, the inputs for the Predictive Analytics are defined by the user, and the processing is started. The Predictive Analytics software will then generate output images covering the specified general AoI corresponding to the specified time, for each of the Y-parameters originally used in training for the selected Model. This processing could take a significant amount of time, if a large general AoI has been specified and/or multiple time periods have been selected.

For the second stage, the user analyses the results, and generates consolidated output for the precise Area of Interest (including mosaicking across MODIS tiles, if necessary, and applying shapefile-defined masks for the specific area of interest, as well as generating "user-friendly" colour look-up tables for presenting the resulting imagery in a clear and meaningful format (as .png files or pdf files, ready for inclusion in web pages or in reports.

In accordance with a second aspect of the invention there is provided a computer program having program instructions for carrying out the steps of the process of the first aspect of the invention.

Preferably, the computer program runs on a computer system which is distributed across multiple locations.

In accordance with a third aspect of the invention there is provided a process for Earth observation and analysis, the process comprising:

Preprocessing image data from downloaded files by remapping (also known as identification of bounding box) and co-registering the image data with data from other sources for use in a training process, to create X input parameters the training process comprises applying classification and regression functions applied to the training data to create a model—which determines how the input X-parameter values map to the range of possible Y-parameter values, through a regression (or classification) process;

applying the output from the decision trees to a potentially new Area of Interest to determine the Y-values for the known X-values (RFscore)

and generating calibrated output images corresponding to the specific polygonal regions defining the Areas of Interest.

In accordance with a fourth aspect of the invention there is provided a system for Earth observation and analysis, the system comprising:

A pre-processor for preprocessing image data from downloaded files by remapping and co-registering the image data with data from other sources for use in a training process, to create X input parameters training module for implementing a training process which comprises applying classification and regression functions to the training data to determine how the input X-parameter values map to the range of possible Y-parameter values, through a regression (or classification) process;

a scoring module for applying the output from the decision trees to a potentially new Area of Interest to determine the Y-values for the known X-values (RFscore); and an image processor for generating calibrated output images corresponding to the specific regions defining the Areas of Interest.

BRIEF DESCRIPTION OF THE DRAWINGS

The present invention will now be described with reference to the accompanying drawings in which:

FIG. 9 is a table which compares the performance of an embodiment of the present invention with the known state of the art;

FIG. 17 is a graph which shows the CalcStats annual descriptive statistics outputs for the same coordinate annual from MODIS;

FIG. 18 is a graph which shows the CalcStats annual descriptive statistics outputs for the same coordinate annual from Proba-V;

FIG. 19 is a graph which shows the CalcStats annual descriptive statistics outputs for the same coordinate annual from Landsat 8 AWS;

FIGS. 20a and 20b are images which shows the difference between minimum raw data (FIG. 20a) and data filtered in accordance with the present invention (FIG. 20b);

FIGS. 21a and 21b are images which shows the difference between median raw data (FIG. 18a) and data filtered in accordance with the present invention (FIG. 18b);

FIGS. 22a and 22b are images which shows the difference between mean raw data (FIG. 19a) and data filtered in accordance with the present invention (FIG. 19b);

FIGS. 23a and 23b are images which shows the difference between maximum raw data (FIG. 20a) and data filtered in accordance with the present invention (FIG. 20b);

FIG. 24 is an image which depicts annual descriptive statistics;

FIG. 25 is an image which depicts per pixel Root Mean Squared Error;

FIGS. 29a and 29b are images which show the conditional mean prediction for total volume at the whole AoI, where 24a is the NFI-derived inference and 24b is the locally measured inference with field data;

DETAILED DESCRIPTION OF THE DRAWINGS

Figure 1:
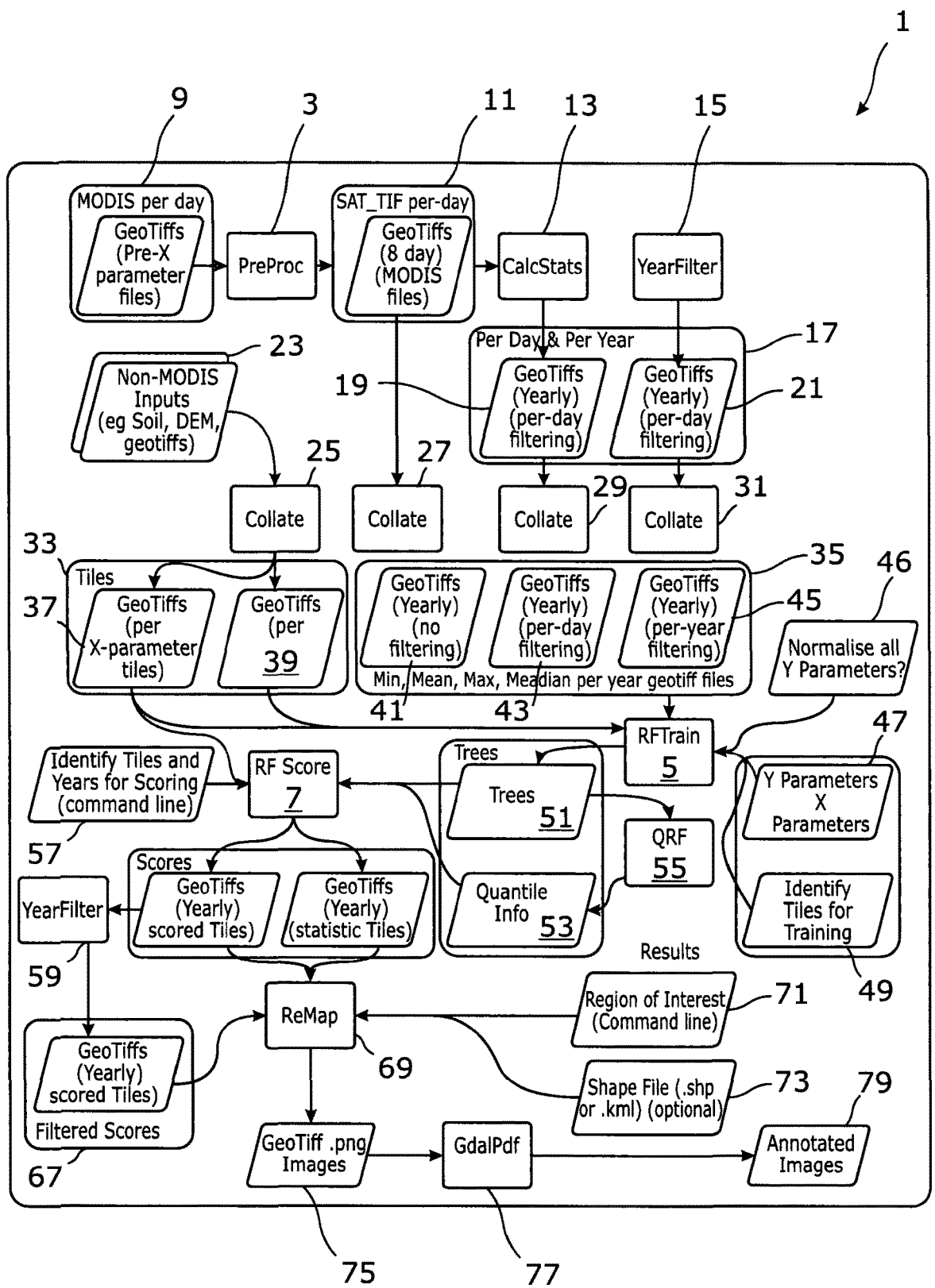
FIG. 1 is a diagram showing process steps in an embodiment of the present invention.

The present invention provides Earth observations and analytics in a three stage process. FIG. 1 is a diagram showing process steps in an embodiment of the present invention. FIG. 1 is a flow chart 1 with the following features. A preprocessing function 3, a machine learning and Random Forrest Training function 5 and a Random Forrest Scoring function 7 all with a range of associated inputs. The preprocessing function has a Modis per Day data input 9 a Sat Tif 11 input and a calcstats function 13. Year filter 15. Per Day—Per Year Geotiff files 17 with daily filtering 19 and Yearly filtering 21. Non Modis inputs 23 such as Soil and Digital Elevation Models are shown. reference numerals 25, 27, 29, 31 show collation of processed data and Tiles 33 include collated geotiffs 35, per x tile 37, 39, geotiff annual 41 Geotiff yearly/per day.

RF train 5 requires input from and provides output to a number of data sources and functions as shown in FIG. 1. These are normalised Y 45, X and Y parameters 47, identify files for training 49, trees 51, quantile info 53 and QRF 55.

RF score 7 requires input from and provides output to a number of data sources and functions as shown in FIG. 1. These are Tiles and year identification 57, Year filter 59, Scores 61, Geotiff yearly tiles (scored) 63, Geotiff statistic tiles 65.

Remap 69 requires input from and provides output to a number of data sources and functions as shown in FIG. 1. These are Filtered Scores 67, Region of interest command line 71, Shape file 73, Geotiff images 75, PDF 77 and producing a final output of an annotated Image 79.

The functionality of the flowchart is described below.

1. Pre-processing—extracts required image bands from downloaded files, and remaps them to either global tiles, or specific Area of Interest (PreProc). Generates per-year statistics from within year satellite imagery at any temporal resolution (ie min/mean/max/median across all n images acquired each year, n being any integer).

Time-series filtering may be applied for both within-year (for example CalcStats) and across years (YearFilter for example), where filtering across years is for the descriptive statistics extracted from within year imagery over more than 2 years. This step in the process is facilitated by the application of temporal signal processing to filter a time-series of remote sensing images.

The signal processing step may run on individual pixel locations within the image.

The signal processing smoothes out the signal noise for each pixel within a year or with respect to a growth cycles within a year.

Descriptive statistics are extracted from statics from the pixel's filtered frequency data. The signal processing can then be run between years when comparing values between years.

2. Training—this is the core machine learning processing and is exemplified with here with an example of the ran-domForest machine learning software (eg RFtrain in the Figures). For this example random forest decision trees are constructed which relate how the various input X-parameter values map to the range of possible Y-parameter values, through a regression (or classification) process. An additional step develops an decision tree analysis generates a quantile regression uncertainty analysis, which calculates confidence levels for the accuracy of each estimated value. Advantageously, the present invention has designed the machine learning process for memory (eg RAM) optimization and parallel central processing unit (CPU/GPU) computing.

3. Scoring—applies the decision trees created during training to a potentially new Area of Interest to determine the Y-values for the known X-values (RFscore for example). Finally, calibrated output images are generated (Remap) corresponding to the specific polygonal regions defining the Areas of Interest, or the coordinate bounding box of the target area, with the option of providing annotated scaled, colour-coded reports (GdalPdf). Scoring benefits from the improved performance in training.

Figure 2:
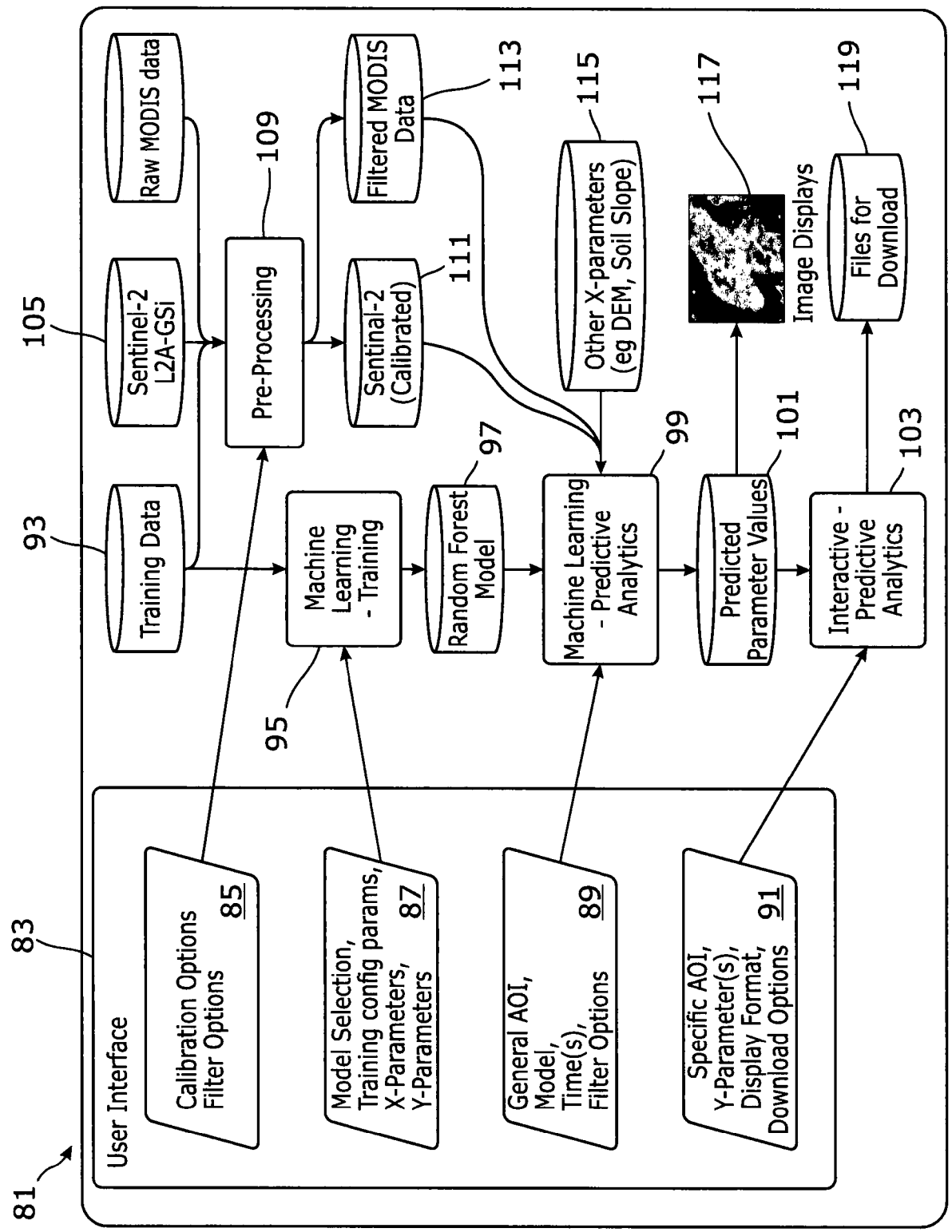
FIG. 2 is a diagram showing the machine learning steps in an embodiment of the present invention.

The Machine Learning System as shown in the schematic flow diagram 81 of FIG. 2 which has the following features. The user interface 83 comprises calibration/filer options 85, model training parameters 87, AOI, model, time, filter options 89, specific AOI Y parameter, display format and download options 91. Training data 93 is input to machine learning training 95, a Random Forest model 97, Machine learning predictive analysis 99, predicted parameter valves 101, Interactive predictive analysis 103.

Sentinel 2 earth observation input data 105 is pre-processed 109 and calibrated 111.

Raw modus data 107 is pre-processed 109 and filtered modus data 113 used in the machine learning predictive analytics along with other parameters 115. Display images 117 and files for download 119 are provided.

Machine Learning is utilised to produce the deliverable data, for regression and/or classification. A Random Forest based approach is used here to demonstrate an example of the machine learning software that can be optimized and used in the process. The machine learning uses as input a variety of images, each representing a specific parameter; either as a target parameter (to be used for training, and to be subsequently provided as the results of the predictive analysis), or as a reference parameter (upon which the predictions will be made; these include satellite imagery, such as from MODIS, Proba-V, Landsat or Sentinel sensors). A summary of the main steps in the Machine Learning processing is presented in FIG. 2.

The embodiment supports use of any remote sensing imagery, including MODIS, Proba-V, Landsat and Sentinel, including data obtained from both passive and active sensors.

Pre-Processing involves the remapping and co-registration of data from other sources, for use in the training process. These include the independent variables (X-parameters), such as satellite-derived products, including imagery from MODIS, Proba-V, Landsat and/or Sentinel, Discrete element method (DEM) derived parameters (such as slope, aspect, elevation), and soil-derived parameters. They also include any target variables (Y-parameters), which may be user-supplied information for a number of measured samples, or may be reference (historic) data obtained from other sources, such as land-use maps, or other more targeted information provided by regional or national organisations, such as gridded data containing forestry-specific attributes.

Figure 3:
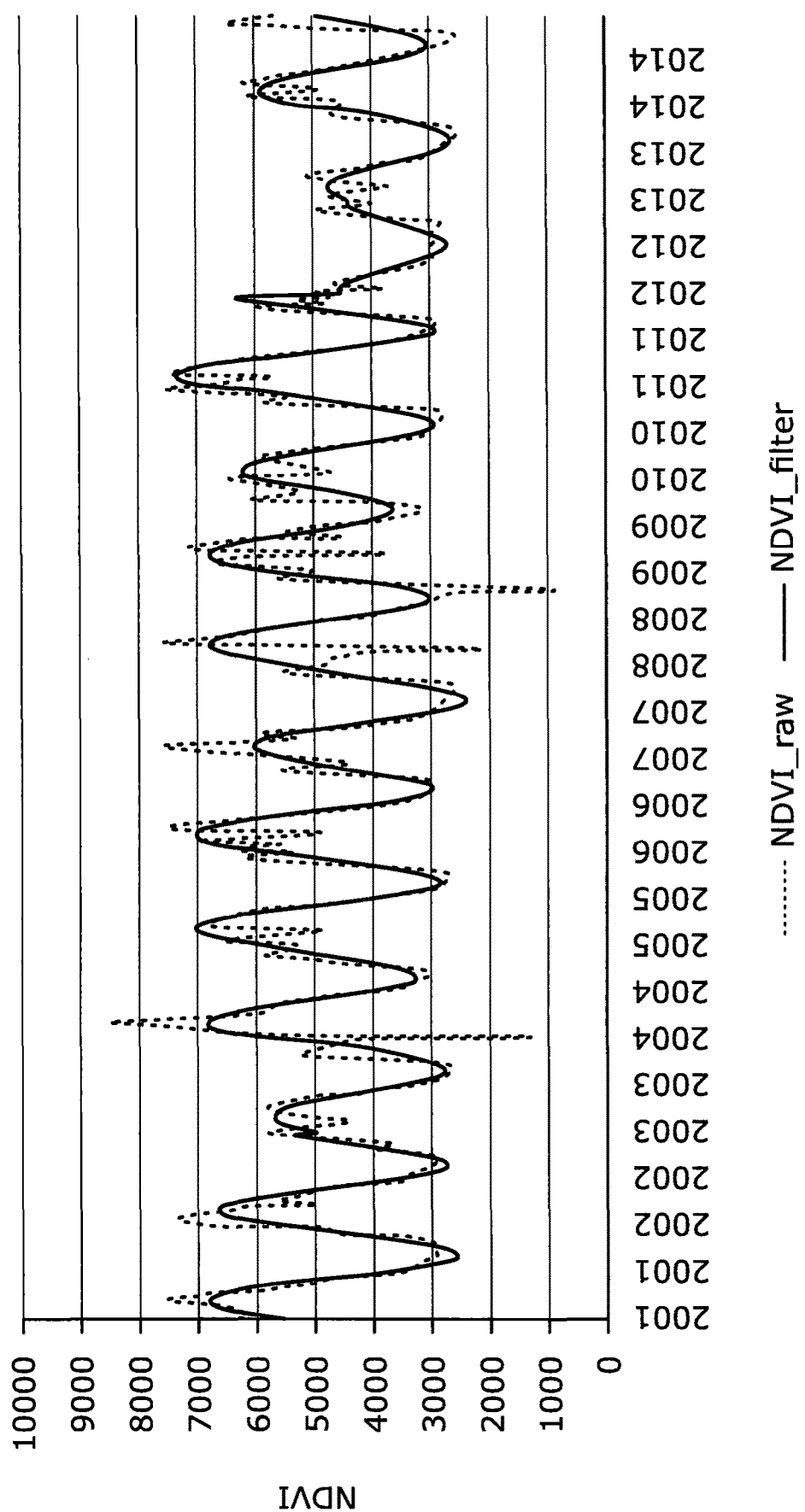
FIG. 3 is a graph which compares signal filtering achieved using an embodiment of the present invention with signal filtering achieved using standard techniques.

Pre-processing further comprises creating per-pixel time-series filtering, to reduce the effect of anomalous values (e.g. cloud contamination and/or other sources of signal noise). The pre-processed images and data are stored in a defined directory structure, ready for ingestion into the main Machine Learning part of the processing FIG. 3 shows an example of the signal filtering utilized in the Pre-Processing. It is a graph 121 which plots NDVI on its Y axis 123 and Year 125 on its x axis. Curves 127, 129 show NDVI Raw data and NDVI filtered data respectively. The graph shows 1 pixel sampled every 8 days from MODIS data for NDVI between 2001 and 2014. The blue line is the raw data that which clearly shows the noise from frequency spikes. The line 127 (B) is what is standard in academic research. The line 129 (R) provides users with additional statistical information, including error in the blue line on a per-pixel basis. the system and method of the present invention can implement the same time-series filtering on any imagery at any resolution, including Proba-V and Landsat. This allows for the creation of new highly accurate geospatial data used as inputs to the machine learning.

The present invention provides a way to make more accurate and quantifiable predictions whilst also reducing costs. Accordingly, the present invention is capable of not just analyzing one or two images, but hundreds of thousands, to help develop a big data time-series analysis. With machine learning you provide more accurate, quantifiable observations whilst removing the need for costly manual interpretation.

Figure 4:
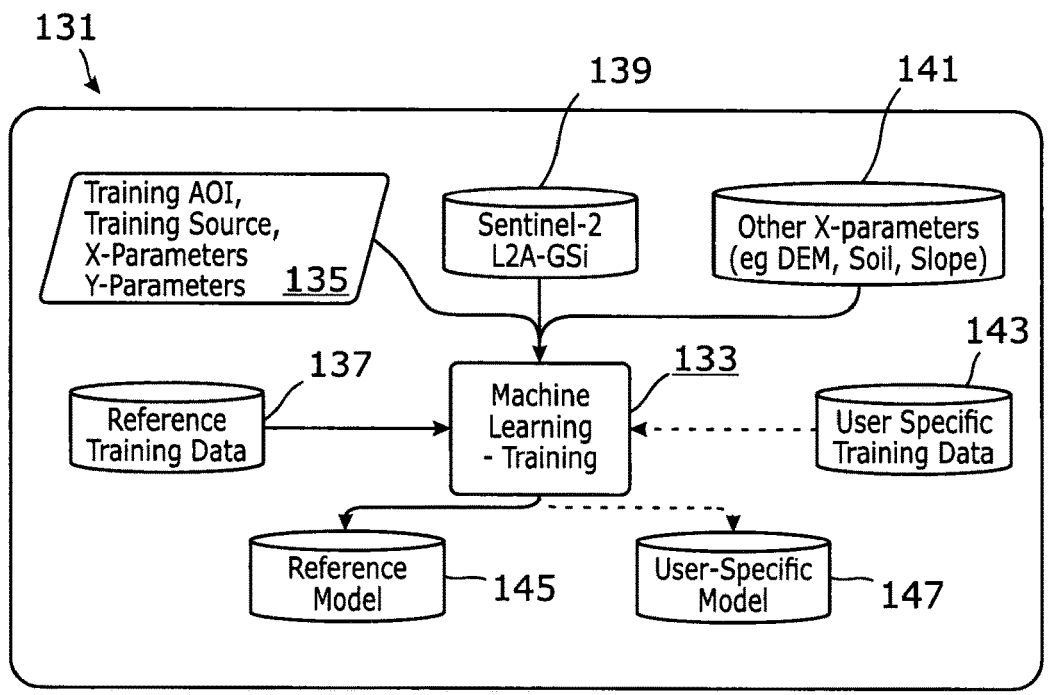
FIG. 4 is a diagram that shows an example of machine learning training in accordance with the present invention.

FIG. 4 is a diagram that shows an example of machine learning training in accordance with the present invention. The machine learning/training function 133 has inputs from Training AOI, source, X and Y parameters 135, sentinel 2 data 139, other parameters such as DEM, slope and soil 141, reference training data 137 and user specific training data 143. The output is a reference model 145 and a user specific model 147.

The training phase of the method of the present invention, FIG. 4, incorporates a novel implementation of the "Random Forest" machine learning model to generate decision trees, based on the specified training datasets (Y-parameters), and the selected independent variables (X-parameters), which can include satellite-derived parameters, such as NDVI, as well as other datasets, such as elevation, soil type, etc.

The training data can be provided by the user (if they have appropriate historical in-situ or "ground truth" information) in the form of CSV files, with latitude/longitude and associated measured value(s) at each sample location, with the output from the Training being a user-specific Model. If the user has no available training data, then an off-the-shelf database repository of "reference" training data covering a range of land attribute data, such as forestry attributes at different spatial resolutions can be used as an alternative (though less-tailored to local environments) training solution, with the output from the Training being a Reference Model, as illustrated below.

The present invention comprises a model which can run classification and regression functions for:

1. Univariate output data (i.e., forest type or volume, or a single crop yield) as an independent model.
2. Multivariate output data (linked data, such as forest height, basal area, volume and biomass, or multiple crop types) as a single unified model, or,
3. Multivariate output data summing 100% (i.e. % hardwood and % softwood for a single pixel).

Figure 5:
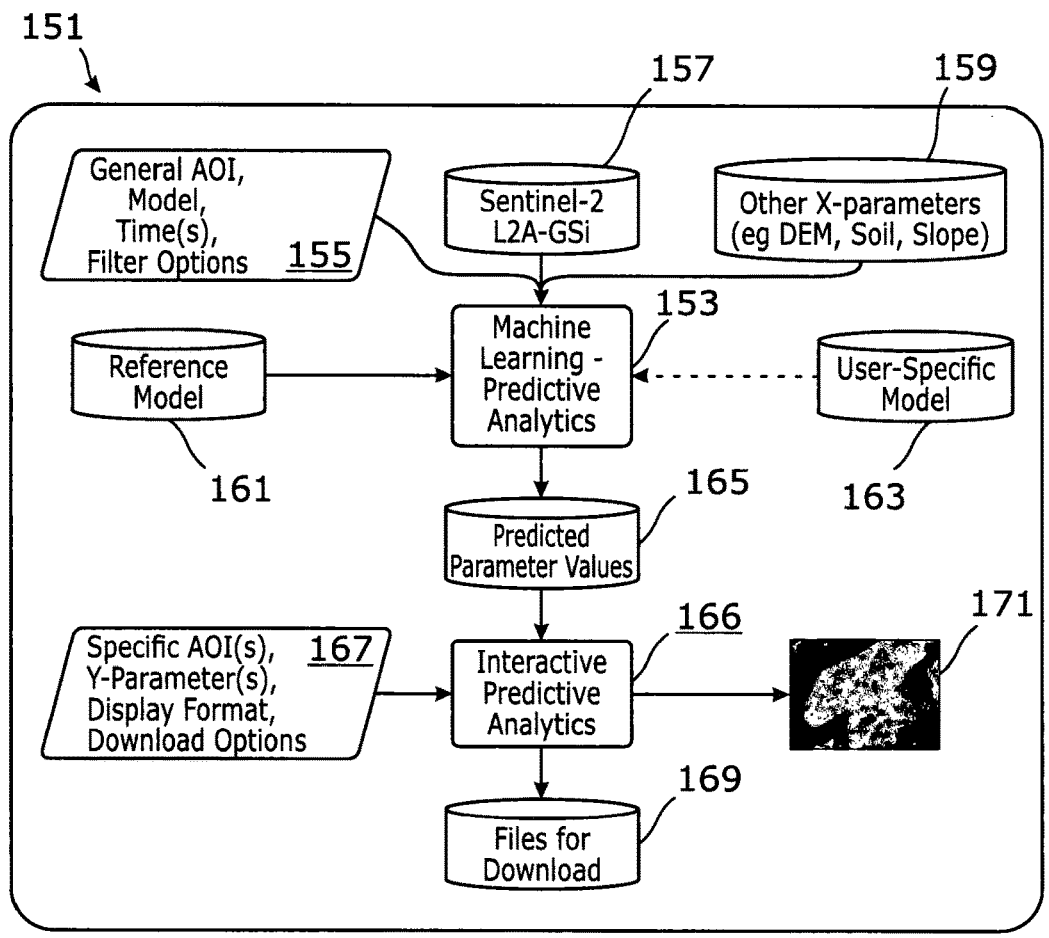
FIG. 5 is a diagram that shows an example of machine learning predictive analysis in accordance with the present invention.

The outputs from the Training step are Models which each consist of a "forest" of decision trees, along with associated statistical quality information, derived from quantile regression that quantifies the confidence associated with the subsequent predicted value for each pixel. The quantile regression allows us to produce maps for the uncertainties of all target data processed through our system. This allows us to also give clients spread of possible values for the land assets in which the client is interested Having developed a Model by training the Machine Learning system with a suitable set of training data, this Model can then be applied to any other region for which the same set of X-parameters are available, using these data, the corresponding Y-parameters can be predicted, on a per-pixel basis as is shown in FIG. 5. The machine learning predictive analytics module 153 has inputs related to the general AOI model, time and filter options 155, Sentinel 2 data 157, other parameters such as DEM, slope and soil 159, a reference model 161 and a user specific model 163. It outputs predicted parameter valves 165. Interactive predictive analysis 166 uses specific AOI, Y parameters, display format and download information along with the predicted parameter valves 165 to create files for download 169 and images 171.

There are two stages to the Predictive Analytics; the first stage is to define the processing to be performed and the second stage involves interactive selection of the specific outputs for display and/or download.

For the first stage, the inputs for the Predictive Analytics are defined by the user, and the processing is started. The Predictive Analytics software will then generate output images covering the specified general AoI corresponding to the specified time, for each of the Y-parameters originally used in training for the selected Model. This processing could take a significant amount of time, if a large general AoI has been specified and/or multiple time periods have been selected.

For the second stage, the user analyses the results, and generates consolidated output for the precise Area of Interest (including mosaicking across remote sensing tiles tiles, if necessary, and applying shapefile-defined masks for the specific area of interest, as well as generating "user-friendly" colour look-up tables for presenting the resulting imagery in a clear and meaningful format (as .png files or pdf files, ready for inclusion in web pages or in reports.

The most processing-intensive part of the original machine learning code (Random Forest in source C) regression/classification was in the training part, where all the training data for all parameters needs to be accessible more-or-less simultaneously, as well as the derived decision tree structures; this involves complex data and memory management, as well as significant amounts of arithmetic operations. Thus the focus for optimisation was this core part of the decision tree growing algorithms.

Figure 6:
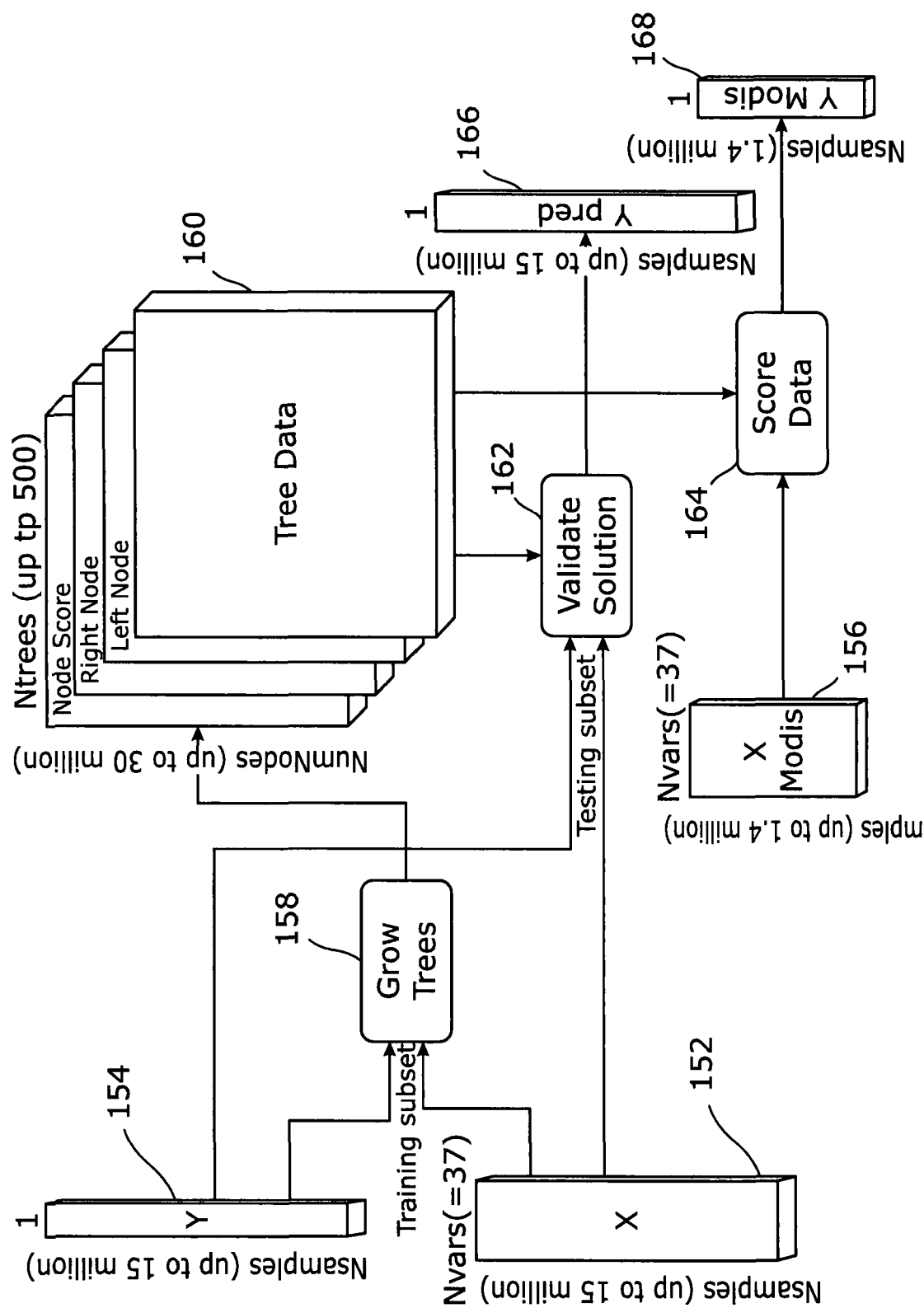
FIG. 6 is a block diagram which shows an example of Random Forrest Processing.

In examples of the invention where Random Forrest processing is used, the present invention includes a process for optimisations performance by;
 a) Memory Optimisation; and
 b) Processing Speed Optimisation.
 a) Memory Optimisation FIG. 6 is a block diagram which shows an example of Random Forrest Processing 150. It shows X samples 152, Y samples 154 which are combined in a Grow Tree process 158 and in a validate solution process 162. The output of the Grow Tree process 158 is Tree Data 160 which is, along with the X sample data, an input to the valifate solution function which gives a predicted Y value 166. X modis 156 is combined with the Tree Data at the Score Data function 164 to give a Y Modis output 168.

In this example of known Random Forrest processing, nearly all the memory is being consumed by a number of massive 2D "double" arrays (called "Tree Data" in the diagram), indexed by Nsamples (up to 2*Nsamples=2*15 million) by Ntrees (up to 500). This contains all the information needed by the random forest algorithm for each "tree" in the "forest", which includes information about the structure of each tree, in terms of its branches, nodes and decision criteria.

Each tree is quite independent of every other tree (a fundamental property of "randomForest").

Figure 7:
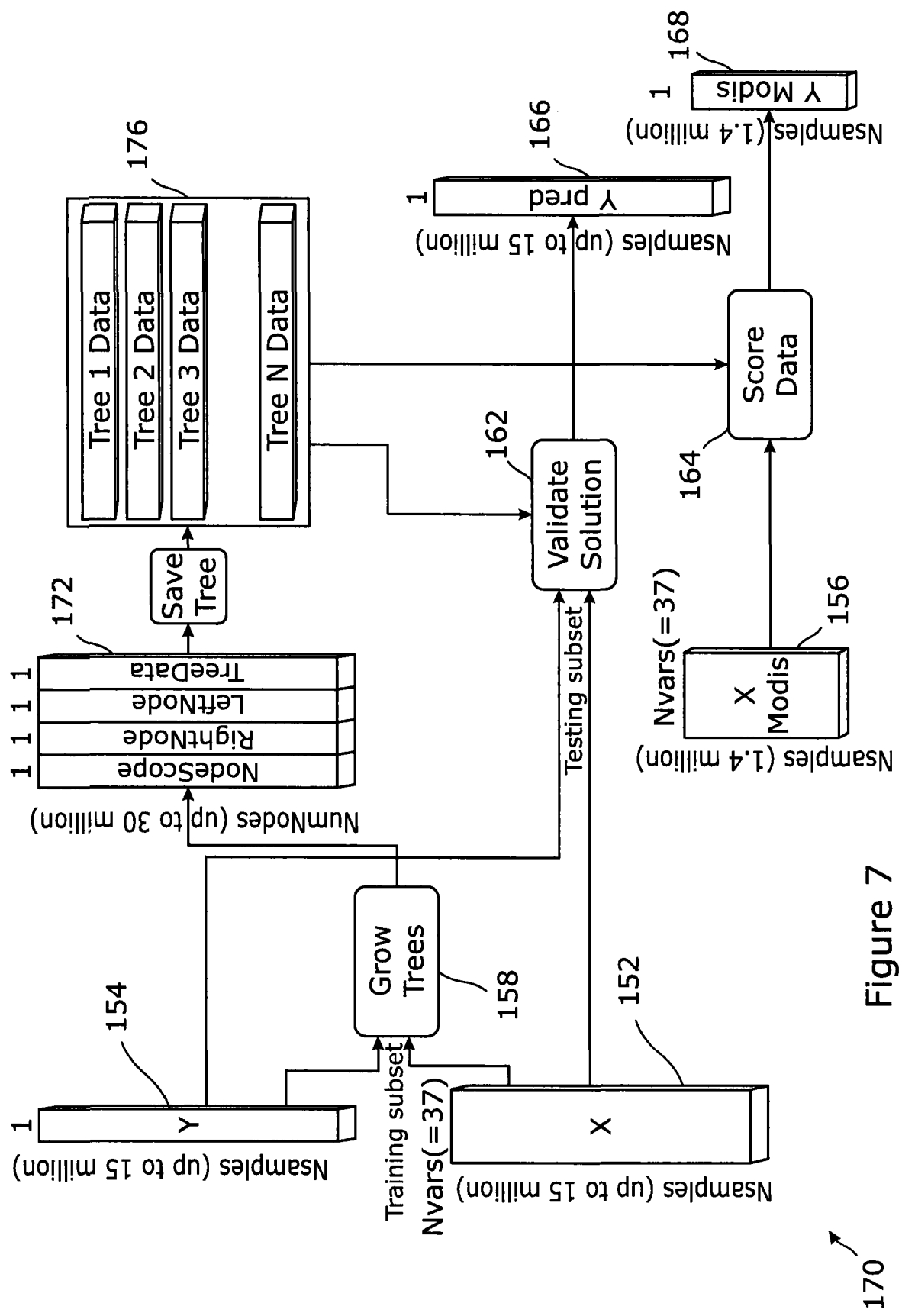
FIG. 7 is a block diagram which shows a technical solution of the present invention wherein the 2D arrays are replaced by 1D arrays.

FIG. 7 shows a technical solution of the present invention wherein the 2D arrays are replaced by 1D arrays 172 (indexed only by N samples). The information for each tree is stored 174 in a disk file (one per tree); these files can then be collated 176 once all the trees have been generated, which is the time-consuming part of the processing.

This novel technical solution considerably reduces the memory requirement by a theoretical factor of 500, if there are 500 trees (in reality, the memory reduction is not quite so great, as there are numerous other data structures needed). This means that instead of needing many hundreds of Gigabytes of RAM with the original RF software in C, the updated a version of RandomForests was implemented needing only a few Gbytes of RAM (well within the scope of "normal" desktop machines). This core change in structure of processing is shown in the following diagram, which reflects the new processing:

With the revised approach, only data associated with a single tree needs to be held in memory at any one time, instead of data for all trees simultaneously.

A further memory optimisation was to store and process all data internally as 16-bit integers, which as well as reducing the overall memory requirement by a factor of four (compared to storing as doubles), also has the benefit of faster processing (see below).

b) Processing Speed Optimisation

Figure 8:
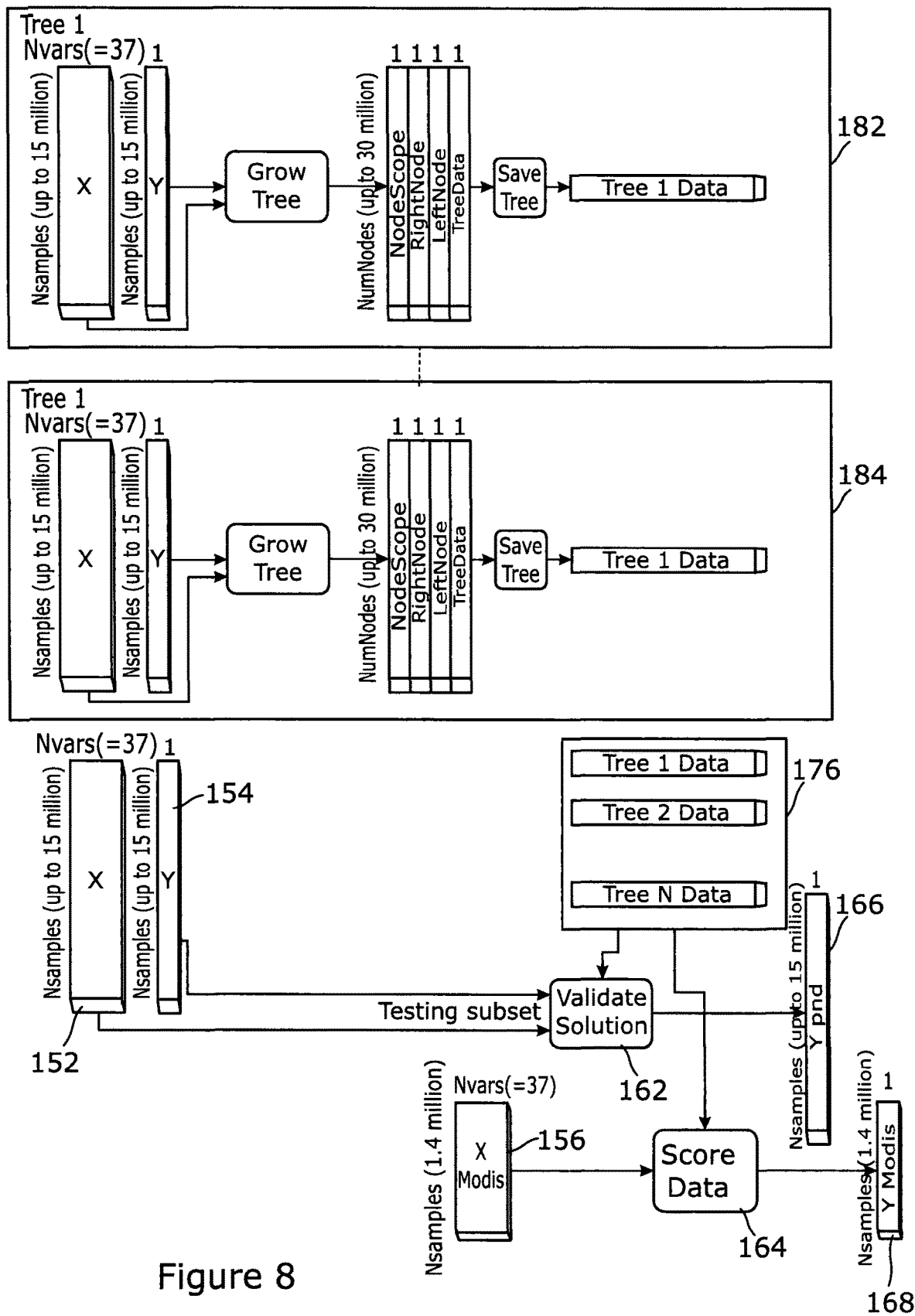
FIG. 8 is a block diagram which shows an example of process speed optimisation in accordance with the present invention.

The above approach for reducing memory also lends itself very well to parallel processing as shown in FIG. 8. Each tree can be processed (though multi-threading) on a separate core of one CPU 182, 184 or on separate CPUs (if the machine has more than once CPU), or indeed on separate machines (if all machines have a shared disk/file structure). Thus, the revised scheme allows for N-fold parallelisation of the core "tree growing" part of the processing, giving an effective (N-1)-fold reduction in processing time, as the final step of validation and scoring takes no longer than growing a single tree.

Significant performance improvements were also obtained by extensive re-design of much of the processing code, affecting all parts, with systematic optimisations covering: Examples of performance optimization Sequential vs Parallel Processing: Original vs Current RF Software Given the same set of input X-variables, and required output Y-values, with the same number of input samples and the same number of trees, the comparable elapsed time for processing the Random Forest (Training part, which was the most CPU-intensive, and memory-intensive part) can be summarised as follows:

Original Elapsed Time~=(Original Time to grow one Tree)*(Number of Trees)*(Number of Y-variables)

Where:

Original Time to grow one tree is unoptimised, and all processing is sequential; ie each tree is grown sequentially, one after the other, and each Y-variable is solved—for sequentially, one after the other, each requiring a new set of trees to be computed in turn.

New Elapsed Time~=New Time to grow one Tree

Where:

New Time to grow one tree is ~100* faster than before (following code optimization), and Assuming:

all trees processed in parallel (eg 10 trees=>10 times faster [overall 1,000 times faster])

Multivariate Random Processing, so all output Y-variables computed in parallel (eg if 10 Y-variables, then 10 times faster again [overall 10,000 times faster]).

If processing multiple MODIS tiles in parallel, using HPC batch processing, then even faster processing times are achievable (though in practice, such batch processing parallelisation may have been possible with the original software, but this was never tested, as it was incapable of processing the volumes of data needed for a single tile).

It is a complex task to compare the current performance of the present invention with the original Open Source implementation of Random Forest training.

It is therefore necessary to scale-up from the original system, using models of the projected performance improvement, based on the (limited) range of performance figures obtained from the original system (up to the data volumes at which it crashed—due primarily to memory limitations).

The performance has been optimised through a combination of measures, including:
 Complete re-design of internal data structures and typecasting for optimum performance, and minimisation of memory usage.
 Optimisation of performance-critical sections of code (eg changing ordering of data indexing, optimising use of re-initialisations of arrays, optimising extent This section has been provided to show the calculations behind the statement that the present invention is 100,000 times faster when compared to standard open source software.
 of array copying, minimising processing performed within innermost loops, etc.).
 Use of multithreading, within the process, and through running multiple processes in parallel across multiple CPUs and machines.
 Introduction of multivariate regression, thereby solving for multiple target values in parallel
 Porting to higher-performance machines, with faster processors and larger RAM.

A summary of the results is shown in the table of FIG. 9 which shows a calculations table 181, columns for Sample size 182, No of calculations open source 183, No of calculations present invention 185 and No of calculations scaled up version of present invention 187.

Throughout the optimisation process, frequent checks were made to ensure that the results generated by the optimised code remained consistent with those generated by the original code.

Broadly speaking, the main performance gains can be broken down according to the following:

| | |
|---|---|
| Core processing software redesign = | 100× cumul = 100× |
| Internal process hyper-threading = | 10× cumul = 1,000× (assuming 16 cores per CPU) |
| Multi-variate Regression = | 10× cumul = 10,000× (assuming 10 Y-vars) |
| Faster machines = | 2× cumul = 20,000× (per-core speed) |
| Parallel processing across many machines = | 5× cumul = 100,000× (could be more!) |
| TOTAL = | 100,000× |

Thus, an increase in performance of 10,000-fold is achievable on the same original machine, and if multiple more powerful machines are used, then the performance can be improved by at least 100,000 times (or even more, if more cores and machines are used in parallel—the revised architecture allows for a considerable degree of parallelisation).

These performance improvements (compared to the original) mean that analyses which would have taken several years to run (assuming a machine with sufficient memory could be used), can now be completed in a few hours, making it feasible to apply the sophisticated Random Forest regression and classification techniques to large-scale Earth Observation applications using long time-series of data, such as those already addressed by GSi, covering forestry, agriculture and the environment.

Figure 10:
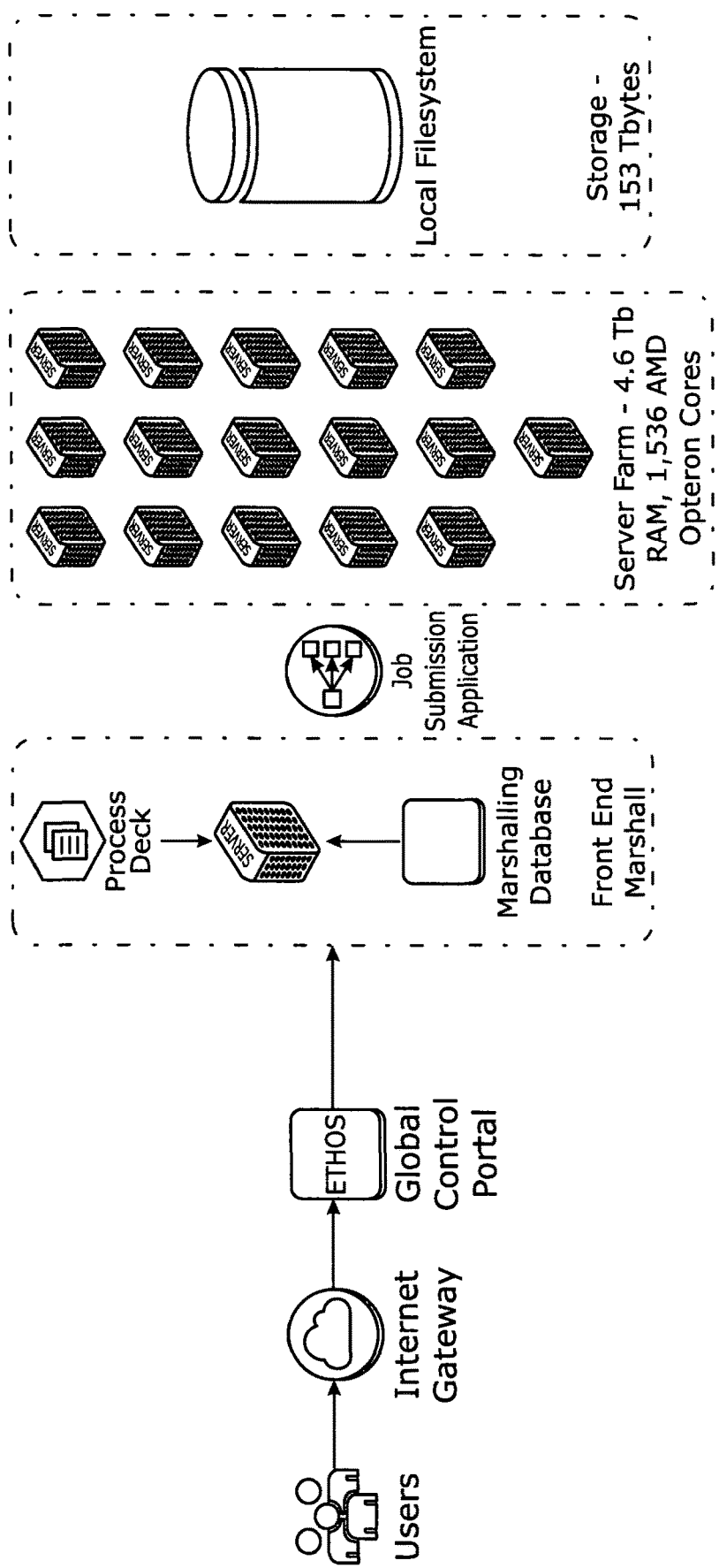
FIG. 10 is an example of a system in accordance with the present invention.

Embodiments of the present invention use a super computer cluster with extremely fast processors, massive RAM and low latency disk interconnect The server can be accessed from anywhere in the world via the users favoured. FIG. 10 shows an embodiment of a system 191 in accordance with the present invention with the following features system architecture. The figure shows a user 193 with an internet connection 195. A control portal 195, front end 197, a computing array 199 and a local file system 201.

Figure 11:
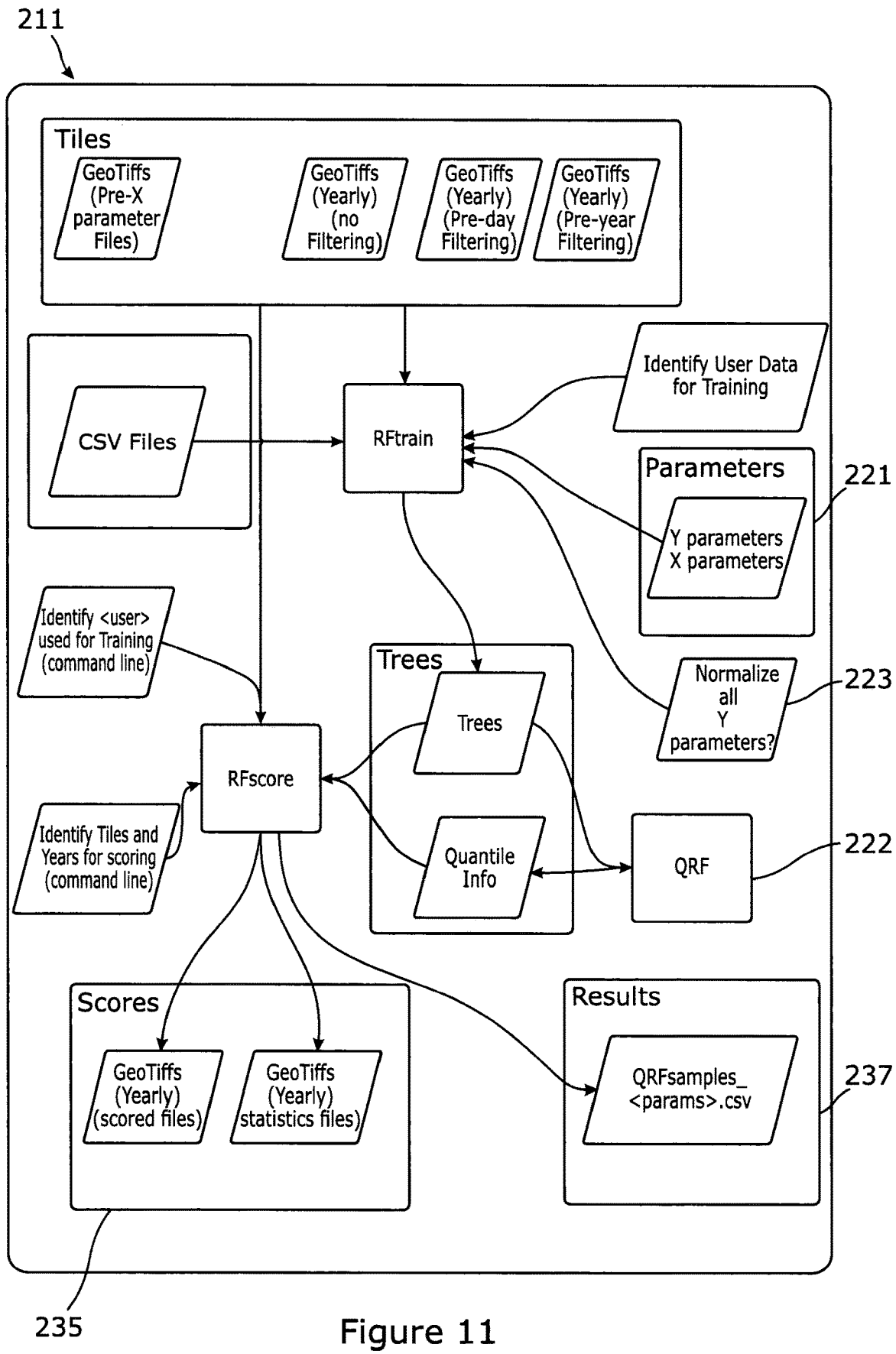
FIG. 11 is a diagram that shows a mechanism for using CSV files containing training samples.

FIG. 11 is a diagram 211 that shows a mechanism for using CSV files containing training samples. GeoTiff tiles 213, user data for training 219, user CSV files 215, X and Y parameters 221 and normalized Y parameters 223 are input to the RF train function 217. The output from RF train is input to trees 227 along with QRF (Quantile Regression Forest) 222. The output from Trees 227 is an input to RF score 229 along with tiles 223 and Training command line 225 and Identify tiles and years for scoring 231. The output of which is scores 235 which are GeoTiff yearly scored files and GeoTiff yearly statistics files and QRF sample results 237.

It illustrates the differences regarding input and output files when using (user-provided) CSV files (as target Y values) for training, with MODIS and other imagery as X-values, relying on the latitude and longitude specified in the CSV files for locating pixels in the imagery. The results of this training (the decision trees) can then be applied to whole MODIS tiles imagery.

The following examples illustrate the operation of the method and system of the present invention. As shown below, the present invention provides a quantifiably improved technical result because the data processing used in the present invention provides the user an improved ability to monitor biomass without the need for extensive, ongoing ground measurements. In addition, the system and method of the present invention achieves this result with a significant improvement in computing performance.

Within Year Filtering means tracking the change in vegetation as it goes through the seasons. For herbaceous vegetation such as grassland and cropland, this is the full amount of vegetative matter produced per unit area through the duration of a year. For forested areas, this means the growth of all live matter (leaves, stems, roots and all). The present invention does this by first building a database directory for a specified senor and imagery product.

Figure 12:
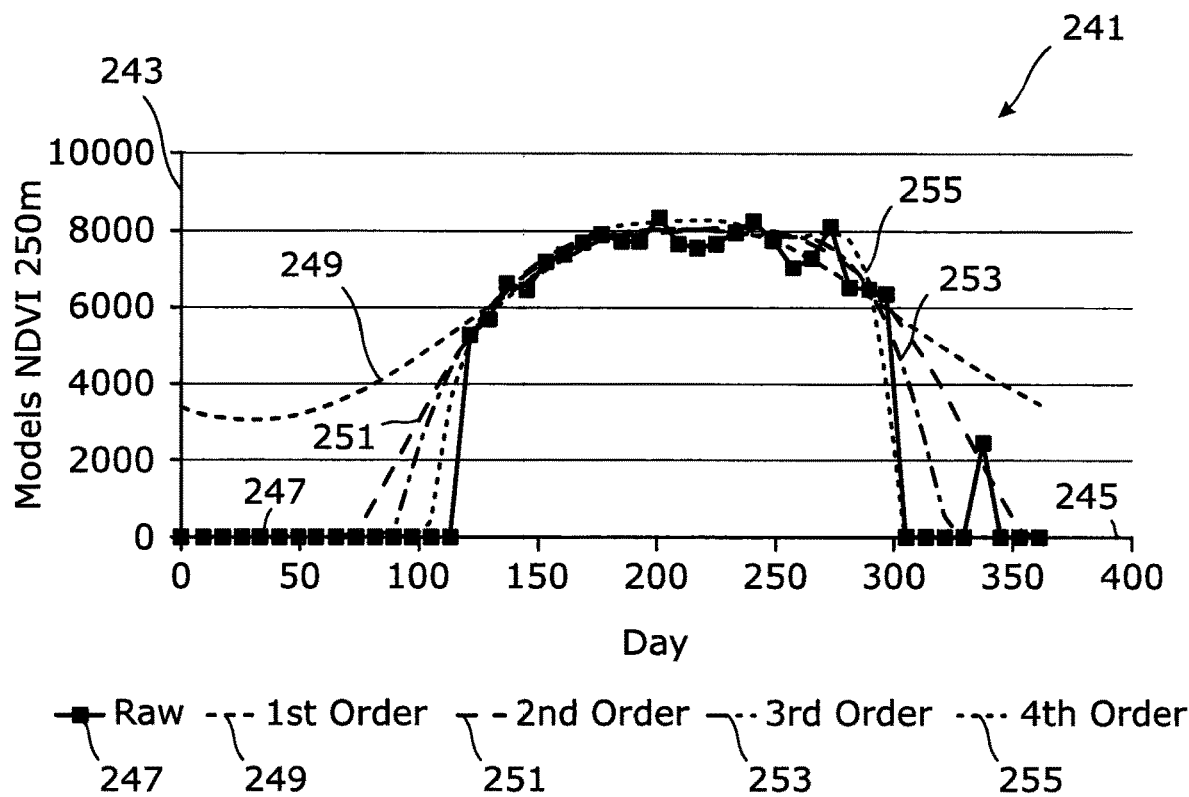
FIG. 12 is a graph which shows MODIS 8-day NDVI across 2015.

FIG. 12 is a graph 241 which plots MODIS 8-day NDVI on a Y axis 243 and days in 2015 on the X axis 245. Curves are shown for raw data 247, 1st Order data 249, 2nd Order data 251, 3rd Order data 253 and 4th Order data 255.

The raw data here represents 8-day NDVI processed with 8-day PR layer to remove low quality pixels. The 8-day replication is the 1st day (1 Jan. 2015) through the 365th day (31 Dec. 2015) of the year. The raw data contains noise typical of sensed data over time. This noise is exemplified in the ups and down between 8-day sensed measures. None of the standard MODIS data products are processed with filtering methods typically found in the field of signal processing.

The present invention runs signal processing filters for within year remote sensing data. It processes remote sensing with a range of signal processing methods, including Fourier and Kalman filtering and smoothing. FIG. 12 shows the application of the Fourier filter to NDVI where the 8-day NDVI is processed and smoothed at the 1st, 2nd 3rd and 4th Fourier order of magnitude. The 8-day frequency is smoothed depending on the order of magnitude processed through the Fourier equation.

Figure 13:
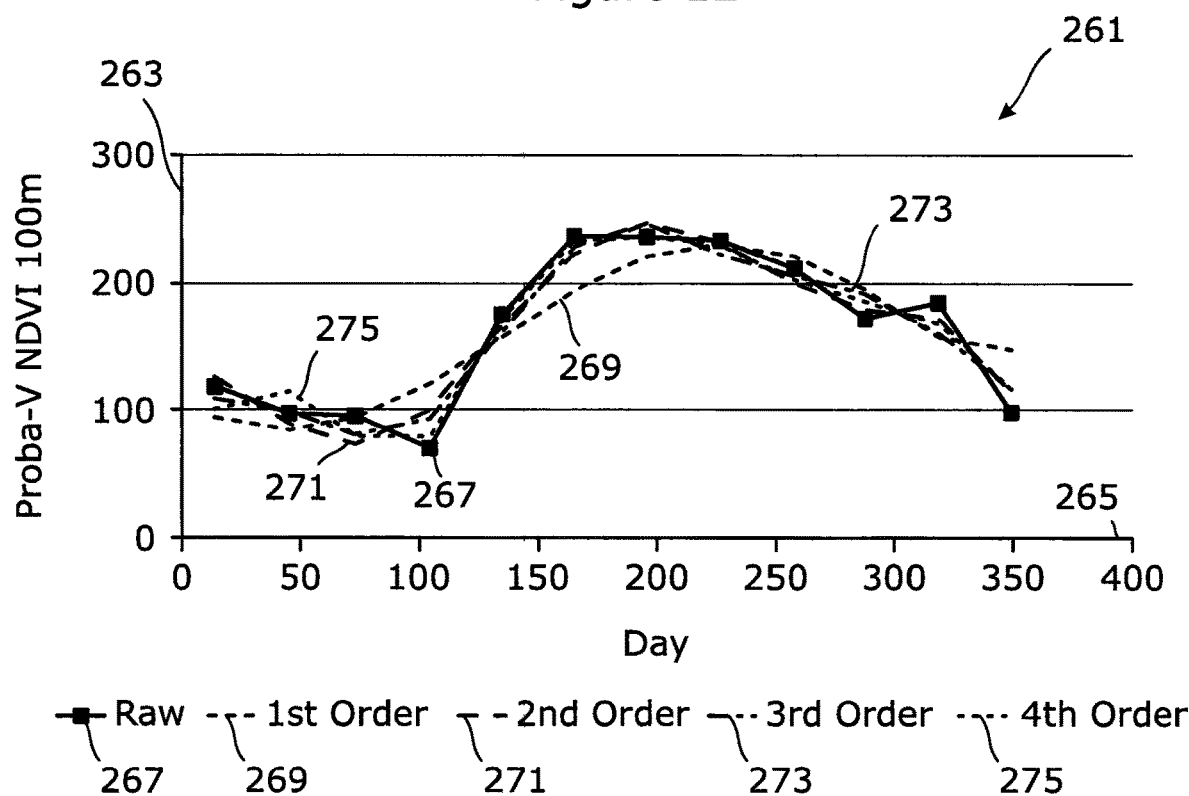
FIG. 13 is a graph which shows Proba-V 100 m NDVI values across 2015.

FIG. 13 replicates the filtering and smoothing analyses, but with Proba-V 100 m NDVI Values. FIG. 13 is a graph 261 which plots Proba-V 100 m NDVI on a Y axis 263 and days in 2015 on the X axis 265. Curves are shown for raw data 267, 1st Order data 269, 2nd Order data 271, 3rd Order data 273 and 4th Order data 275.

Whilst there are less replicates in the time series, the same basic frequency pattern exists as with MODIS, which again is a measure for annual phenology. The signal processing software is then run on the raw Proba-V NDVI data to smooth it with the same orders of magnitude from the Fourier filter.

Figure 14:
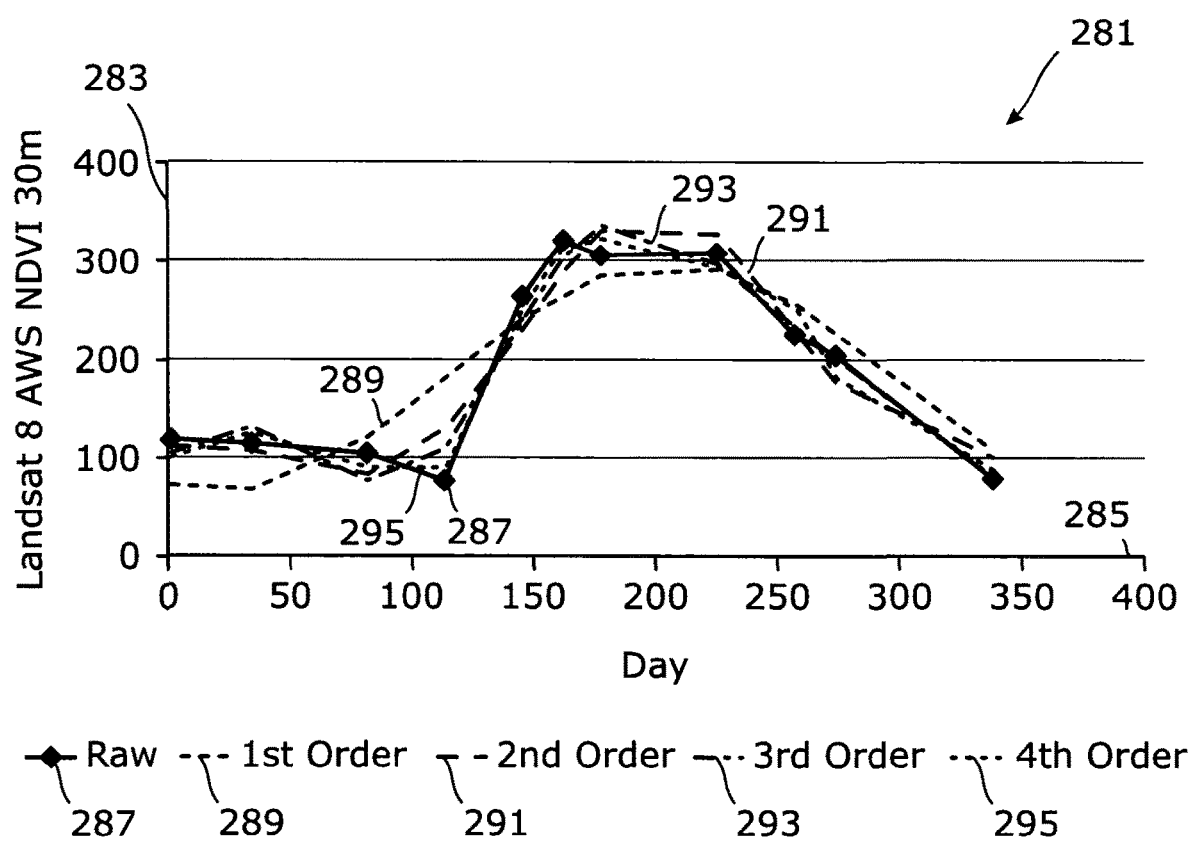
FIG. 14 is a graph which shows Landsat 8 AWS NDVI data at 30 m resolution across 2015.

In FIG. 14, signal processing is shown with applied to Landsat 8 AWS NDVI data at 30 m resolution. FIG. 14 is a graph 281 which plots Landsat 8 AWS NDVI on a Y axis 283 and days in 2015 on the X axis 285. Curves are shown for raw data 287, 1st Order data 289, 2nd Order data 291, 3rd Order data 293 and 4th Order data 295.

As with both MODIS and Proba-V, the raw data contains a degree of noise over time. Smoothing of the raw NDVI frequency, and the 1st to 4th order of magnitude from the Fourier equation is demonstrated here. It is noted that growth phenology is generally consistent over time for all sensors and resolutions.

Figure 15:
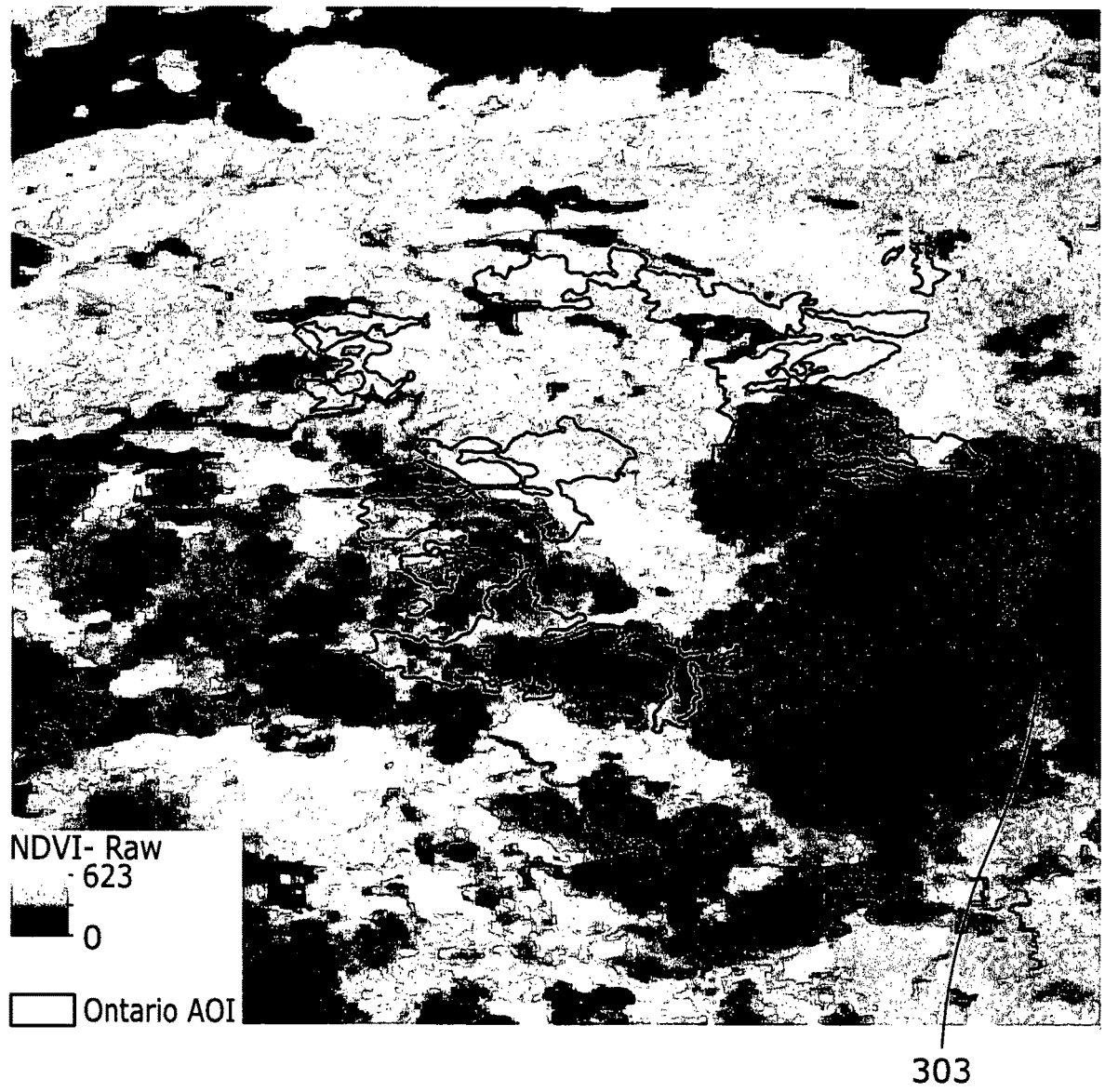
FIG. 15 shows a black and image for Landsat 8 AWS NDVI at day 162 (June 11) of 2015.

FIG. 15 shows a black and white image for Landsat 8 AWS NDVI at day 162 (June 11) of 2015. It is important to note the darker shape noise 301 through the centre of image. This dark noise is cloud cover, which distorts the raw data in the image.

Figure 16:
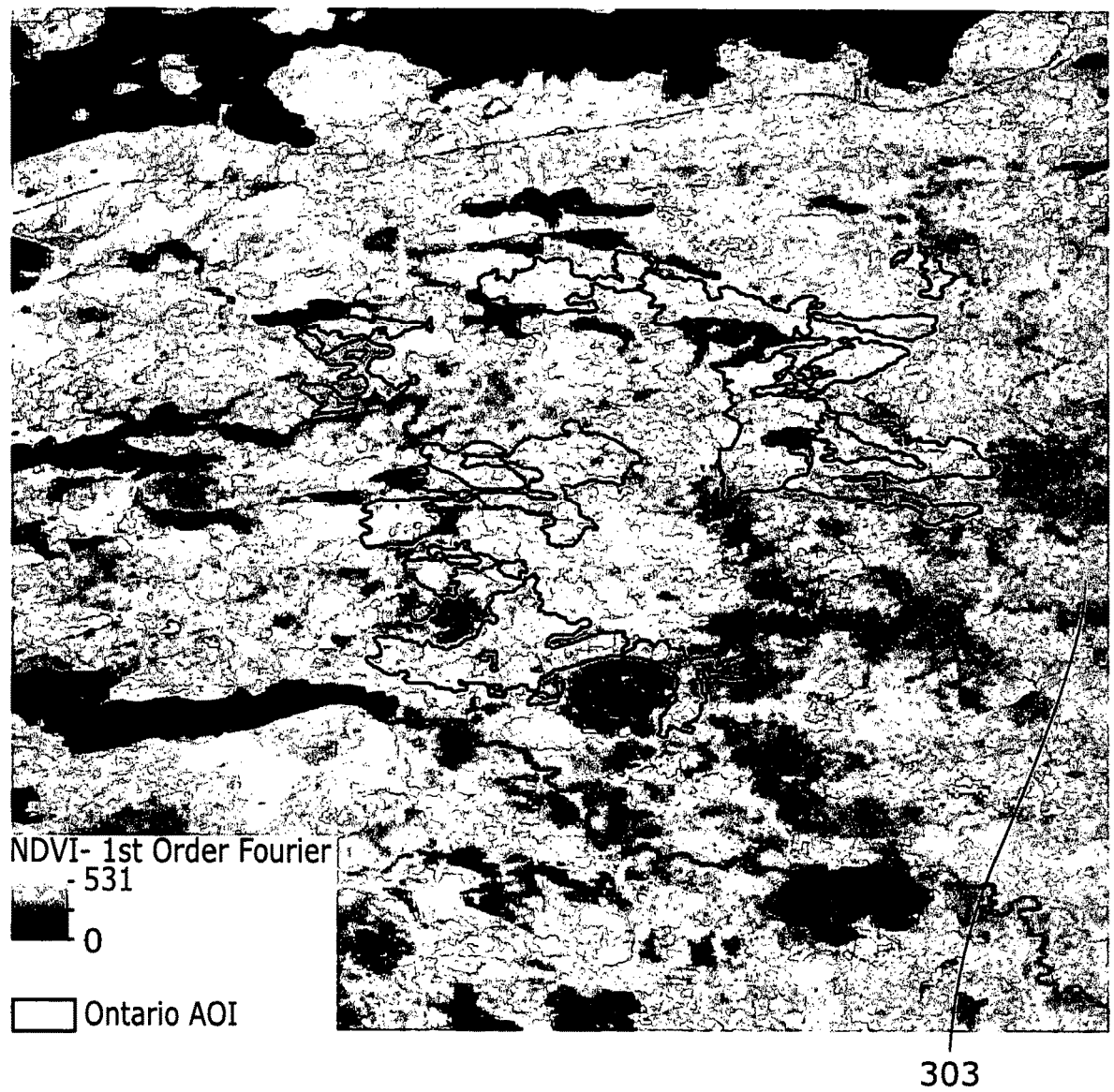
FIG. 16 shows a black and image for CalcStats output for the same day.

FIG. 16 shows output for the same day using data processing in accordance with the present invention. It shows a smoothed image at the 1st order magnitude from the Fourier filter. The noise derived from the cloud cover has been removed 303 from the Landsat image. Without the noise removed, the Landsat image cannot be used to assess the underlying AOI because of the cloud cover contamination.

The novelty of signal processing of the present invention as demonstrated here is that it applies signal processing methods with image processing software and can be run on any remote sensing data. It can be run on any group of images representing a time series from one sensor and remove or reduce sensor noise over time. This means it can increase the value of existing remote sensing imagery by reducing and removing signal noise. In application, the newly cleaned imagery output creates a new high quality imagery set which is unavailable through other processing methods.

Once the images have been processed as described above, on the within year data, the next element is to automatically generate annual descriptive statistics per pixel from the filtering and smoothing. By annual descriptive statistics, we mean the annual minimum, annual median, annual mean and annual maximum value for all pixels in an image.

These descriptive statistics are useful for calculating vegetation attribute values that do not reflect within year phenology, such as growth. Examples of such values include tree volume, tree height, tree dbh (diameter at breast height), percentage land cover per pixel, and carbon stocks. It is impossible to track these values using within year data because of the effects of growing season phenology. The point here is that the annual descriptive statistics change very little in undisturbed places. For example, when considering NDVI, annual descriptive statistics values should go up in value year on year, but the variance between year should be little. When there is a disturbance, the value is initially measured by the within value, but can only be tracked year on year. For NDVI, a disturbance in July 2014 should be measured as a decrease in 2014 from 2013, and then a decrease again between 2014 2015, because half of 2014 had no change prior to the disturbance.

FIG. 17 is a graph which shows the CalcStats annual descriptive statistics outputs for the same coordinate annual from MODIS. The graph 311 has MODIS annual NDVI 250 m on its Y axis 313 and data type on the X axis 315. Four types of data are plotted namely raw, 317, $1^{st}$ order 319, $2^{nd}$ order 321, $3^{rd}$ order 323 and $4^{th}$ order 325. In each case min 327, median 329, mean 331 and max 333 values are provide.

FIG. 18 is a graph which shows the CalcStats annual descriptive statistics outputs for the same coordinate annual from Proba-V. The graph 341 has Proba-V annual NDVI 250 m on its Y axis 353 and data type on the X axis 345. Four types of data are plotted namely raw, 347, $1^{st}$ order 349, $2^{nd}$ order 351, $3^{rd}$ order 353 and $4^{th}$ order 355. In each case min 357, median 359, mean 361 and max 363 values are provide.

FIG. 19 is a graph which shows the CalcStats annual descriptive statistics outputs for the same coordinate annual from Landsat 8 AWS. The graph 371 has Landsat 8 AWS annual NDVI 250 m on its Y axis 373 and data type on the X axis 375. Four types of data are plotted namely raw, 377, $1^{st}$ order 379, $2^{nd}$ order 381, $3^{rd}$ order 383 and $4^{th}$ order 385. In each case min 387, median 389, mean 391 and max 393 values are provide.

The annual descriptive statistics are shown for each sensor for the 1st to 4th orders of magnitude from the Fourier equation. Note that the values change between orders of magnitude, so that each descriptive statistic from each order of magnitude is slightly different. This means that when filtering NDVI for annual descriptive statistics at the 1st to 4th order of magnitude, 16 different cleaned values are newly created describing the within year growth.

FIGS. 20*a* to 23*b* show the difference in image between Landsat 8 AWS NDVI for raw annual descriptive statistics (i.e. those Figures ending with a) versus filtered annual descriptive statistics for the 1st order of magnitude from the Fourier filter using data processing in accordance with the present invention. FIGS. 20*a* and 20*b* show the difference between minimum raw data (FIG. 20*a*) and data filtered in accordance with the present invention (FIG. 20*b*). FIGS. 21*a* and 21*b* show the difference between median raw data (FIG. 21*a*) and data filtered in accordance with the present invention (FIG. 21*b*). FIGS. 22*a* and 22*b* show the difference between mean raw data (FIG. 22*a*) and data filtered in accordance with the present invention (FIG. 22*b*). FIG. 23*a* and show the difference between maximum raw data (FIG. 23*a*) and data filtered in accordance with the present invention (FIG. 23*b*). Note the difference is especially pronounced in the annual minimum, median and maximum.

In addition to the descriptive statistics, a pixel count used to create the annual descriptive statistics (FIG. 24) and a per pixel Root Mean Squared Error (i.e. RMSE; see FIG. 25) quantifying the difference between the noisy raw annual frequency and the filtered annual frequency are generated. These added measures allow for the use of pixel-level quality control measures to identify which pixels have the lowest count over time and highest RMSE. It is these individual pixels that we have the least certainty in their annual descriptive statistics. One novel feature of the present invention is that new clean annual imagery can be created to add quantitative quality control measures at the pixel level.

The underlying processing for the machine learning has been described in prior section. Here a case study is provided for total volume in forests. Two different data sets were used to train the model. The first uses Canadian National Forest Inventory (NFI) estimates that are mapped at 250 m resolution as an initial off the shelf proxy when there is no ground data available, which is sometimes the case prior to purchasing a land asset that will be harvested for timber extraction. Thus, the off the shelf data can be used when there is no ground data. In addition, we also develop a model for forest with some ~400 ground plots we were collected for an AOI in Ontario.

Figure 26A:
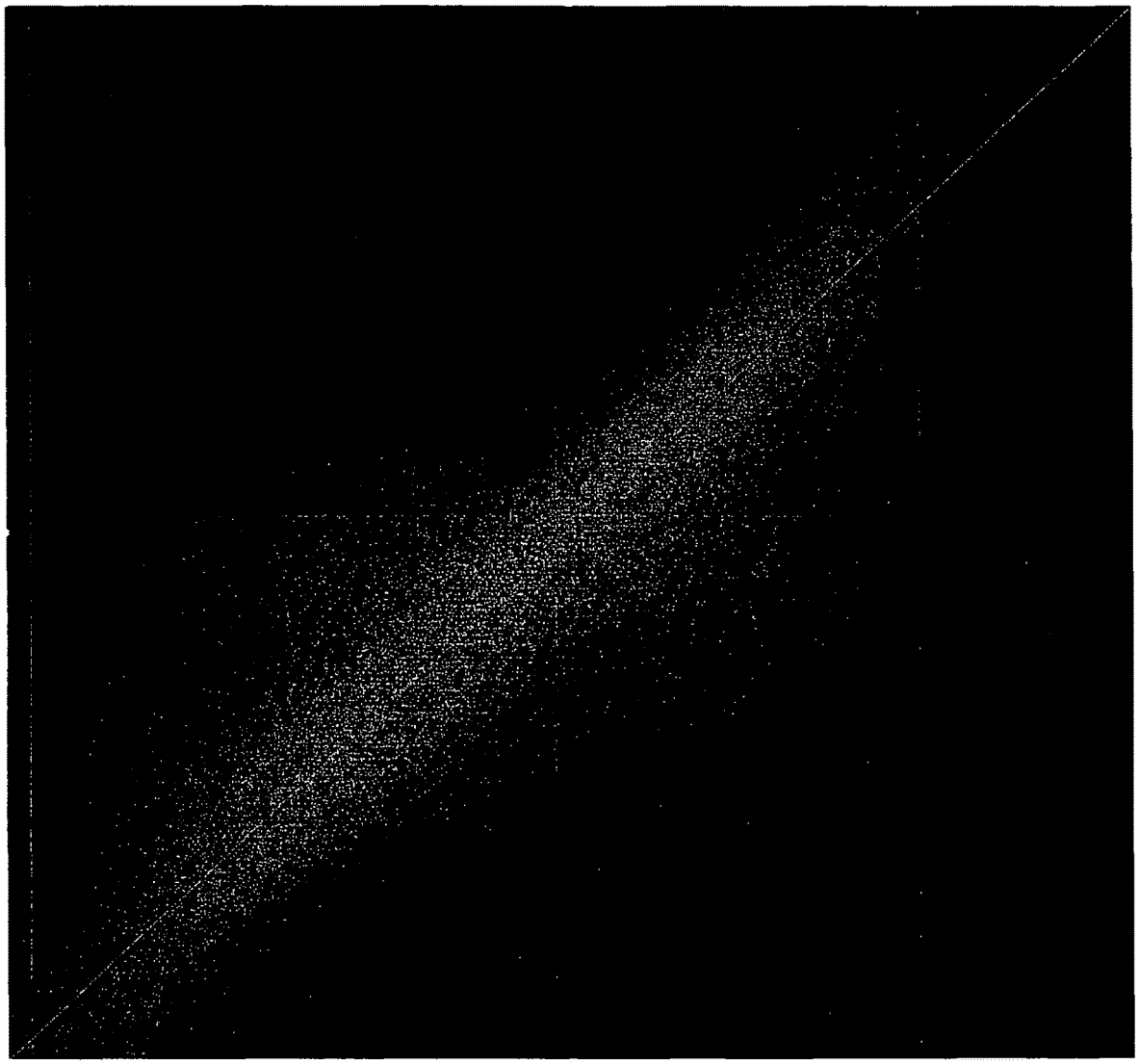
FIG. 26a shows an x/y scatter plot for the off the model developed between NFI total volume and the Landsat 8 AWS annual descriptive statistics for 1st to 4th order of magnitude from the Fourier filtering and FIG. 26b shows an uncertainty distribution based on the x/y plot, where the yellow lines are set to the 95% Confidence.
Figure 26B:
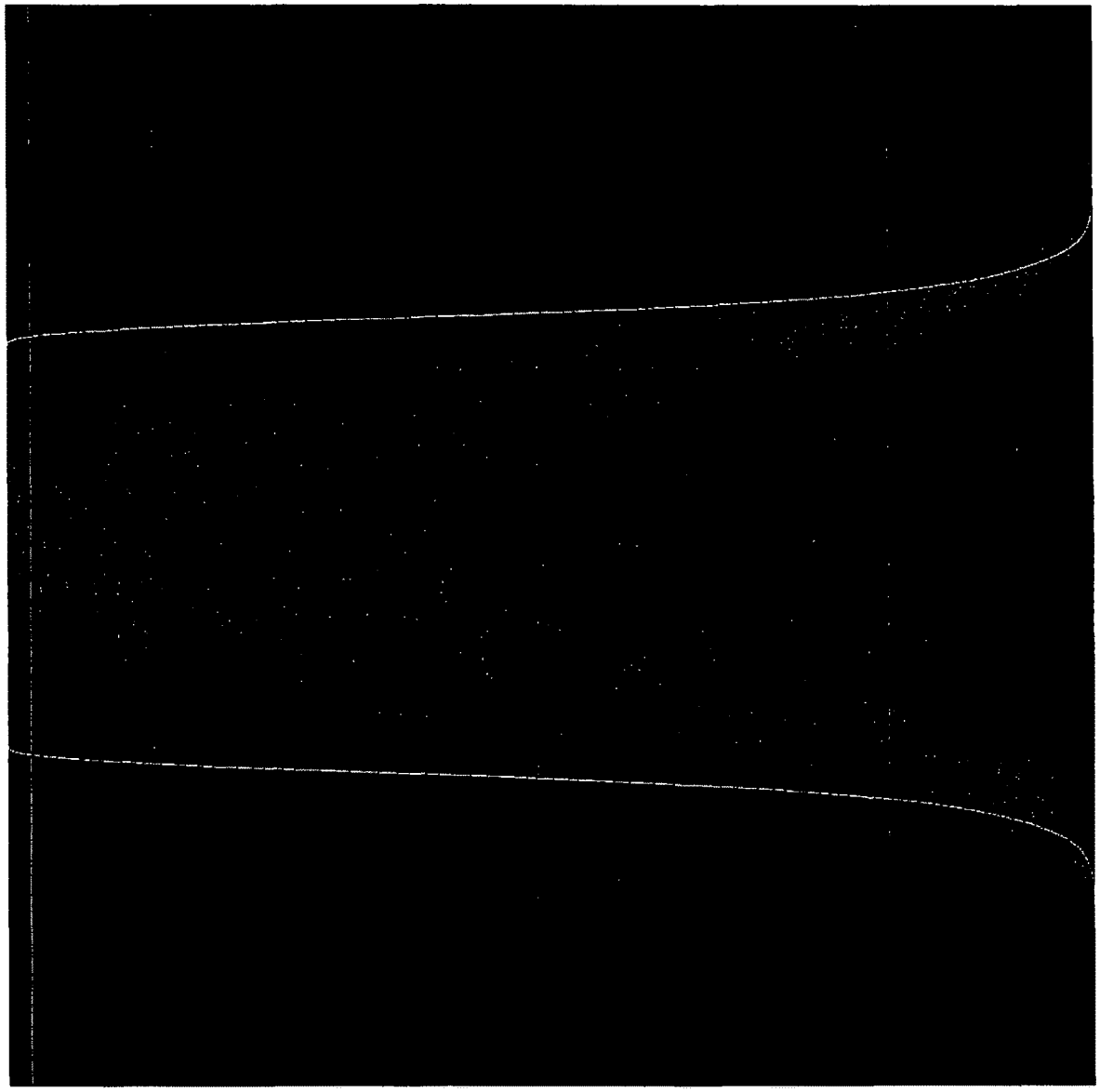

FIG. 26*a* shows an x/y scatter plot for the off the model developed between NFI total volume and the Landsat 8 AWS annual descriptive statistics for 1st to 4th order of magnitude from the Fourier filtering. The model had an overall fit of R2=0.91 with the NFI data with a count of n=302575. The key assumption here is that the NFI data is good and reliable data. FIG. 26*b* shows an uncertainty distribution based on the x/y plot, where the yellow lines are set to the 95% Confidence. Meaning the range in the uncertainty spread is 2.5th quantile at the minimum and 97.5th at the maximum.

Figure 27A:
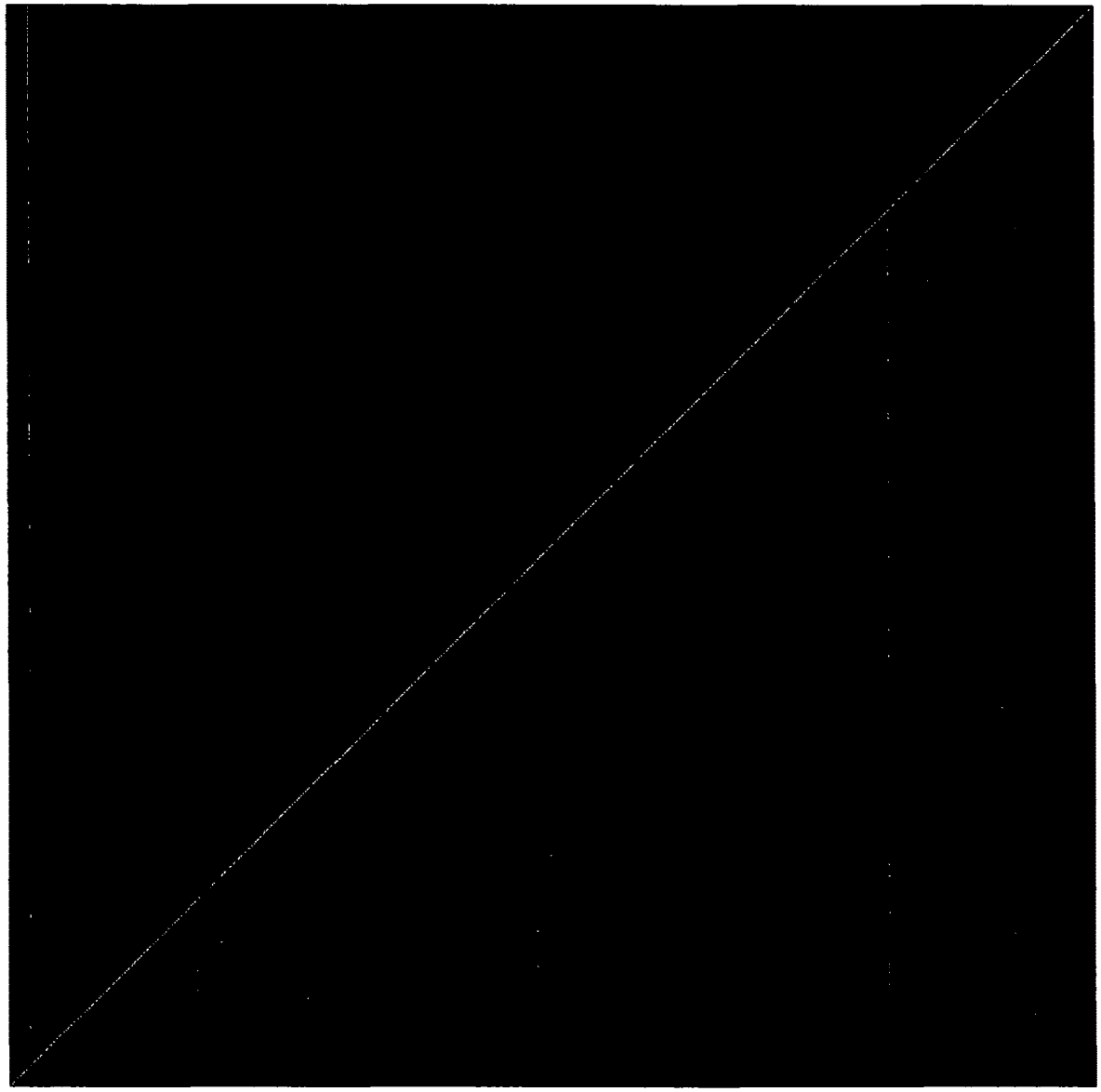
FIGS. 27a and 27b reproduce the modelling of FIGS. 23a and 23b, but with local ground data where the count is only n=~400 points.
Figure 27B:
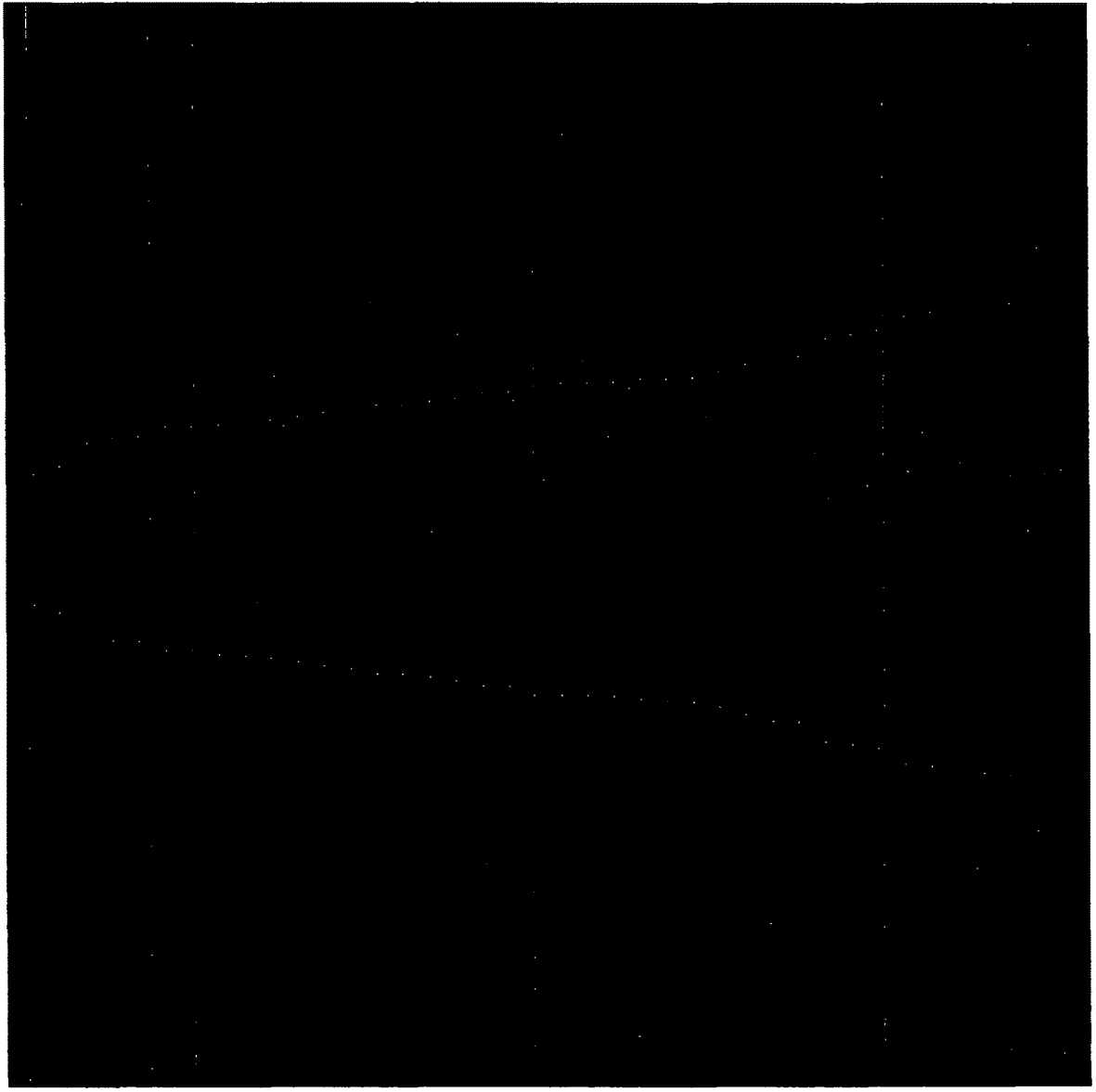

FIGS. 27*a* and 27*b* reproduce the modelling, but with local ground data where the count is only n=~400 points. The model based on locally measured ground data had an R2 of 0.72 with total volume. Again, the uncertainty threshold was calibrated to the 95% Confidence Level in 22*b*. It is also relevant to note here that machine learning software in accordance with the present invention can be developed quickly with hundreds of millions of data point. In order to visualize the correlations and uncertainties, visualization tools were created which were meant very big datasets. Small datasets like the locally scaled data shown in FIGS. 22a and 22b do not visually depict the modelling as accurately as it does with big data.

Figure 28A:
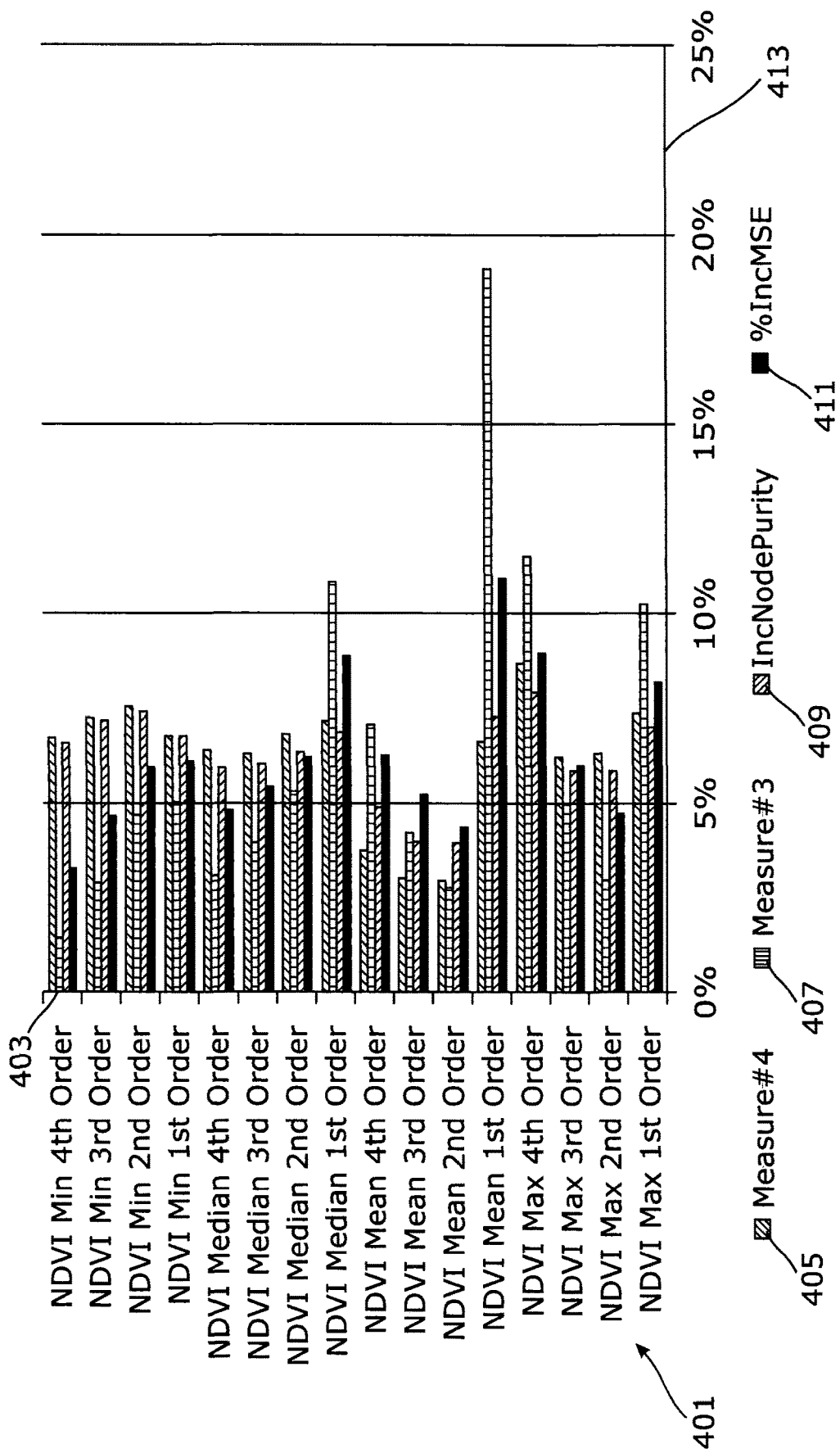
FIGS. 28a and 28b are four modelling diagnostics that measure that influence of each of the 16 NDVI descriptive statistics for making the modelled inference for total volume in both NFI total volume and locally measured total volume.
Figure 28B:
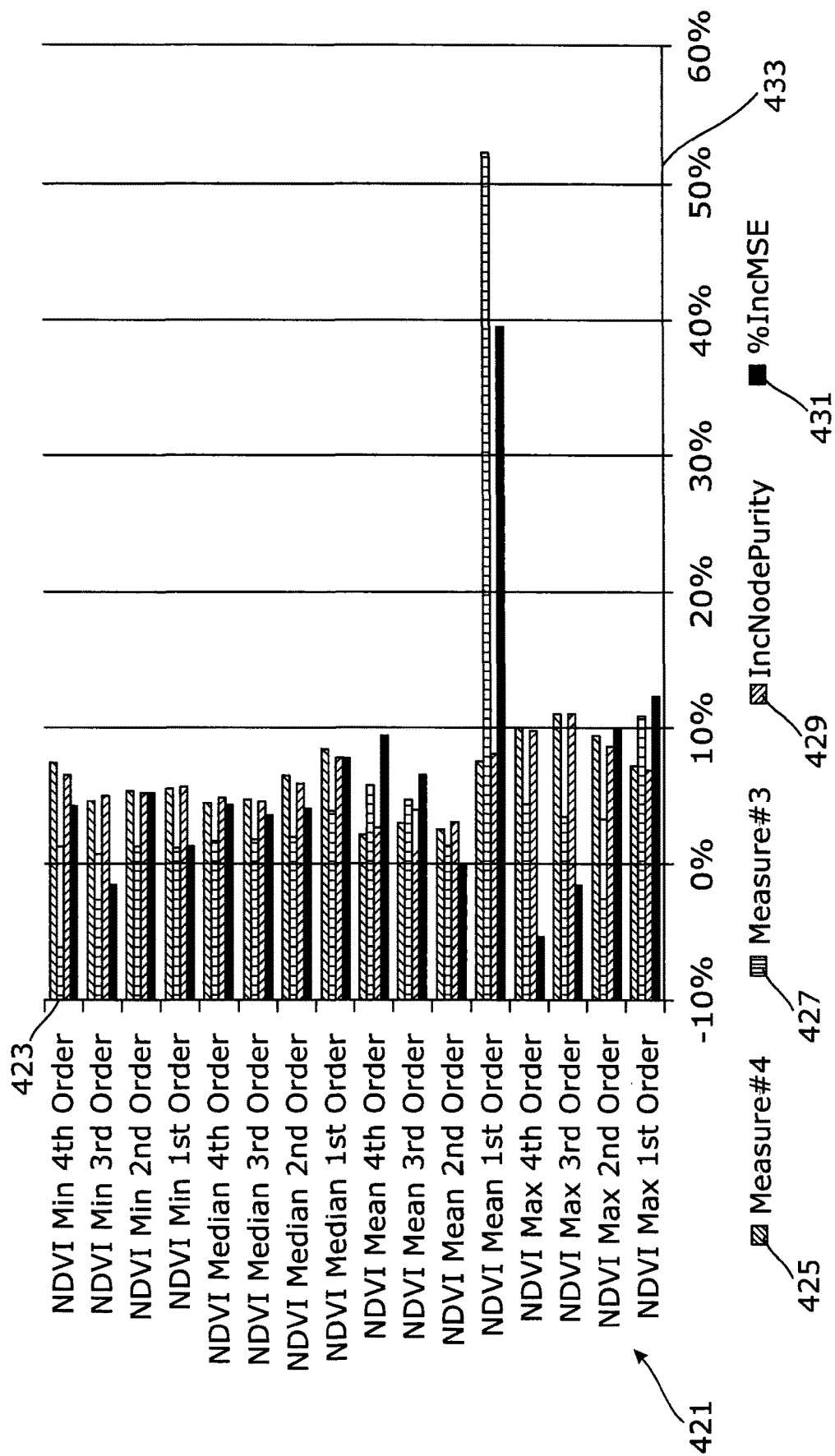

FIGS. 28a and 28b are four modelling diagnostics that measure that influence of each of the 16 NDVI descriptive statistics for making the modelled inference for total volume in both NFI total volume and locally measured total volume.

In FIG. 28a, the graph 401 with a Y axis 403 that plots NVDI min, median, mean and maximum values for first, second third and fourth order values each in respect of four measures which are measure 4 405, 407, 409 and 411. The X axis plots percentage values 413.

In FIG. 28b, the graph 421 with a Y axis 423 that plots NVDI min, median, mean and maximum values for first, second third and fourth order values each in respect of four measures which are measure 4 425, 427, 429 and 431. The X axis plots percentage values 433.

Note that the descriptive statistic for the annual mean NDVI for 1st order shows the greatest influence out of all 16 variables for both NFI and locally derived total volume. This means there is similar spatial consistence for the total volume pattern with annual mean NDVI for 1st order.

FIGS. 29a and 29b show the conditional mean prediction for total volume at the whole AoI, where 29a is the NFI-derived inference and 29b is the locally measured inference with field data. The quantile-based uncertainty analysis allows us to get around the need to cut the data into proportions for training and cross-validation, which are accuracy approaches tied specifically to a conditional mean inference alone. This approach is especially useful with when locally modelling with small sample sizes.

Figure 30A:
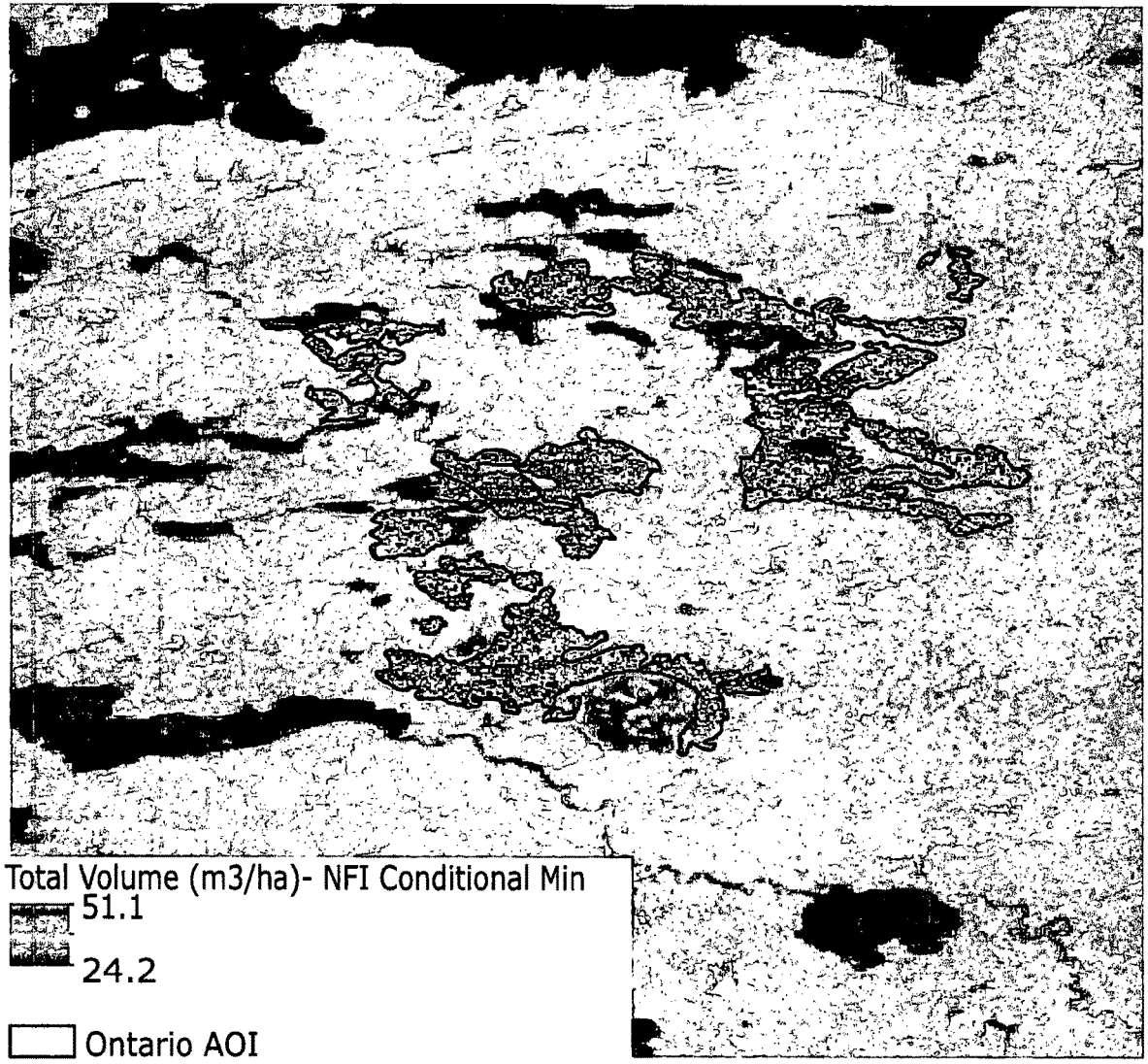
FIGS. 30a and 30b are images which show the range of quantile prediction at the 95% Confidence Interval.
Figure 30B:
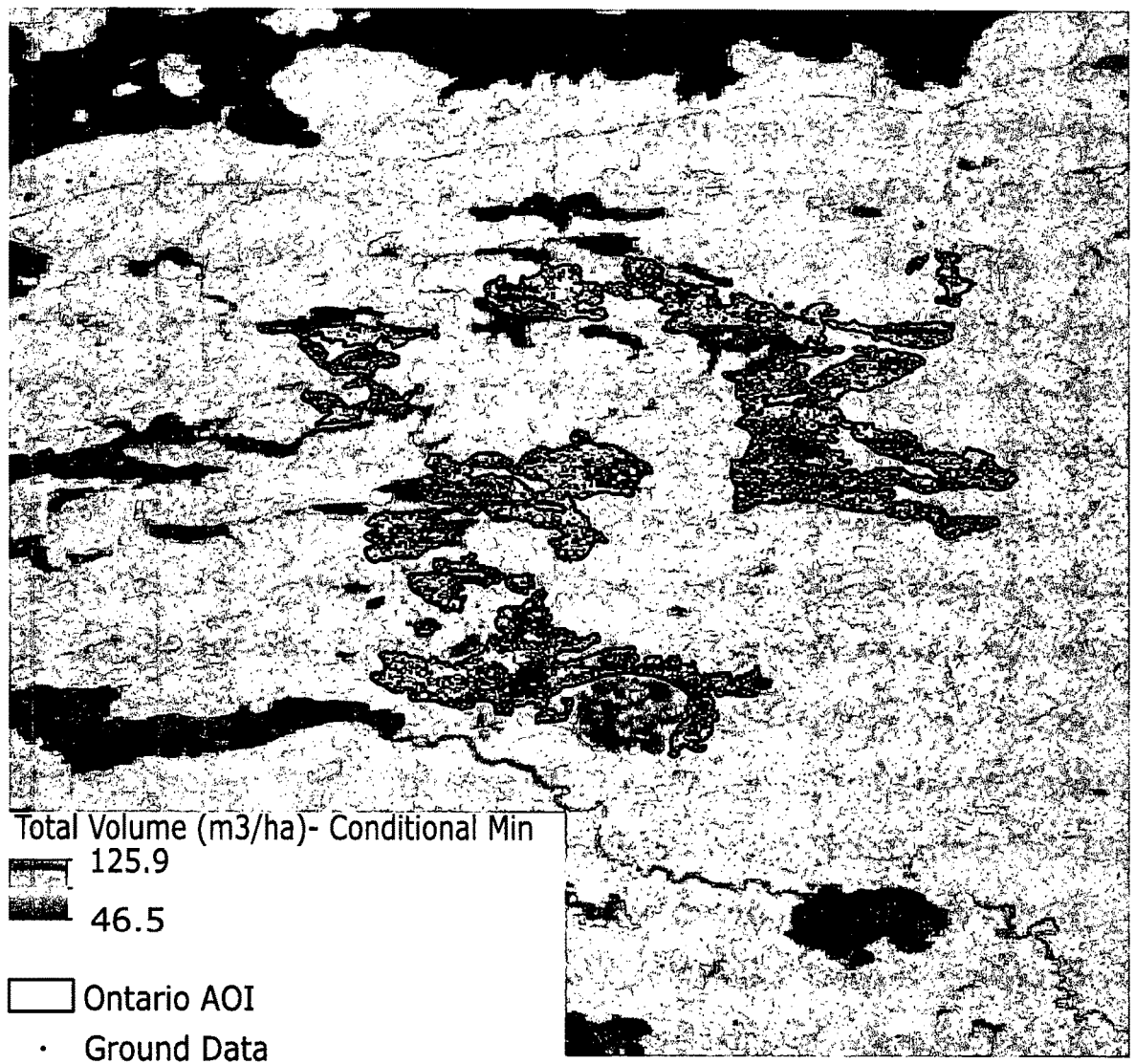
Figure 31A:
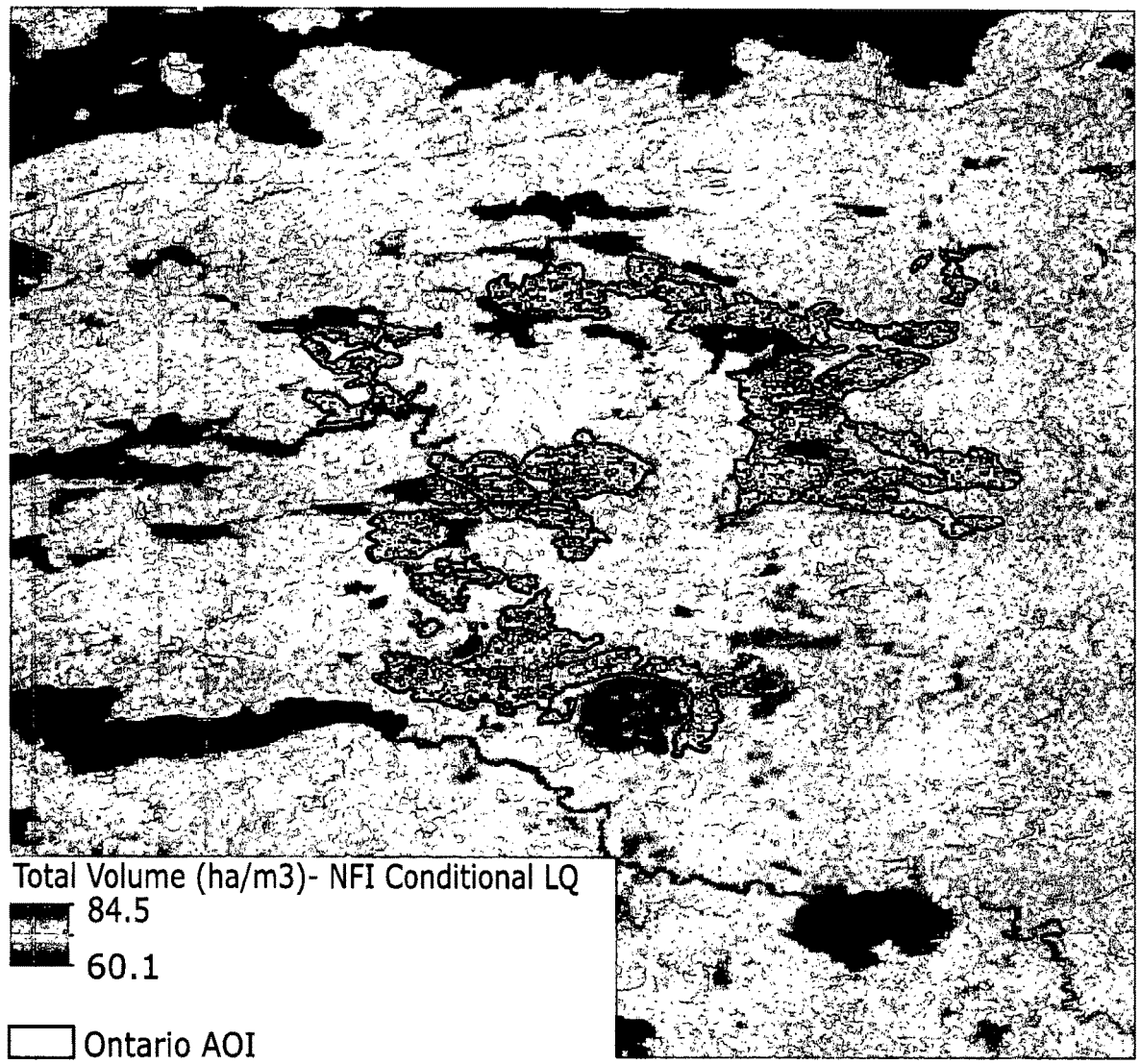
FIGS. 31a and 31b are images which show the conditional lower quartile.
Figure 31B:
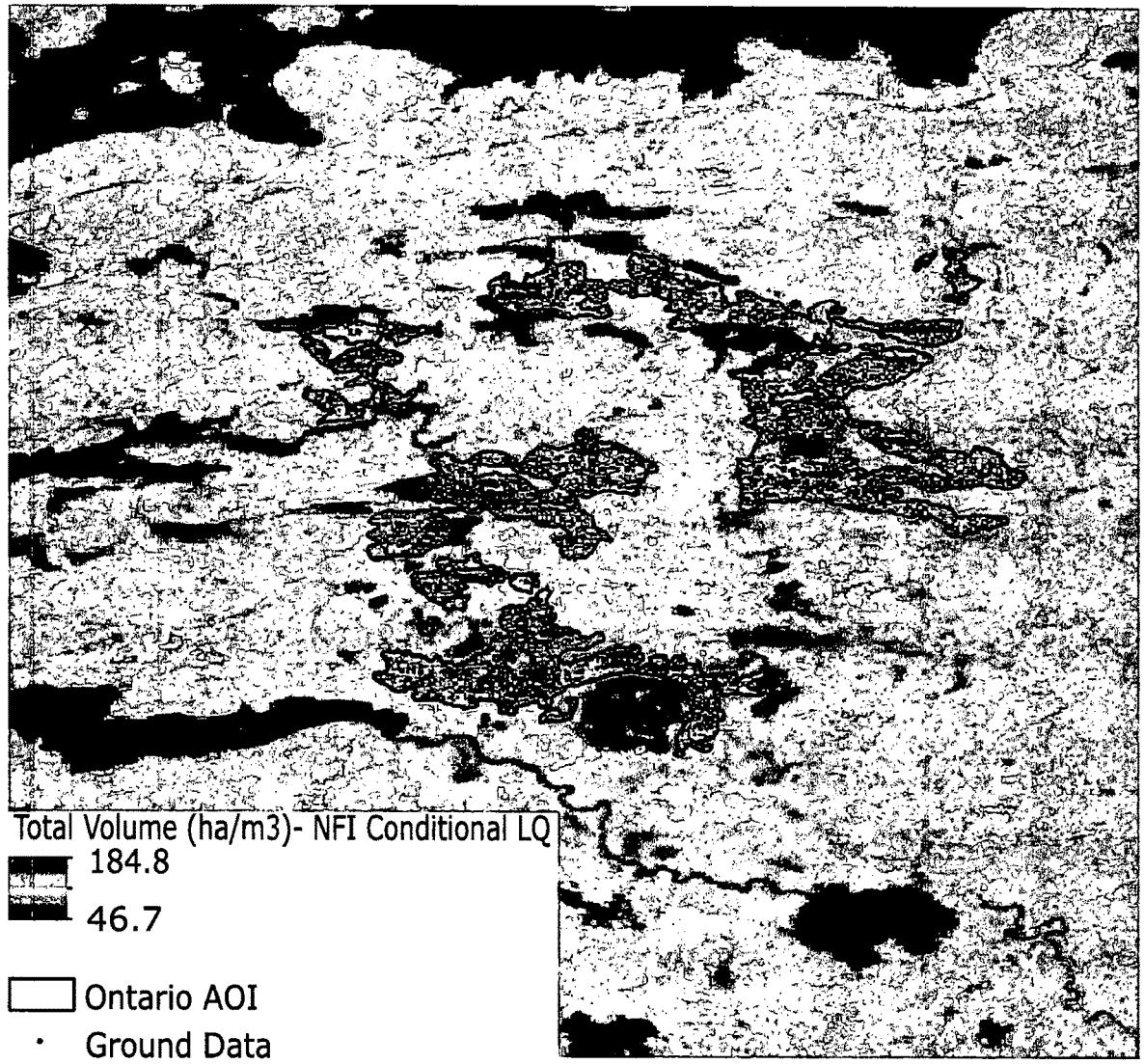
Figure 32A:
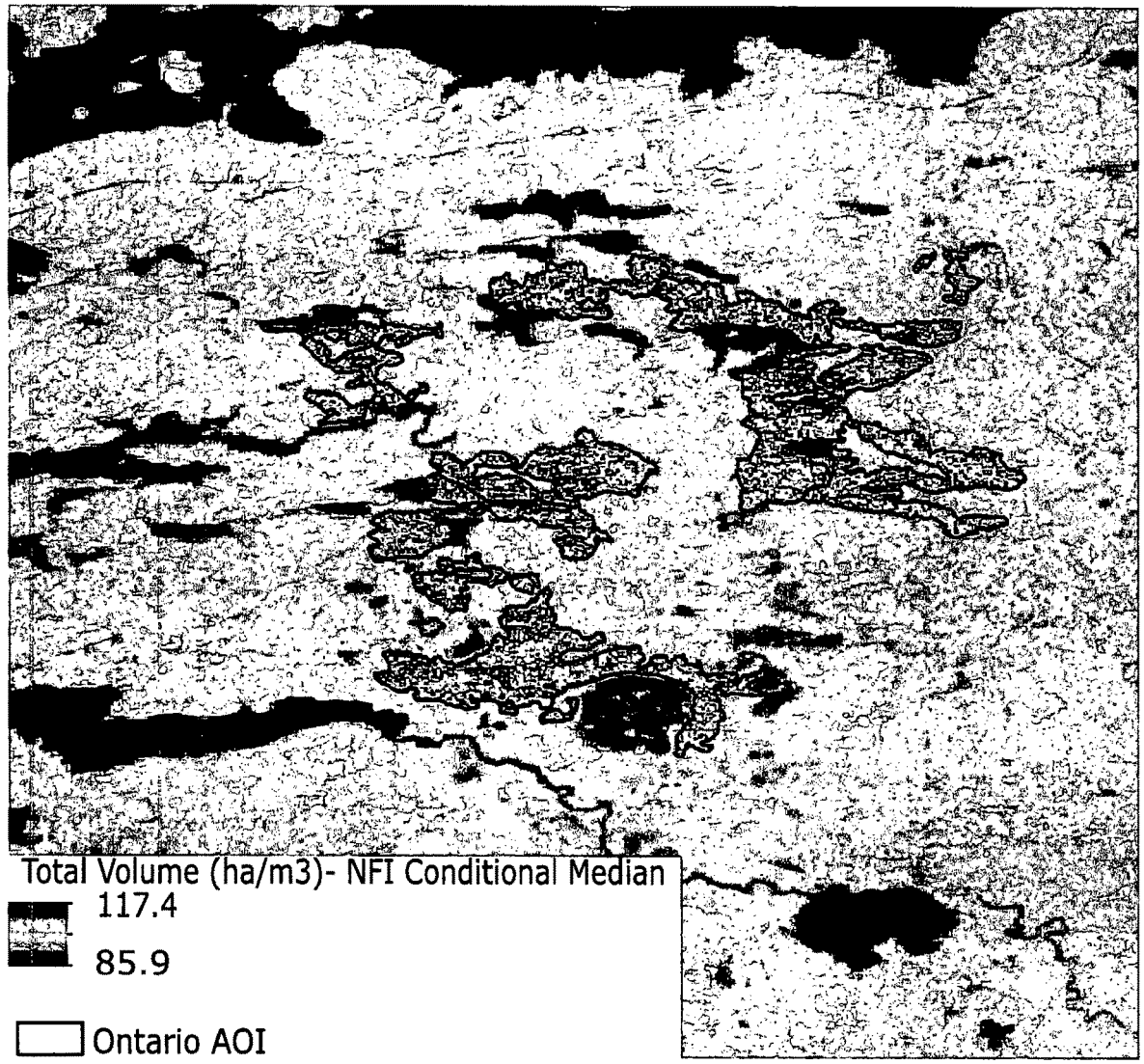
FIGS. 32a and 32b are images which show the conditional median (i.e. 50th quantile)
Figure 32B:
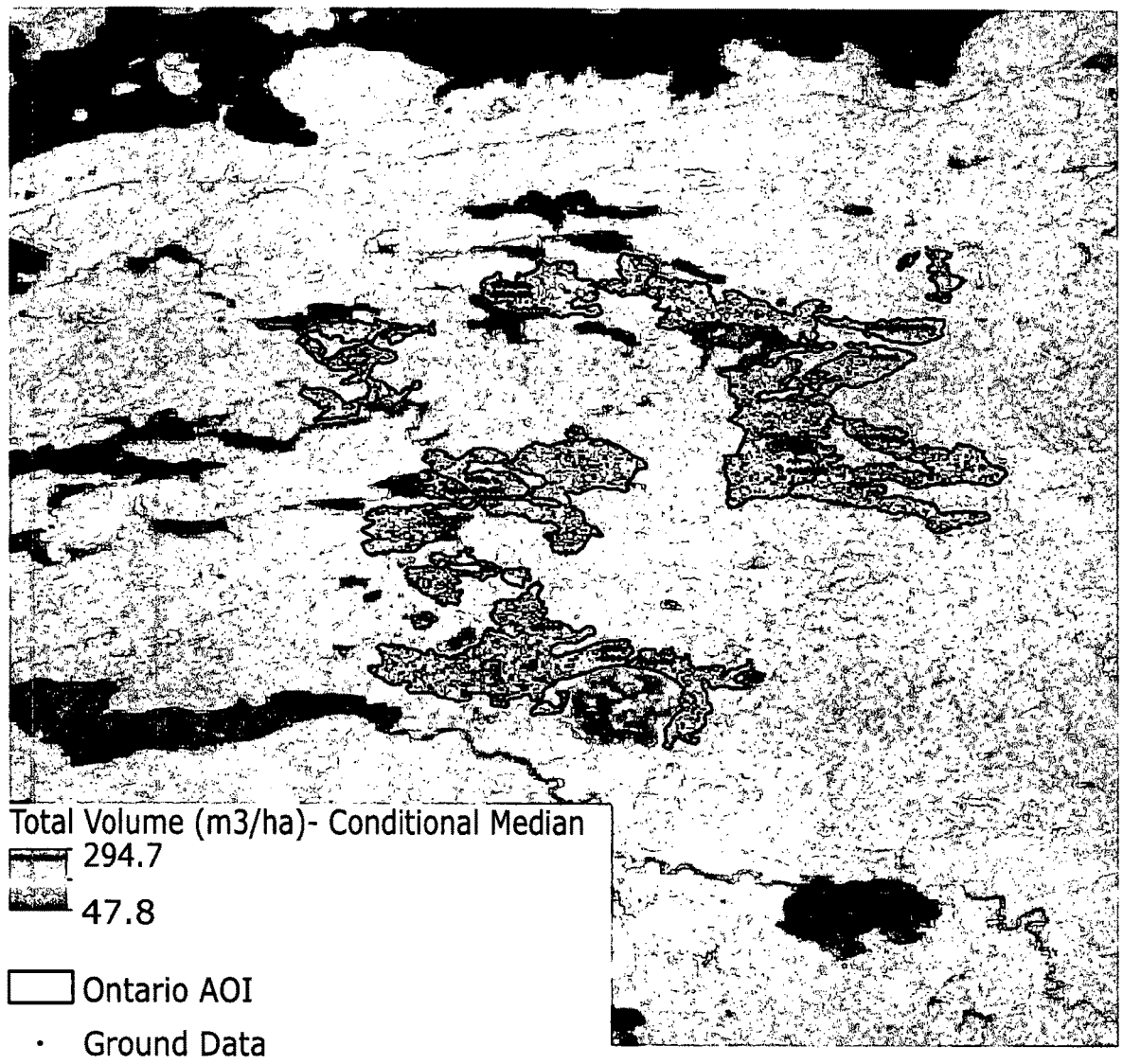
Figure 33A:
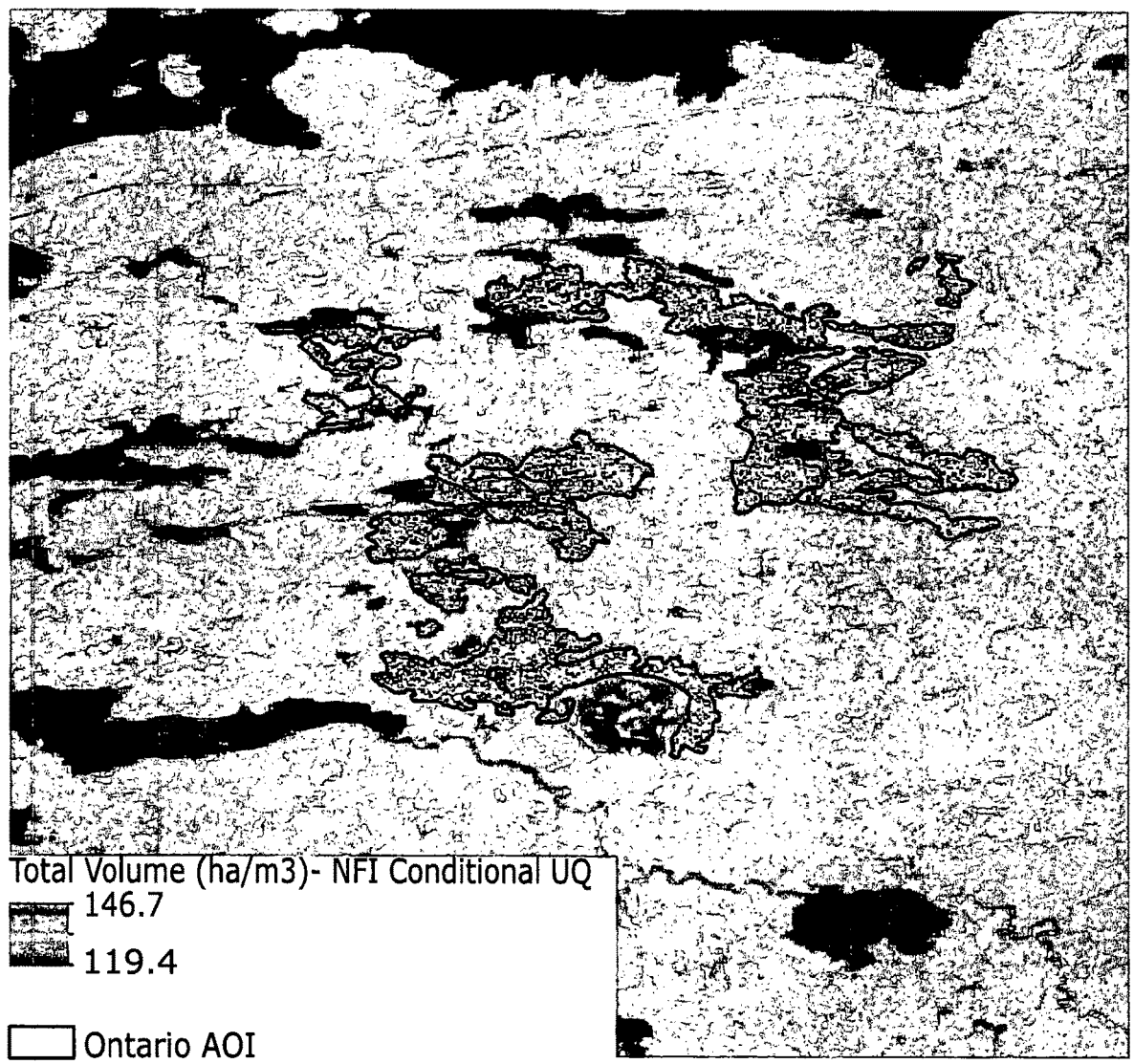
FIGS. 33a and 33b are images which show the conditional upper quartile (i.e. 75th quantile)
Figure 33B:
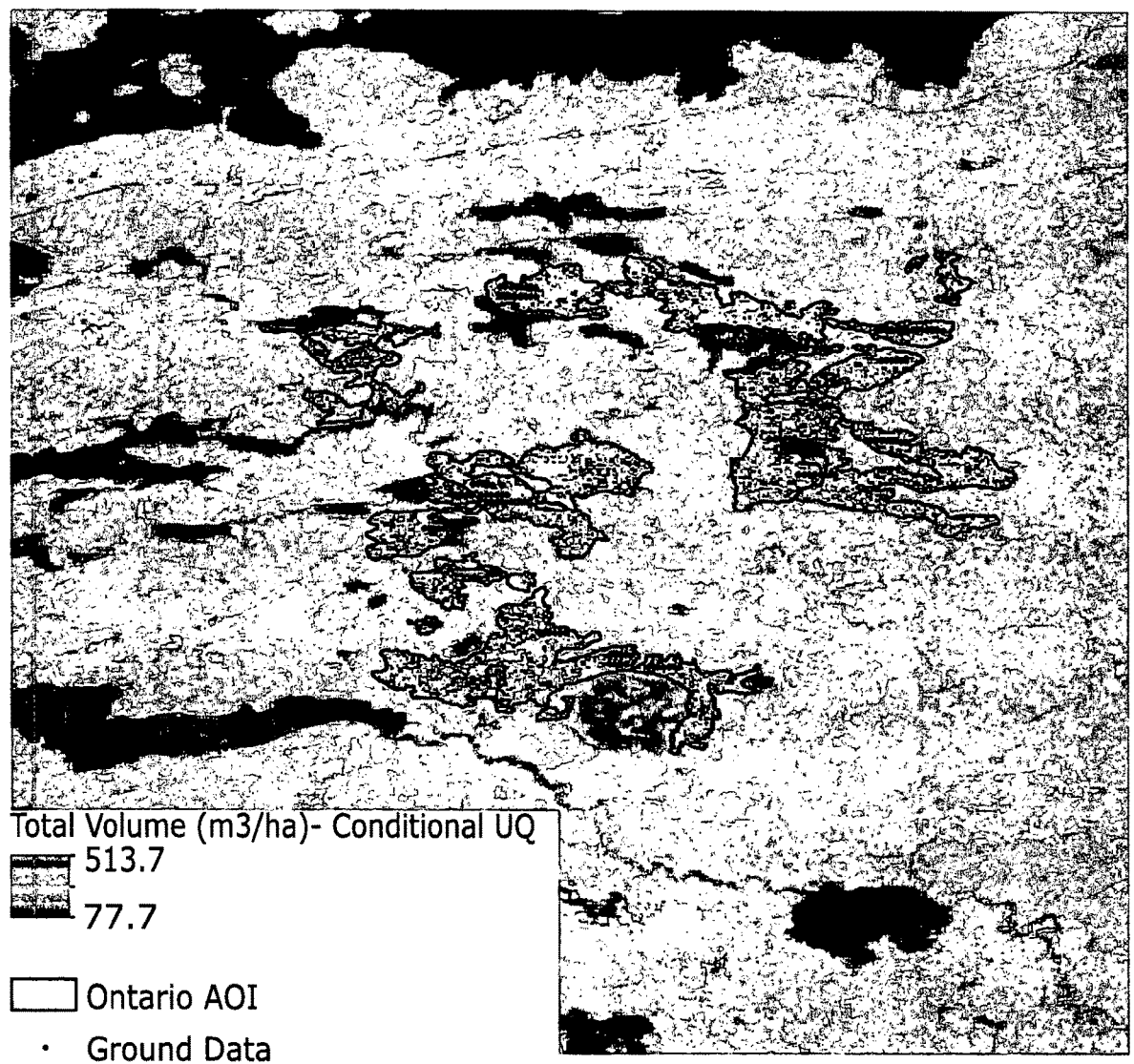
Figure 34A:
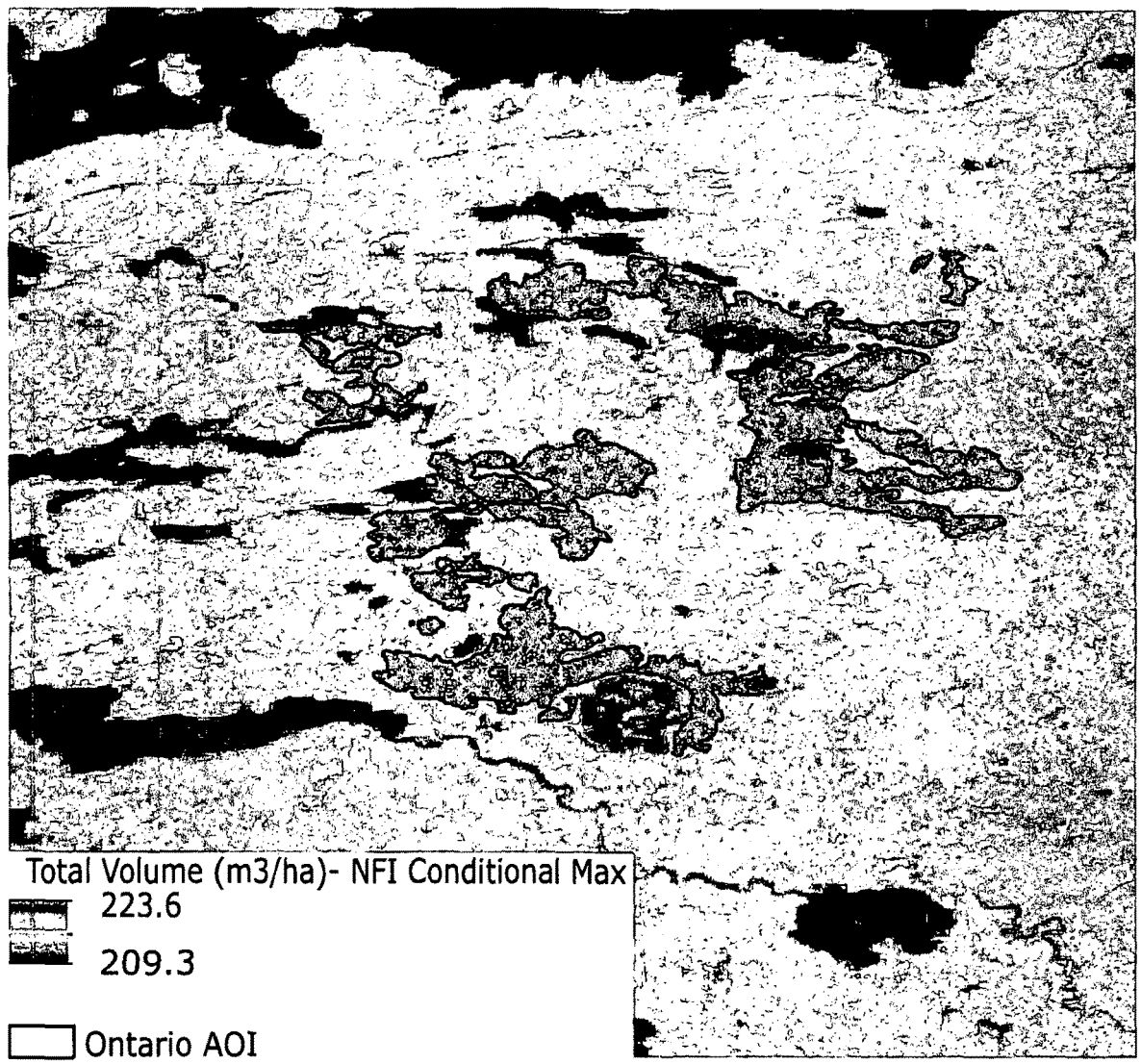
FIGS. 34a and 34b are images which show the conditional maximum quartile (i.e. 97.5th quantile)
Figure 34B:
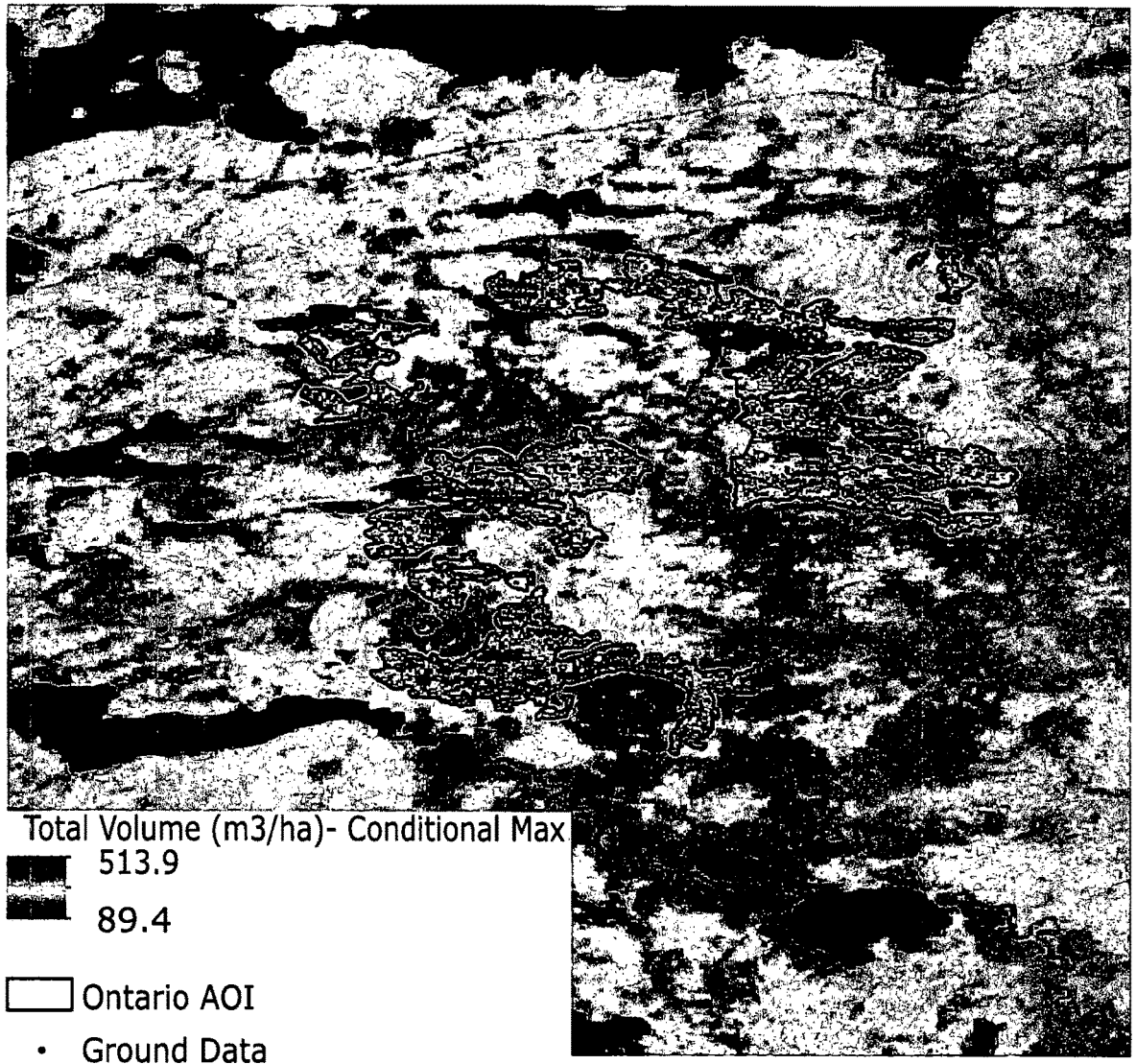

FIGS. 30a to 34b show the range of quantile prediction at the 95% Confidence Interval. Meaning, FIGS. 30a and 30b show the conditional minimum (i.e., 2.5th quantile). FIG. 3.6 shows the conditional lower quartile (i.e., 25th quantile); FIG. 3.7 shows the conditional median (i.e., 50th quantile), FIG. 3.8 shows the conditional upper quartile (i.e., 75th quantile) and FIG. 3.9 shows the conditional maximum (97.5th quantile).

The point to the quantile-based uncertainty analysis is to provide a range of predictions when the modelled inference in made for the whole AOI or managed sub-regions within the AOI. This translates to the client in valuing risk in the numbers versus investment into the site. For example, the client may want to start by harvesting timber at the site for sub-regions where the quantiles have the least variability in the modelled inference or where all inferences show consistently higher values.

Thus, when the client has no field data, machine learning in accordance with the present invention can provide initial test proxy data based on an assumption that national data is more accurate than no data.

Issues that arise here are 1) small sample sizes may not be representative and robust across large areas and 2) there is a degree of unmeasured sampling error in the field and method used to quantify the density measure-meaning, we have to assume the field data is good.

However, field sampling methods differ and can produce different results for the same location. In application to a client this means:

1 the present invention can provide an off the shelf number when there is no ground data for an AOI and 2) retrain the model with locally scaled ground data to improve predictions for a whole site assuming the local ground data is most accurate.

In this way, the machine learning and mapping system of the present invention can be quickly updated with new data, so one map should never be assumed accurate for all users.

Beyond modelling for a single value (i.e. total volume), the regression-based machine learning function has been applied to the following modelling scenarios:

i. Single variate continuous outputs for soil organic matter used for carbon trading in the agriculture sector.

ii. Multivariate continuous output models for crop yield inferencing, where 150 different continuous crop type yield values were run in one model and global maps of continuous crop yield inferences were generated for each crop type.

iii. Multivariate continuous output models for timber yield inferencing, where total volume was couple to height, age, basal area, diameter at breast height, merchantable volume, and subset into volume per species, all of which were run through one as one model.

iv. Multivariate continuous outputs, where the sum of a group of raster layers' equals 100%, which has then been applied to percentage land cover per pixel, percentage tree species per pixel and percentage of tree species for total volume.

The present invention is applied to active satellite sensors information to tracking vegetation attribute assets in forestry and agriculture. Examples here are using active sensors from a variety of data sources to clean the daily imagery at the raster level.

Figure 35:
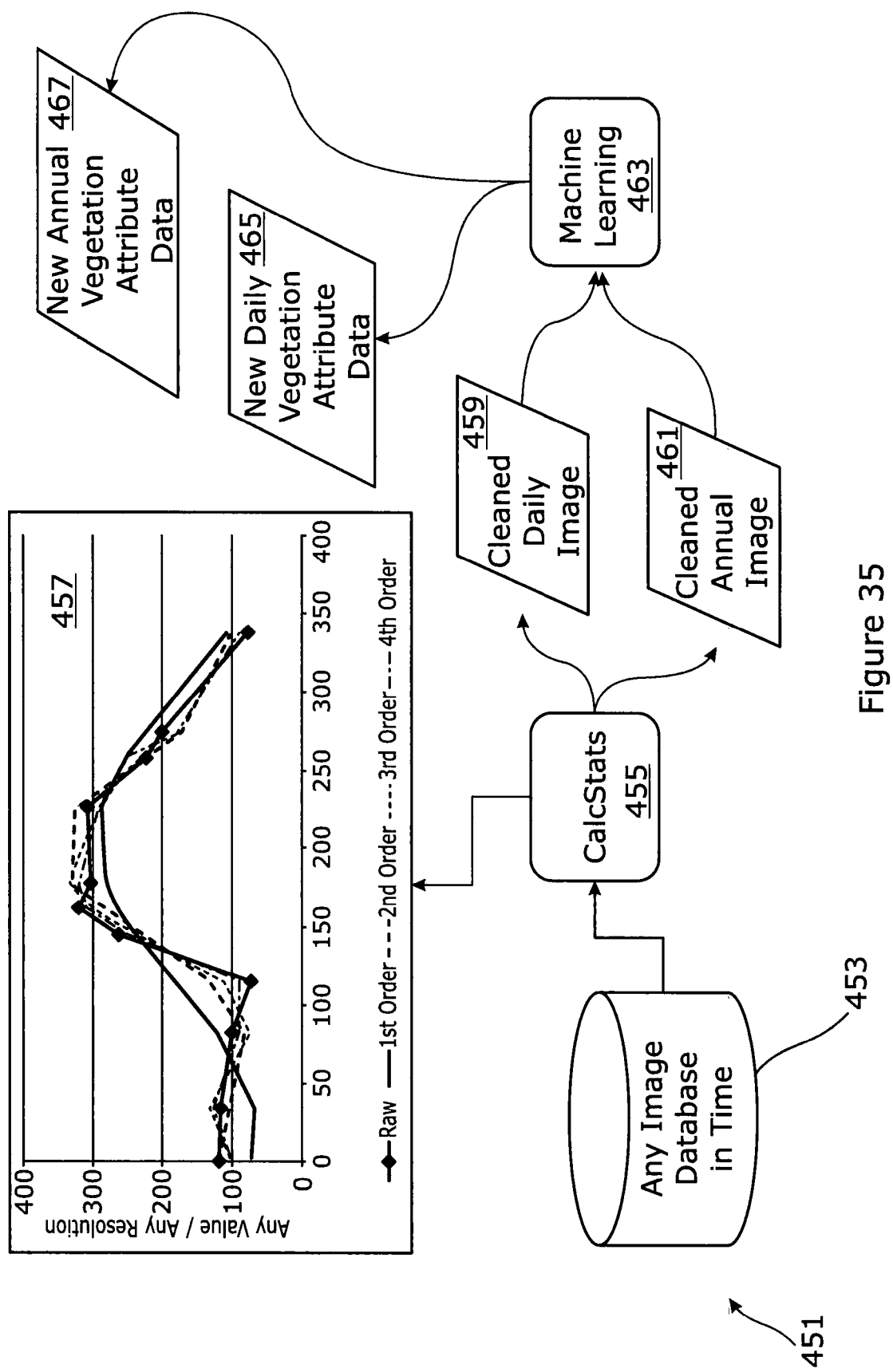
FIG. 35 shows an example of a generic image processing system in accordance with the present invention.

The cleaned daily data is then used to better infer vegetation attributes such as agriculture and forest growth rates throughout a year. The cleaned annual data is used to infer vegetation attributes related to stocks, such as standing timber or carbon in the soil. The novelty is that existing data can be cleaned and new data products created. One element of the software that should be clearly understood is that the processing can be applied to any set of imagery over time. FIG. 35 shows an example of a generic processing system for the system and method of the present invention. The FIG. 451 shows a generic database image as an input to calcstats 455 which outputs statistics 457 and provides a cleaned daily image 459 and a cleaned annual image 461. Machine learning 463 provides new daily vegetation attribute data 465 and new annual vegetation attribute data 467.

Conceptually, the system treats any image as a raster layer (i.e. a GeoTiff), so the values in the raster layers could be a red, blue, green, any index, near-infrared, height from a Lidar sensor or back scatter/texture from a SAR sensor. In all cases, the remotely sensed data is still just numbers stored as pixel values over space in an digital image. The digital image is replicated over the same place in time. If the SAR and Lidar imagery are collected at the same place (i.e. regular repeat cycles in the satellite's orbit) throughout a year, these data can be setup in the same way as the NDVI described herein, to run the software to clean the sensor noise in the pixels over time.

If the SAR and/or Lidar imagery is the collected on an annual basis, a second version of the software may be used which filters and smoothes pixel-level noise in annual imagery similar to the inventions treatment of within year imagery. The second version can then be run on any annual SAR and/or Lidar imagery where one snapshot is collected each year around the same proximate same day of year within each year (i.e. not winter one year and summer the next). It uses either the Fourier or Kalman filtering to produce clean annual data and can also be used to adjust the amount of year to year change that is measured per pixel by either changing 1) the order of magnitude in the Fourier series or 2) the gain factor in the Kalman filter. It also produces a count of samples and RMSE per pixel for quality control measures in the annual filtering.

Figure 36:
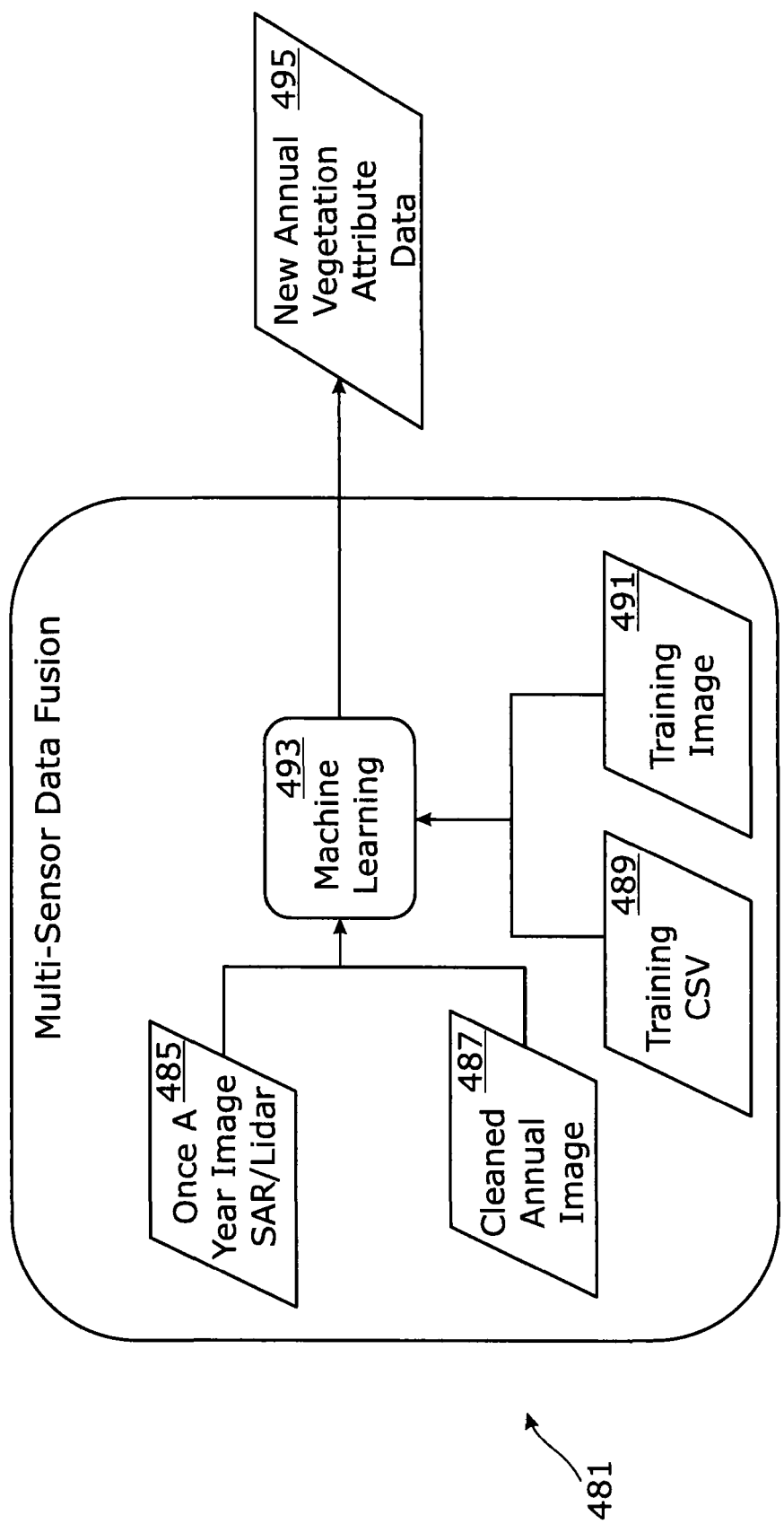
FIG. 36 shows an example of a generic multi-sensor data fusion system in accordance with the present invention.

Another application is if the SAR and/or Lidar imagery are only collected once a year, these data can be treated as annual data used with the annual descriptive statistics generated from CalcStats, NDVI for example. FIG. 36 shows a generic Multi-Sensor Data Fusion system 481 with a multisensory data fusion module 483. SAR and Lidar imagery 485 is added to the annual descriptive statistics for use in the machine learning modelling with either an off the shelf data product or with ground data in a user defined CSV 487 . . . Training CSV module 489 and Training image module 491 are also input into the learning machine 493 and an output 495 of new annual vegetation attribute data is obtained.

The present invention has been designed as a forward-thinking solution which will change the way we can analyse our planet by embracing big data predictive analytics. It is the solution that can turn raw satellite data into commercially value information, which is a key differentiator in what will become an increasingly busy market of upstream providers hoping to sell the low margin raw data or imagery.

The present invention may, for example, be used to monitor land, water, sea or air, by extracting any satellite data product and importantly, it then filters and removes the inherent errors in the raw data. It has the processing power to do this on global scales. The result is a capability to access and analyse more accurate data, giving anyone a clearer and better understanding of our changing planet.

The machine learning allows the end-user the ability to train the software on existing known data and incorporate multiple variables in the modelling which helps produce better and quantifiable results or predictions, on scales that have not been possible until now Improvements and modifications may be incorporated herein without deviating from the scope of the invention.

The invention claimed is:

1. A computer implemented process for Earth observation and analysis, the process comprising:
   i) pre-processing remote sensing images to filter said images by applying a temporal signal processing filter to a time series of remote sensing images and extracting descriptive statistics from image pixels of the remote sensing images to create input X parameters for use in a machine learning process 1 wherein, the temporal signal processing filter provides, within-year signal processing (CalcStats) and/or across year signal processing (YearFilter) data;
   ii) applying the machine learning process to create a model which determines how the input X-parameter values map to the range of possible Y-parameter values, through a regression (or classification) process in a way that improves RAM allocation and parallelizing in the software and processors during the machine learning process wherein the machine learning process comprises using a Random Forest machine learning software application to create a 1 dimensional data array indexed by the n samples in the data set, storing the information for each tree and collating the information for processing;
   iii) applying the output from step ii) to a potentially new Area of Interest to determine or predict Y-values for the known X-values using data scoring; and
   iv) generating calibrated output images corresponding to the specific regions defining the Areas of Interest.

2. A process as claimed in claim 1, the area of interest is defined by a coordinate bounding box of the target area.

3. A process as claimed in claim 1 wherein, extracting descriptive statistics comprises extraction from individual pixels.

4. A process as claimed in claim 1 wherein, the remote sensing images comprises data which includes discrete element method (DEM) derived parameters (such as slope, aspect, elevation) and/or soil-derived parameters.

5. A process as claimed in claim 1 wherein, the signal processing filter smoothes out the signal noise for each pixel within a year or with respect to a growth cycles within a year.

6. A process as claimed in claim 1 wherein, the descriptive statistics are extracted from statics from the pixel's filtered frequency.

7. A process as claimed in claim 1 any preceding claim wherein, the signal processing comprises generating annual or growth season based descriptive statistics.

8. A process as claimed in claim 1 wherein, the descriptive statistics comprises annual minimum, annual median, annual mean and annual maximum value for all pixels in an image.

9. A process as claimed in claim 1 wherein, the descriptive statistics are used to calculate vegetation attributes.

10. A process as claimed in claim 1 wherein, the signal processing filter is used to reduce the effect of anomalous data values.

11. A process as claimed in claim 1 wherein, pre-processing may also comprise per-pixel time-series filtering, to reduce the effect of anomalous values.

12. A process as claimed in claim 1 wherein, the step of applying a machine learning process further comprises using a decision tree analysis to generate a quantile regression uncertainty analysis.

13. A process as claimed in claim 1 wherein, the step of machine learning uses as input a variety of images, each representing a specific parameter either as a target parameter to be used for training and to be subsequently provided as the results of the predictive analysis, or as a reference parameter upon which the predictions will be made.

14. A process as claimed in claim 1 wherein, the machine learning process further comprises a Quantile Regression, for example Quantile Regression Forest, which calculates confidence levels for the accuracy of each estimated value.

15. A process as claimed in claim 1 wherein the input data may be historical in-situ or "ground truth" information.

16. A process as claimed in claim 1 wherein, the Y values can be predicted on a per-pixel basis.

17. A process as claimed in claim 16 wherein, the step of predicting comprises; a first stage processing to be performed and a second stage which involves interactive selection of the specific outputs for display and/or download.

18. A process as claimed in claim 17 wherein, in the first stage, the inputs for the Predictive Analytics are defined by the user, and the processing is started, the Predictive Analytics software will then generate output images covering the specified general AoI corresponding to the specified time, for each of the Y-parameters originally used in training for the selected Model.

19. A process as claimed in claim 17 wherein, for the second stage, the user analyses the results, and generates consolidated output for the precise Area of Interest (including mosaicking across MODIS tiles, if necessary, and applying shapefile-defined masks for the specific area of interest, as well as generating "user-friendly" colour look-up tables for presenting the resulting imagery in a clear and meaningful format (as .png files or pdf files, ready for inclusion in web pages or in reports.

20. A method as claimed in claim 1, the files are collated once some or all of the trees have been generated so as to improve RAM allocation during processing.

\* \* \* \* \*